US012731119B1

(12) United States Patent
Walker et al.

(10) Patent No.: US 12,731,119 B1
(45) **Date of Patent: *Sep. 8, 2026**

(54) WEARABLE DEVICE FOR SIMULTANEOUSLY VISUALLY PERCEIVING PHYSICAL SURROUNDINGS IN A FIELD OF VIEW OF A USER AND PROVIDING VISUAL OUTPUTS ON A DISPLAY FOR USE WITH FINANCIAL TRANSFERS

(71) Applicants: Patricia A. Walker, Medina, OH (US); Ralph E. Jocke, Medina, OH (US)

(72) Inventors: Patricia A. Walker, Medina, OH (US); Ralph E. Jocke, Medina, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/012,281

(22) Filed: Jan. 7, 2025

Related U.S. Application Data

(63) Continuation of application No. 18/372,762, filed on Sep. 26, 2023, now Pat. No. 12,223,480, which is a continuation-in-part of application No. 18/225,832, filed on Jul. 25, 2023, now Pat. No. 12,217,230, and a continuation-in-part of application No. 17/888,643, filed on Aug. 16, 2022, now Pat. No. 11,803,828, said application No. 18/225,832 is a continuation of application No. 17/867,959, filed on Jul. 19, 2022, (Continued)

(51) Int. Cl.

| | |
|---|---|
| ***G06Q 20/10*** | (2012.01) |
| ***G06F 3/01*** | (2006.01) |
| ***G06Q 20/32*** | (2012.01) |
| ***G07F 19/00*** | (2006.01) |

(52) U.S. Cl.
CPC ......... *G06Q 20/1085* (2013.01); *G06F 3/011* (2013.01); *G06Q 20/321* (2020.05); *G07F 19/202* (2013.01); *G07F 19/203* (2013.01); *G07F 19/206* (2013.01)

(58) Field of Classification Search
CPC .. G06Q 20/10; G06Q 20/1085; G06Q 20/321; G07F 19/202–204; G07F 19/206; G06F 3/011–014; G06F 3/017
USPC ........................... 235/379; 705/43; 902/8–21
See application file for complete search history.

(56) References Cited

U.S. PATENT DOCUMENTS

| | | | |
|---|---|---|---|
| 9,792,594 B1 * | 10/2017 | Bayha | G06Q 20/40145 |
| 10,289,987 B1 * | 5/2019 | Walker | G07F 19/203 |

(Continued)

*Primary Examiner* — Suezu Ellis
(74) *Attorney, Agent, or Firm* — Ralph E. Jocke; WALKER & JOCKE

(57) ABSTRACT

A mobile wireless device (100) in the configuration of user wearable glasses includes at least one lens including at least one transparent display (110). The at least one display is operable to provide visual outputs that are visually perceivable to the user of the device. The user is enabled to see through the at least one lens, physical surroundings in a direct field of view. The device includes at least one input device (116, 122, 114) which receives user inputs. At least one circuit is in operative connection with the at least one display, the at least one input device, a data store (106) and a wireless transceiver (120). At least one user input is operative to cause the device to communicate at least one wireless message which includes data usable to identify a financial account. At least one remote circuit is operative responsive to the at least one wireless message to cause a financial transfer to or from the financial account.

28 Claims, 34 Drawing Sheets

Related U.S. Application Data now Pat. No. 11,727,374, which is a continuation-in-part of application No. 17/380,753, filed on Jul. 20, 2021, now Pat. No. 11,727,373, said application No. 17/888,643 is a continuation of application No. 17/081,254, filed on Oct. 27, 2020, now Pat. No. 11,436,581, which is a continuation-in-part of application No. 16/742,348, filed on Jan. 14, 2020, now Pat. No. 10,825,005, said application No. 17/380,753 is a continuation of application No. 16/655,425, filed on Oct. 17, 2019, now Pat. No. 11,080,669, said application No. 17/081,254 is a continuation-in-part of application No. 16/398,461, filed on Apr. 30, 2019, now Pat. No. 10,825,004, which is a continuation-in-part of application No. 15/949,532, filed on Apr. 10, 2018, now Pat. No. 10,289,987, said application No. 16/742,348 is a continuation-in-part of application No. 15/426,135, filed on Feb. 7, 2017, now Pat. No. 10,540,644, said application No. 16/655,425 is a continuation-in-part of application No. 15/264,666, filed on Sep. 14, 2016, now Pat. No. 10,453,041, which is a continuation of application No. 14/808,021, filed on Jul. 24, 2015, now Pat. No. 9,520,034, said application No. 15/426,135 is a continuation-in-part of application No. 14/446,413, filed on Jul. 30, 2014, now Pat. No. 9,594,954, said application No. 14/808,021 is a continuation-in-part of application No. 14/281,936, filed on May 20, 2014, now Pat. No. 9,117,327, said application No. 14/446,413 is a continuation-in-part of application No. 14/281,936, filed on May 20, 2014, now Pat. No. 9,117,327, and a continuation-in-part of application No. 14/273,991, filed on May 9, 2014, now Pat. No. 9,262,785.

(60) Provisional application No. 62/029,210, filed on Jul. 25, 2014, provisional application No. 61/925,393, filed on Jan. 9, 2014, provisional application No. 61/862,696, filed on Aug. 6, 2013.

(56) References Cited

U.S. PATENT DOCUMENTS

| | | | | |
|---|---|---|---|---|
| 11,276,050 | B1 * | 3/2022 | Lightowler | G06T 19/006 |
| 11,436,581 | B1 * | 9/2022 | Walker | G06Q 20/321 |
| 11,803,828 | B1 * | 10/2023 | Walker | G07F 19/203 |
| 12,223,480 | B1 * | 2/2025 | Walker | G07F 19/202 |
| 2012/0075168 | A1 * | 3/2012 | Osterhout | G06F 3/017<br>345/8 |
| 2015/0198446 | A1 * | 7/2015 | Perez | G06Q 20/1085<br>705/43 |
| 2018/0137714 | A1 * | 5/2018 | Schmidt | G07D 11/20 |
| 2018/0150831 | A1 * | 5/2018 | Dolan | G06Q 20/321 |
| 2020/0082367 | A1 * | 3/2020 | Dent | G07F 19/206 |
| 2020/0202313 | A1 * | 6/2020 | Eidam | A61B 5/117 |
| 2022/0215375 | A1 * | 7/2022 | Gupta | G07F 19/206 |
| 2023/0028010 | A1 * | 1/2023 | Pathak | G07F 19/2055 |
| 2023/0078916 | A1 * | 3/2023 | Singh | G06Q 20/3829<br>705/21 |

* cited by examiner 10
54
56
52
58
50
44
60
62
64
42
78
12
14
16

HOST
44
48
46
42
12
INTERFACE
40
34
CONTROLLER
38
36
18
20
CARD READER
22
KEYPAD
24
PRINTER
26
DISPLAY
28
CASH DISPENSER
30
KEYS
32
INPUT DEVICE

START
A
RECEIVE ENCRYPTED DATA
66
CALCULATE NO. OF TXNS IN PRIOR HOUR
68
70
NO
A
?
NO. TXNS EXCEED THRESHOLD?
YES
GENERATE ALERT
72
SEND ENCRYPTED DATA
74
HOLD ALERT STATUS UNTIL RESET
76
A 100
112
110
114
116
122
106
118
104

107
124
128
100
126
114
102
106
104
108
110
112
114
116
118
120
122

130
HOST
INTERFACE
CONTROLLER
3D PRINTER
132
INPUT DEVICE
KEYS
CASH DISPENSER
DISPLAY
PRINTER
KEYPAD
CARD READER

HOST
143
INTERFACE
156
CONTROLLER
CLEANER
146
RECYCLER
144
INPUT DEVICE
KEYS
150
CASH DISPENSER
160
DISPLAY
164
PRINTER
158
KEYPAD
162
CARD READER

B
RECEIVE AMOUNT INPUT
180
PROMPT CLEAN CASH SELECTION
182
INDICATE CLEAN CASH CHARGE
184
RECEIVE CLEAN CASH SELECTION
186
TXN DATA TO HOST
188
RECEIVE HOST RESPONSE
190
192
?
TXN APPROVED?
NO
C
YES
198
?
CLEAN CASH SELECTED
NO
D
YES
E

C
INDICATE TXN DECLINED
194
RETURN CARD
196
A

D
DISPENSE NORMAL CASH
200
PRINT RECEIPT
202
RETURN CARD
204
NOTIFY HOST
206
A

E
DISPENSE CLEAN CASH
212
PRINT RECEIPT
214
RETURN CARD
216
218
NOTIFY HOST
220
REPLENISH CLEAN CASH
A

232
APPLICATION
UTILITIES
236
SECURITY
234
XFS INTERFACE
230
DEVICE DRIVERS
228
O
S
222
226
246
224
BUS
238
240
242
244
CARD
READER
ENCRYPTING
PIN PAD
THUMB
PRINT
READER
CHECK
SCANNER
OTHER
DEVICES

WEARABLE DEVICE FOR SIMULTANEOUSLY VISUALLY PERCEIVING PHYSICAL SURROUNDINGS IN A FIELD OF VIEW OF A USER AND PROVIDING VISUAL OUTPUTS ON A DISPLAY FOR USE WITH FINANCIAL TRANSFERS

TECHNICAL FIELD

Exemplary arrangements relate to machines that are controlled responsive to data read from data bearing records such as user cards and/or documents such as financial checks or currency bills, to cause financial transfers which may be classified in U.S. Class 235, Subclass 379.

BACKGROUND

Automated banking machines may include a reader that operates to read data from a bearer record such as a user card. The automated banking machine may operate to cause the data read from the card to be compared with other computer stored data related to authorized users. The machine operates in response to the comparison determining that the bearer record corresponds to an authorized system user to carry out at least one transaction which is operative to transfer value to or from at least one account. A record of the transaction is also commonly provided and may be printed through operation of the automated banking machine and provided to the user. A common type of automated banking machine used by consumers is an automated teller machine which enables consumers to carry out banking transactions. Banking transactions carried out may include the dispensing of cash, the making of deposits, the transfer of funds between accounts, and account balance inquiries. Such machines may additionally receive, optically scan and resolve data from documents such as financial checks. The types of transactions a customer may carry out with an automated banking machine are determined by the capabilities of the particular machine and the programming associated with operating the machine.

Other types of automated banking machines may be operated by merchants to carry out commercial transactions. These transactions may include, for example, the acceptance of deposit bags, the receipt of checks or other financial instruments, the dispensing of rolled coin or other transactions that are required by merchants. Still other types of automated banking machines may be used by service providers in a transaction environment such as at a bank to carry out financial transactions. Such transactions may include, for example, the counting and storage of currency notes or other financial instrument sheets, the dispensing of notes or other sheets, the imaging of checks or other financial instruments and other types of service provider transactions. For purposes of this disclosure, an automated banking machine, an automated transaction machine, an automated teller machine, or an ATM shall be deemed to include any machine that may be used to electronically carry out transactions involving automated transfers of value.

Automated banking machines may benefit from improvements.

SUMMARY OF DISCLOSURE

An automated banking machine of an exemplary arrangement operates responsive at least in part to data read from data bearing records to cause financial transfers to or from financial accounts of machine users. Other exemplary arrangements provide for improved user interfaces for operation of automated banking machines. Other exemplary arrangements enable persons to cause financial transfers by utilizing wearable mobile devices.

Other exemplary arrangements provide capabilities for enabling users to achieve a more sanitary operating environment in connection with items that are provided by the machine. Other example arrangements provide for the capability of dispensing articles which are produced and/or configured through operation of the machine, to include data representative of value and which can be used or redeemed for goods or services.

Further exemplary arrangements will be made apparent in the following description of exemplary arrangements and the appended claims.

DETAILED DESCRIPTION OF EXEMPLARY ARRANGEMENTS

Figure 1:
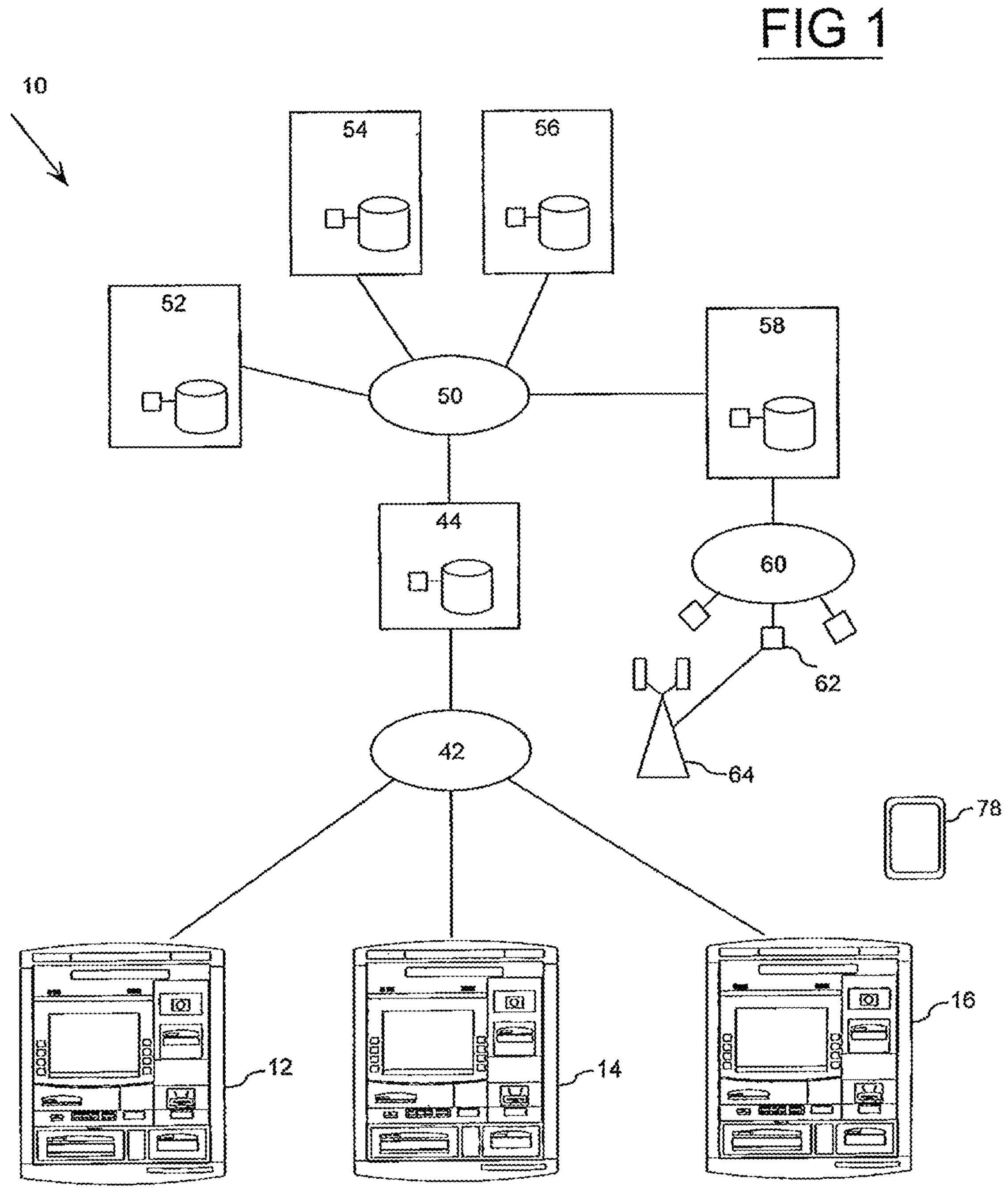
FIG. 1 is a schematic view of a system of an exemplary arrangement including automated banking machines that are operated in response to data read from data bearing records.

Referring now to the drawings and particularly to FIG. 1, there is shown therein an exemplary system 10. System 10 includes a plurality of automated banking machines 12, 14 and 16. Each of the automated banking machines of the exemplary system is operative to cause financial transfers at least one of to or from user financial accounts responsive at least in part to data read from data bearing records. It should be understood that these automated banking machines are exemplary and in other arrangements other types of automated banking machines may be used.

Figure 2:
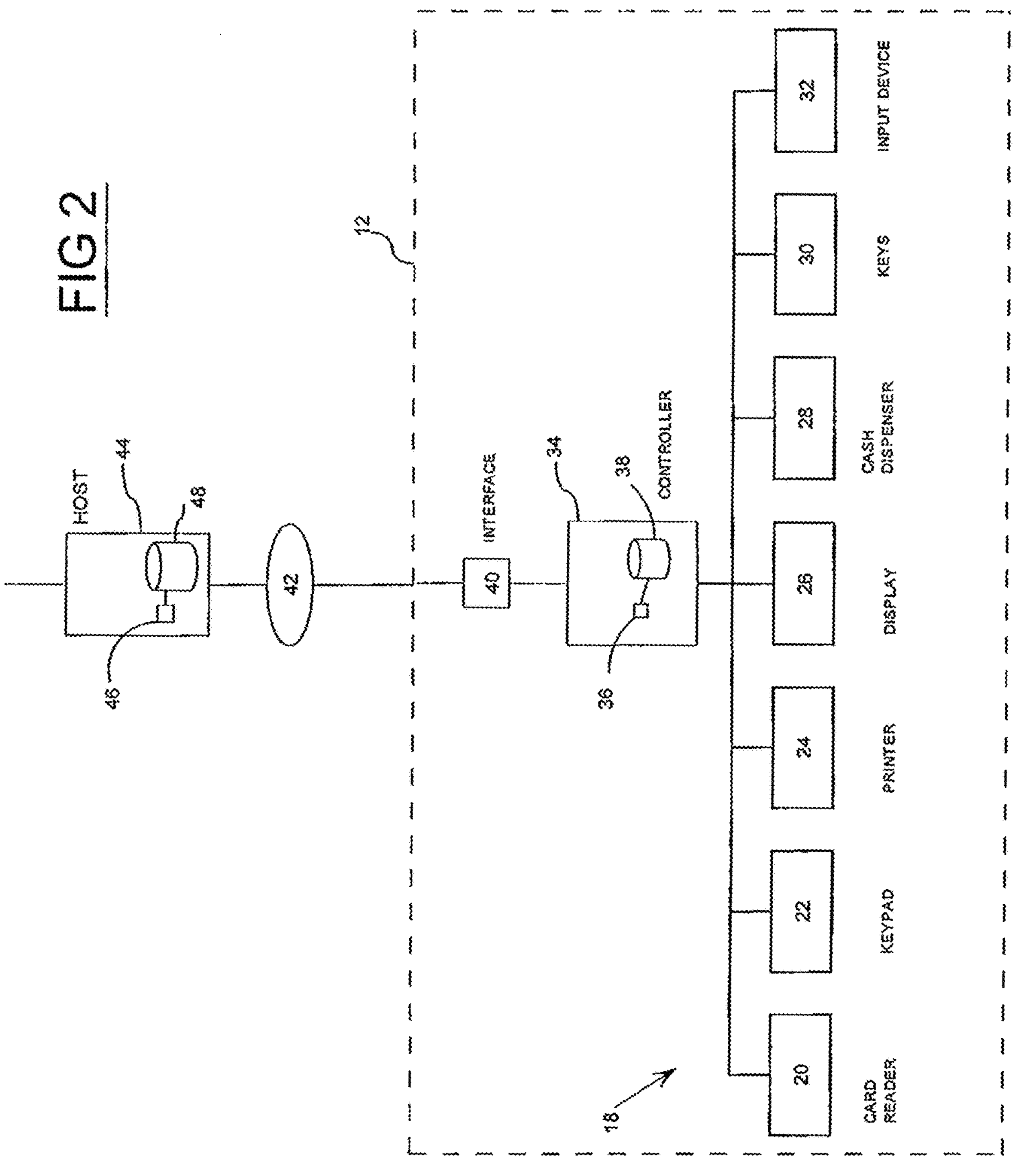
FIG. 2 is a schematic view of the components of an exemplary automated banking machine.

The components of the exemplary automated banking machine 12 are shown schematically in FIG. 2. Automated banking machine 12 includes a plurality of transaction function devices 18. The exemplary transaction function devices in automated banking machine 12 include a card reader 20. Card reader 20 is operative to read data from bearer records such as user cards. The data read through operation of the card reader is usable to identify at least one financial account on which transactions at the machine are to be conducted. The exemplary arrangements may include magnetic stripe card readers, chip type card readers, wireless type card readers or other types of contact or non-contact devices for reading articles which include data that corresponds to financial accounts. In some exemplary arrangements the automated banking machine may include card readers and other features like those described in U.S. Pat. Nos. 7,004,385; 7,284,692; 7,992,776; 7,992,778; and 8,540,142 the disclosures of each of which are incorporated herein by reference in their entirety.

The exemplary automated banking machine further includes a keypad 22. The exemplary machine includes a keypad having a plurality of manually actuatable keys that may be used by machine users to provide inputs. Inputs provided may include alphanumerical inputs or other types of inputs as appropriate to be provided by users for operation of the machine. In exemplary arrangements the keypad may include an encrypting keypad (alternatively referred to herein as an encrypting PIN pad or EPP) which includes internal circuitry that is operative to encrypt inputs that are provided through the keys. Some exemplary arrangements may include features like those shown in U.S. Pat. Nos. 8,540,146; 8,517,262; 7,904,713; 7,896,228; and/or 7,418,592 the disclosures of each of which are incorporated herein by reference in their entirety.

The exemplary automated banking machine 12 further includes a printer 24. Printer 24 of the exemplary arrangement is operative to print paper documents for users of the machine. In some exemplary arrangements the paper documents may include receipts for transactions conducted at the machine. In other exemplary arrangements the printer may be operative to print other documents such as vouchers, scrip, checks, postage or other financial instruments. Some exemplary arrangements may include features like those shown in U.S. Pat. No. 8,424,755 the disclosure of which is incorporated herein by reference in its entirety. Various types of printers may be used in exemplary arrangements such as impact printers, dot matrix printers, laser printers, thermal printers or other suitable types of printers for producing the documents desired to be produced by the machine. It should be understood that some exemplary arrangements may include multiple different types of printers, each of which produce different types of documents that are provided to machine users.

The exemplary automated banking machine further includes a display 26. Display 26 is operative to provide visual outputs to users of the machine. The visual outputs in the exemplary arrangement include instructions to users concerning the operation of the machine. Displays in some exemplary arrangements may include liquid crystal displays, CRT displays, OLED displays or other types of displays that are suitable for providing visual outputs to users.

The exemplary automated banking machine 12 further includes a cash dispenser 28. In some exemplary arrangements the cash dispenser includes one or more mechanisms that are operative to make cash such as currency bills, coin or other currency items stored within the machine selectively available to users of the machine during the course of transactions. In some exemplary arrangements cash dispensers may include mechanisms that operate to provide currency bills to users. For example in some arrangements the cash dispenser and automated banking machine may include features like those described in U.S. Pat. Nos. 8,128,083; 7,261,236; 7,144,006; 6,981,638; and/or 6,945,526 the disclosures of each of which are incorporated herein by reference in their entirety.

Further in other arrangements the cash dispenser 28 may include a currency recycling device. Such currency recycling devices may include for example devices that enable a machine to receive currency bills from users, to validate the received currency bills as genuine, and store such bills within the machine for later dispense to other authorized users. For example some automated banking machines of exemplary arrangements may include features like those shown in U.S. Pat. Nos. 8,251,281; 8,191,771; 8,132,718; 7,992,775; 7,748,615; 7,891,554; 7,971,781; 7,934,642; 6,682,068; 6,131,809; and/or 6,331,000 the disclosures of each of which are incorporated herein by reference in their entirety.

The exemplary automated banking machine further includes a plurality of manually actuatable function keys 30. In some exemplary arrangements the function keys may be disposed at locations adjacent to the display so as to enable users to manually actuate selected keys to make selections output through the display and to provide inputs to the machine. Alternatively other exemplary arrangements may include other types of keys for receiving inputs from users. Such keys may include other arrangements for manually actuatable keys such as a keyboard or other key arrangement. Further in some exemplary arrangements the display may include a touch screen type input device which may include visual representations of keys which can be selected by authorized users to provide inputs to the machine. Of course these types of keys are exemplary of input devices through which users may provide inputs to the machine.

The exemplary automated banking machine 12 further includes an input device 32. Input device 32 in some arrangements includes a wireless portal that is suitable for receiving and communicating wireless signals. This may include for example communicating signals via radio frequency, infrared, Bluetooth™, NFC or other signals that may be received from or communicated with portable wireless devices such as smart phones, portable tablet devices, wearable computers or other items. Further in other exemplary arrangements other types of communications devices may be utilized for receiving inputs and providing outputs from the machine. Of course it should be understood that these transaction function devices 18 are exemplary and in other arrangements, other or additional devices may be used.

The exemplary automated banking machine 12 includes at least one controller 34. The exemplary controller 34 includes one or more circuits which are operative to communicate electrical signals with and control the operation of transaction function devices 18. In the exemplary arrangement the at least one controller 34 includes at least one circuit including a processor schematically indicated 36 and at least one data store schematically indicated 38. In exemplary arrangements the processor may include a processor suitable for carrying out computer executable instructions that are stored in the one or more associated data stores. The processor includes or is in connection with a non-volatile storage medium including instructions that include a basic input/output system (BIOS). For example, the processors may correspond to one or more or a combination of a CPU, FPGA, ASIC or any other integrated circuit or other type of circuit that is capable of processing data and instructions. The data stores may correspond to one or more of volatile or non-volatile memories such as random access memory, flash memory, magnetic memory, optical memory, solid state memory or other devices that are operative to store computer executable instructions and data. Processor executable instructions may include instructions in any of a plurality of programming languages and formats including, without limitation, routines, subroutines, programs, threads of execution, objects, methodologies and functions which carry out the actions such as those described herein. Structures for processors may include, correspond to and utilize the principles described in the textbook entitled Microprocessor Architecture, Programming, and Applications with the 8085 by Ramesh S. Gaonker (Prentice Hall, 2002), which is incorporated herein by reference in its entirety.

The exemplary arrangements may include, for example, processors produced by Intel Corporation such as Intel Pentium processors or Intel iCore series processors. Of course it should be understood that these processors are exemplary of many types of processors that may be used.

The exemplary data stores used in connection with exemplary arrangements may include any one or more of several types of mediums suitable for holding computer executable instructions. This may include, for example, magnetic media, optical media, solid state media or other types of media such as RAM, ROM, PROMs, flash memory, computer hard drives or any other form of media suitable for holding data and computer executable instructions. Some exemplary arrangements may include features like those described in U.S. Pat. No. 8,474,698 the disclosure of which is incorporated herein by reference in its entirety. Exemplary controllers may include other components such as hardware and/or software interfaces for communication with the transaction function devices and external systems and devices.

The exemplary automated banking machine 12 further includes at least one interface 40. Interface 40 may include, for example, a suitable network interface that enables communication between the at least one controller 34 in the banking machine and one or more networks schematically indicated 42. Interface 40 may include one or more circuits which include electrical components suitable to communicate with wired, optical or wireless networks as appropriate for purposes of providing communications with the machine.

As shown in FIGS. 1 and 2 automated banking machine 12 may communicate through one or more networks 42 with one or more host computers schematically indicated 44. First computer 44 includes at least one processor schematically represented 46 which is in operative connection with at least one data store schematically indicated 48. The processors and data stores associated with host computer 44 is operative to carry out computer executable instructions that are stored in at least one data store.

As represented in FIG. 1 in the exemplary arrangement, host computer 44 is in operative communication through one or more networks 50 with financial transaction servers 52, 54 and 56. Each of servers 52, 54 and 56 each include at least one processor and at least one associated data store as schematically shown.

In the exemplary arrangement the system further includes at least one remote computer 58. In the exemplary arrangement at least one remote computer 58 is in operative communication with the system through network 50. Remote computer 58 includes at least one processor and at least one data store as schematically shown. Further in the exemplary arrangement remote computer 58 is also in operative connection with other networks such as network 60 that is schematically shown, as well as other servers 62. Further in the exemplary arrangement the at least one remote computer 58 may be in operative connection with wireless communication networks as schematically indicated 64 as well as other types of public or private networks. The configuration of the particular system will depend on the nature of the system and the types of transactions to be conducted.

In operation of the exemplary arrangement a user at an automated banking machine such as automated banking machine 12 is enabled to carry out transactions involving a user's financial account. This is accomplished in the exemplary arrangement by a user providing to the card reader of the machine, a suitable card such as a credit or debit card that includes card data that is usable to identify the financial account associated with the user. The controller 34 of the exemplary automated banking machine is operative in accordance with its programming to cause the card reader to read the data from the user card. The controller further operates to cause the display to output indicia that prompts a user to input other identifying data to the machine such as a personal identification number (PIN) through the keypad 22 of the machine. The controller then operates to cause the user input PIN or other identifying data to be received through the keypad. Alternatively in some arrangements other or additional identifying data may be received. Such data may include biometric data such as a fingerprint input through an input device such as a fingerprint reader. Other identifying data may include a facial recognition scan, an iris scan, a retina scan, voice recognition or other suitable identifying data that may be input via an input device which can receive such inputs. For purposes hereof each of such types of user identifying input data will be referred to as a PIN.

In the exemplary arrangement the controller 34 operates in accordance with its associated programming to cause the display to output messages to the user which ask the user to select the type of transaction that they wish to conduct through operation of the machine. For purposes of this example, the user will select a cash dispense transaction which the user indicates by providing inputs by pressing the appropriate keys 30 of the machine. In the exemplary arrangement, in response to the user selecting a cash dispense transaction, the at least one controller 34 operates to provide outputs through the display to the user prompting the user to input the amount of cash they wish to have dispensed in connection with the transaction. The controller then operates to cause the user input amount to be received through operation of the keypad 22 or other user input device of the machine.

In response to receiving these items of information from the machine user, the exemplary controller 34 operates in accordance with its programming to cause one or more messages to be sent to the host 44. The messages sent to the host 44 are transmitted through the network interface 40 and through the one or more networks 42 to the host 44. The messages sent by the automated banking machine to the host include data corresponding to the inputs provided by the user to the machine.

In the exemplary arrangement the host 44 operates in accordance with its programming to determine if the data read from the user card corresponds to a user financial account that is authorized to conduct a transaction at the machine. This is accomplished in the exemplary arrangement by the processor 46 of the host 44 determining if the card data corresponds to data stored in the one or more data stores 48 associated with or accessible by the host. In this exemplary arrangement if the data read from the user card corresponds to an account that is authorized to conduct a transaction through operation of the machine, the host then determines if the customer input PIN corresponds to user identifying data associated with that particular account. This is accomplished by comparing data corresponding to the input PIN to data stored in the at least one data store 48. Thereafter if the PIN data that is input corresponds to the PIN associated with the account, the host computer then operates in accordance with its programming to determine if the financial account of the machine user includes a balance that is at least equal to the amount that the user has requested to be dispensed from the automated banking machine. The host computer does this by comparing the financial account data stored in one or more data stores regarding the balance in the account to the amount requested by the machine user.

If the host computer determines that the card data and PIN data are authorized and that the user's account has sufficient funds to enable the user to withdraw the amount requested, the host then operates in accordance with its programming to send one or more messages to the automated banking machine. The messages sent by the host computer are indicative that the transaction requested by the user is authorized to be carried out. Of course it should be understood that in the event that the card data does not correspond to the account of a user authorized to conduct a transaction at the machine or if the PIN data is not appropriate for that account, then the host computer will send one or more messages to the machine that indicate that the transaction is not authorized. Likewise if the host computer determines that the user does not have a suitable balance in their account to cover the requested cash withdrawal, the host computer will likewise send one or more messages indicating that the transaction is not authorized. In cases where it is indicated that the transaction is not authorized, the at least one controller 34 operates in accordance with its programming to provide one or more outputs through the display 26 to indicate to the user that the transaction is declined. The exemplary controller further operates in accordance with its programming to return the user's card to the user through operation of the card reader. Thereafter the machine returns to the waiting state to conduct another transaction that will start with the input of another card.

In the exemplary arrangement if the one or more messages sent by the host to the automated banking machine indicate that the transaction is authorized, the at least one controller 34 operates in accordance with its programming to cause the cash dispenser to operate. The cash dispenser is operated to make available to the user of the machine, cash corresponding to the amount of cash that the user has requested. The exemplary controller also operates in accordance with its programming to cause the printer 24 of the machine to operate to produce a receipt for the user which indicates the details of the transaction including the value of the cash dispensed.

In the exemplary arrangement the controller 34 also includes one or more records in its data store 38 regarding the carrying out of the transaction and the fact that the cash was dispensed. Further the controller operates in accordance with its programming to send one or more messages to the host computer 44 to indicate that the cash dispense was successfully carried out for the user. In response to the receipt of such messages, the exemplary host operates in accordance with its programming to assess a charge to the user's account corresponding to the value of the cash dispensed.

Of course the process described is utilized for authorizing transactions in situations where host 44 has access to the data necessary to authorize financial transfers for the particular user at the machine. In some exemplary transactions, the host 44 may not have direct access to the data associated with the particular user's account that is sufficient to authorize the user's requested transaction. In such arrangements when the host 44 receives the data related to the requested transaction, the host 44 will operate in accordance with its programming to determine that it does not have the capability to determine whether the transaction requested should be authorized. In such arrangements the host 44 operates in accordance with its programming to route the transaction data in one or more messages to the appropriate network such as network 50 which includes the remote server such as server 52, 54 or 56 that can determine whether the transaction should be authorized.

In the exemplary arrangements the transaction data routed to the appropriate remote server is then analyzed in a manner like that previously described in connection with host 44 to determine if the card data corresponds to an account that is authorized to conduct a transaction through operation of the machine. Further the appropriate remote server operates in accordance with its programming to determine if the customer input PIN corresponds to an authorized user of the account and whether the user account has sufficient funds to cover the requested cash withdrawal. The remote server then operates in accordance with its programming to communicate through the network 50 to the host 44, messages which include information on whether the transaction requested is to be authorized or denied. The host 44 then communicates the appropriate messages to the machine. If the transaction is authorized, the machine communicates that it successfully carried out the transaction to the host 44. The host 44 then communicates this information through the one or more networks 50 to the appropriate remote server. The server then causes the user's account to be assessed an amount corresponding to the value of the cash dispensed.

It should be understood that the approaches described are exemplary. In addition other types of transactions such as deposits, account balance inquiries, check deposit transactions, check cashing transactions, converting electronic value stored on a mobile device to cash or vice versa, cash accepting transactions, or other types of transactions may be conducted in other exemplary arrangements. Further exemplary systems may include features like those described in the following U.S. Patents, the disclosures of which are incorporated herein by reference in their entirety: 10,825,005; 9,520,034; 8,365,985; 8,376,219; 8,336,769; 7,934,644; 7,857,208; 7,844,512; 7,819,309; 7,689,509; 7,653,601; 7,582,944; 7,533,805; and 6,966,487.

In some exemplary arrangements the at least one remote computer 58 operates to identify situations where fraudulent transactions may be occurring. For example in some situations where card data and PIN data for a financial account has been stolen by criminals, numerous fraudulent cards may be produced by criminals in different parts of the country or in various countries of the world. These criminals may conduct numerous frequent transactions on the account until the account balance is depleted. Often these transactions may be occurring at numerous different automated banking machines or at other types of terminals where value is given, such as at a point of sale or service in diverse locations. The fact that numerous transactions are occurring in rapid succession on a given account may not be realized until after the criminals have successfully depleted a significant portion of the funds in the account for which the card and/or PIN data or other authorized user data that enables carrying out transactions has been stolen.

In the exemplary arrangement at least one remote computer 58 is operated to identify situations where transactions are occurring on a particular account and to provide an alert message in the event a particular account is having an abnormally high number of transactions attempted thereon. By determining that a particular account is experiencing an abnormally high level of activity, the remote computer can provide the alert message so as to enable the entity which holds the account to take appropriate action such as to suspend all further transaction activity.

Further in the exemplary arrangement the at least one remote computer does not have the capability to identify the account number or other data for the particular account. Rather the remote computer receives encrypted or other data which is unique to each account but which cannot be utilized to determine the actual account number. Thus the at least one remote computer does not have the associated security risks that would be associated with having such actual account data transmitted thereto over wide area networks, or even public networks, which may be accessed by unauthorized persons.

In the exemplary arrangement the host computer 44 as well as each of the remote servers, for example servers 52, 54 and 56, each have associated programming that operates to produce encrypted data that corresponds to the account number data for each transaction that is requested at an automated banking machine. In exemplary arrangements the encrypted data may correspond to a one-way hash or other algorithmic result that is produced from the account number data either alone or in combination with other data. The algorithmic result that is produced results in encrypted data that in the exemplary arrangement is unique to the particular account number, but that may not be used to resolve the account number except by the particular computer that produced the encrypted data. In some exemplary arrangements the encrypted data may be used directly for purposes of comparison while in other arrangements the encrypted data may need to be mathematically manipulated using other values in order to resolve data that may be compared to other data to identify a common account. Further in the exemplary arrangements the host computer 44 and other servers may operate to provide secure communication through the one or more networks 50 with the at least one remote computer 58. Such secure remote communication may include various approaches such as secure socket layer communications or public key cryptography that ensures that the encrypted data sent from the originating computer is multiply encrypted and can only deliver the encrypted data to the at least one remote computer 58. Of course these approaches are exemplary and in other arrangements other approaches may be used.

Figure 3:
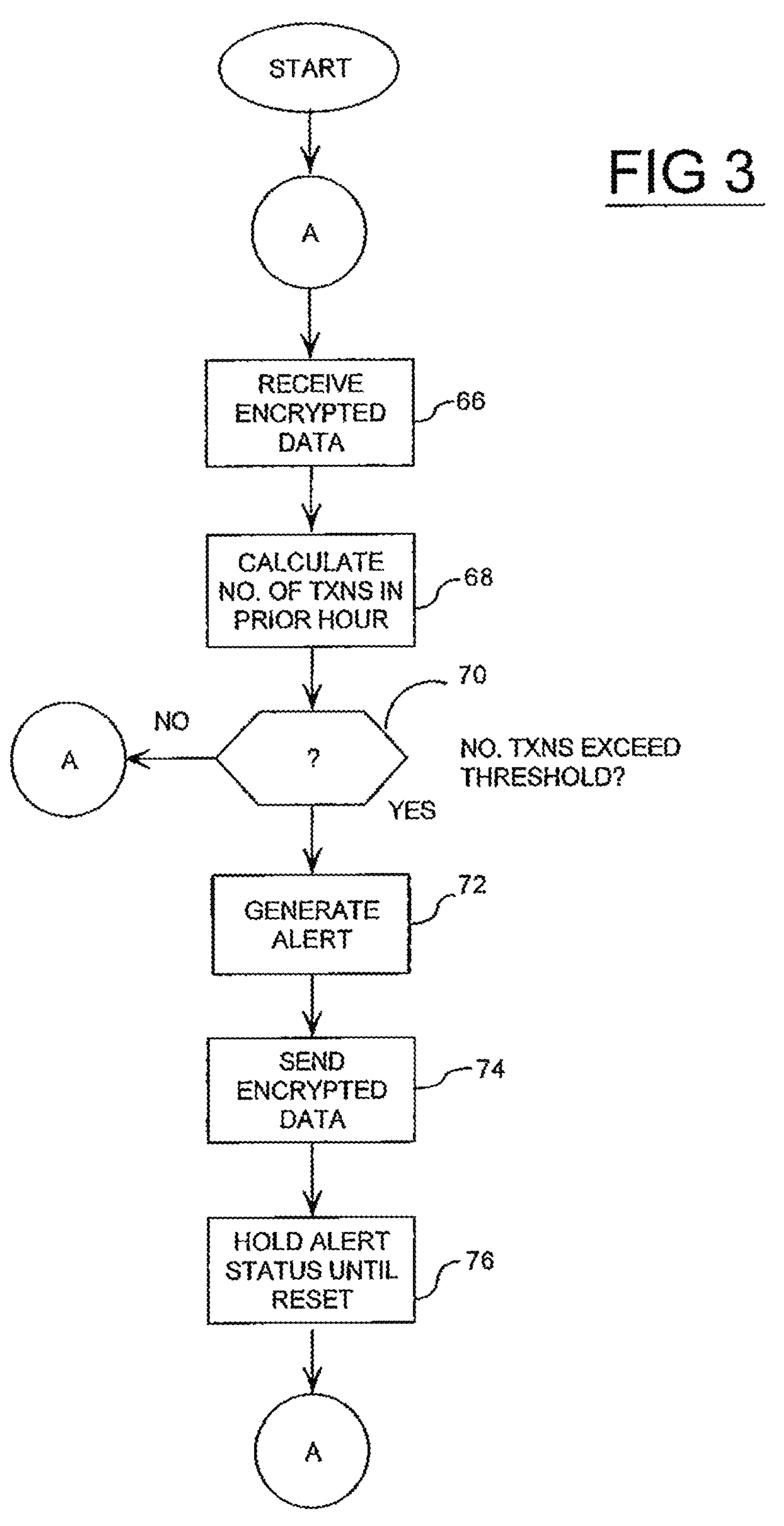
FIG. 3 is a schematic view of steps carried out in operation of at least one remote computer in connection with an exemplary banking machine system.

Logic carried out by the at least one remote computer 58 is represented schematically in FIG. 3. In the exemplary arrangement the at least one remote computer operates to receive the encrypted data from the host computer or server that has received a transaction request related to an account. This is represented by a step 66. The at least one computer then operates in accordance with its programming to review the received encrypted data and to calculate the number of other transactions in which the same or corresponding encrypted data that corresponds to the same account has been received within a prior time period. This may include, for example, a time period which is a rolling window, such as the previous one hour. This is represented by a step 68. Of course it should be understood that this approach is exemplary and in other arrangements other calculations may be made, such as a total number of transactions that have been conducted on the particular account, the elapsed time since the last transaction or the number of transactions that were conducted within a fixed time window. Various approaches may be taken depending on the particular analysis to be conducted to identify an abnormal situation which represents a possible circumstance involving stolen card data.

In the exemplary arrangement the at least one remote computer 58 operates in accordance with its programming to determine based on the calculated number of transactions, whether the transaction count has exceeded a programmed threshold. This is represented in a step 70. If the number of occurrences of receipt of the encrypted data which represents the number of transactions carried out on a particular account, does not exceed the threshold based on the receipt of the most recent occurrence, the computer operates in accordance with its programming to defer any action. However, in the event that the number of transactions has exceeded the programmed threshold within the set rolling time window, the at least one computer operates to generate one or more messages or statuses which comprise an alert. This is represented by a step 72. In some exemplary arrangements the at least one computer may be operated to respond promptly to the received encrypted data so as to indicate to the server or host computer generating the encrypted data that there is a possible problem. This received data is usable by the server or host computer to cause a denial of the then pending transaction and/or further transactions which are requested on the account. In alternative arrangements other analysis in accordance with the programming of the remote computer 58 may be conducted. This may include for example evaluating the timing between successive transactions. In this case the computer determines if transactions are happening more quickly than a threshold, and if so, generates a signal corresponding to an alert. In some arrangements the computer may monitor and evaluate multiple factors in determining whether to generate an alert.

Further in the exemplary arrangement responsive to the generation of the alert, the at least one remote computer 58 is operative to send the data corresponding to the encrypted data to other computers operatively connected in the system that might receive transaction requests related to the account. The sending of this encrypted data to the computers causes the computers to operate in accordance with their programming to store in their associated data stores the encrypted data or other data that is produced when a transaction on that account is requested. Thus by holding the data corresponding to the encrypted data or data that can be used to identify a transaction requested on the same account in the one or more data stores associated with the servers 52, 54 and 56 as well as host 44, such systems may immediately take appropriate steps in accordance with their programming, such as to deny a transaction whenever a transaction on an account is requested and the mathematical manipulation of that account data to produce encrypted data corresponds to the encrypted data for which the alert has been generated. Further in some exemplary systems the receipt of the alert message and encrypted data which can be used to identify transactions which may be suspect, may be utilized by the hosts, servers and remote computer to take steps to try to minimize loss associated with the possible fraudulent transactions. This may include, for example, notifying authorities of the particular transactions which were conducted recently on the account and/or the locations where such transactions occurred. It may also include storing and/or transmitting video surveillance data or taking other appropriate steps that may be useful to identify and apprehend criminals who may be conducting fraudulent transactions on the account.

In the exemplary arrangement the at least one remote computer 58 is operative to maintain the alert status associated with the particular encrypted data until certain programmed steps are taken. For example, such status may be maintained until the at least one remote computer receives messages that the alert status associated with that particular encrypted data should no longer be maintained. This is represented by the step 76.

Figure 4:
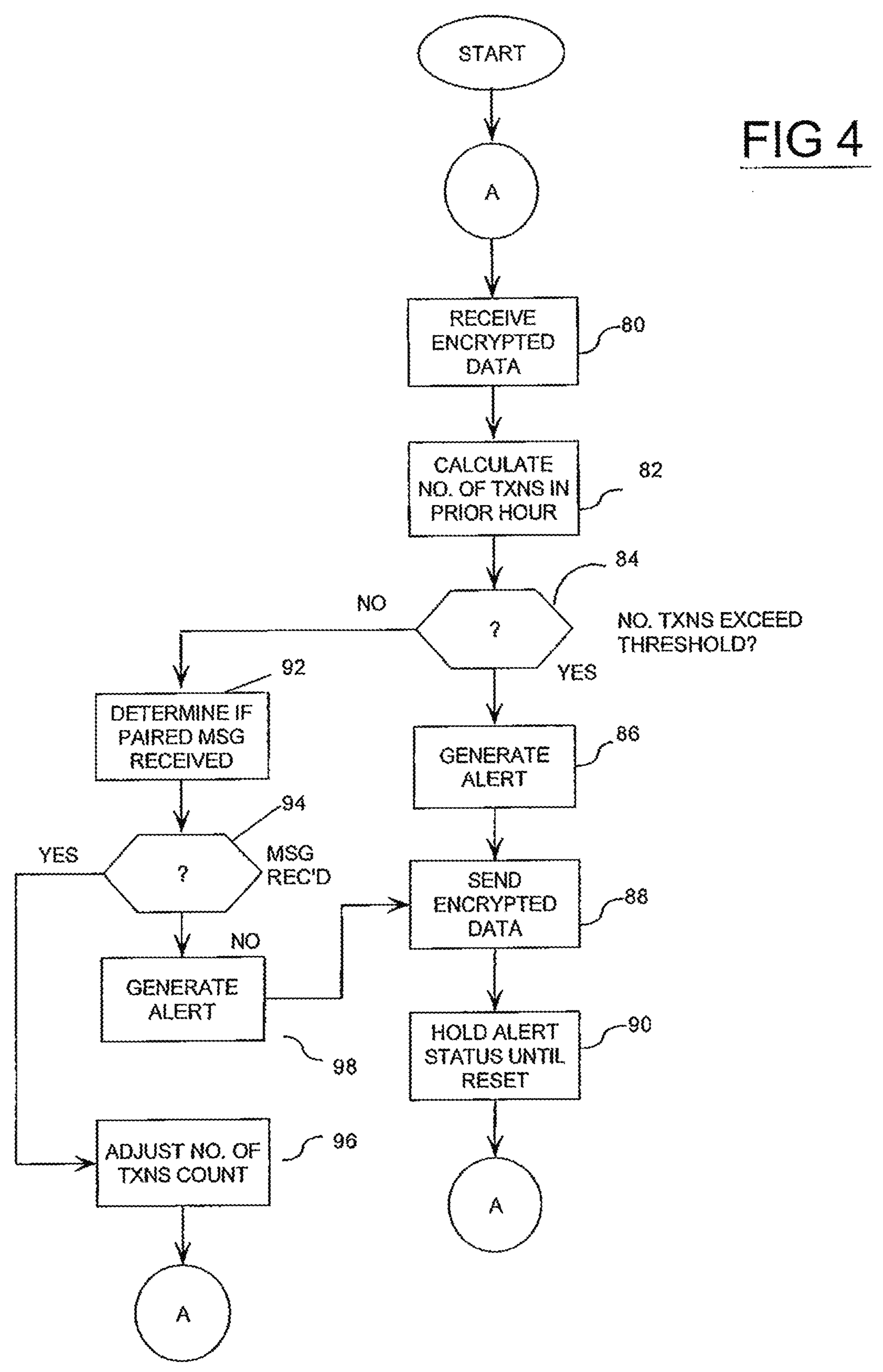
FIG. 4 is an alternative schematic view of steps executed by at least one computer in connection with an automated banking machine system of an exemplary arrangement.

Of course, it should be understood that the foregoing approach to identifying a possible situation where account data has been stolen and is being used fraudulently is exemplary, and in other arrangements other approaches may be used. This may include, for example, including suitable programming in the at least one controller 34 associated with each automated banking machine. Thus for example the controller may be programmed to produce the encrypted data directly and to send this encrypted data either through the associated host or through other connected networks to the at least one remote computer which identifies the possible occurrences of fraudulent transactions on a stolen account. In addition as previously mentioned, in other exemplary systems, rather than having a common approach to producing encrypted data where the same data corresponds to a common account, other approaches may be taken so as to send other data which can be resolved through appropriate programmed steps executed by the at least one remote computer 58 to identify that the encrypted data sent from different sources corresponds to a common account. This may be done, for example, by programming of the automated banking machines, the host computer and the servers in different ways to produce the encrypted data, and by providing programming that enables the at least one remote computer to identify that the different types of encrypted data correspond to one particular account. Further these approaches are useful in the exemplary arrangement because with the remote computer being incapable of determining the actual financial account data from the encrypted data, the financial account data remains secure. This is true even if the encrypted data is transmitted through an insecure network such as the Internet. Of course, it should be understood that these approaches are exemplary and in other arrangements, other approaches may be used. FIG. 4 shows an alternative arrangement in which one or more computers 58 may be operated to identify unauthorized transactions, as well as circumstances where account data may be stolen. In this exemplary arrangement transactions are carried out on the account using a mobile wireless device such as a smart phone 78 represented schematically in FIG. 1. It should be understood that in exemplary arrangements a wireless device may correspond to other types of devices such as tablet computers or wearable computers which are usable by consumers to conduct transactions at an automated banking machine. Alternatively the wireless device may correspond to an article associated with a user such as a user's vehicle which incorporates one or more computers within the circuitry thereof.

In the exemplary arrangement the mobile wireless device is operative to cause data corresponding to the financial account to be sent to the automated banking machine at which the user wishes to conduct a transaction. This may be done, for example, by the mobile wireless device sending data from the device wirelessly through the input device 32 of the automated banking machine. The mobile device may be operative to cause the automated banking machine to receive data that is usable to identify a financial account. This may be done, for example, in some arrangements by the mobile device sending the automated banking machine data which corresponds to an account number directly. Alternatively in some arrangements the mobile wireless device may cause communications with other systems which then cause the automated banking machine to receive data which corresponds to or is usable to resolve the account number. For example in some exemplary arrangements systems may include features like those described in the following U.S. Patents which are incorporated herein by reference in their entirety:

8,281,989; 8,376,221; 8,474,707; 8,052,048; 7,216,800; 7,201,313; and 8,480,307. Of course these approaches are exemplary and in other arrangements other approaches may be used.

In the exemplary arrangement at least one processor included in circuitry of the mobile wireless device 78 may operate in accordance with its programming to cause encrypted data that corresponds to the financial account on which a transaction is to be conducted to be sent to the at least one remote computer. This may be done for example through communication via wireless networks 64. Further as the automated banking machine host computer or server which receives the requested transaction also sends encrypted data that corresponds to the account, this enables the at least one remote computer to identify a common pair of communications having encrypted data that are both received close in time for each authorized transaction. The at least one remote computer 58 is programmed to identify circumstances where both instances of the encrypted data for the given transaction have not been received and to identify such circumstances as a possible situation where a fraudulent transaction may be occurring. The logic associated with such a remote computer that identifies such circumstances is represented in FIG. 4.

In this exemplary arrangement the at least one remote computer 58 receives the encrypted data associated with the account either from the mobile wireless device, server, host or automated banking machine as represented in step 80. As in the prior example the at least one remote computer operates to calculate the number of transactions indicated as attempted on that account within a given time period. This is represented by a step 82. If the number of transactions is determined to have exceeded the threshold, as represented in a step 84, the at least one computer executes steps similar to those in the prior example. These include generating an alert, sending the encrypted data to the remote systems and holding the alert status until it is reset. This is represented in steps 86, 88 and 90 respectively.

In this exemplary arrangement, in situations where the at least one remote computer is expecting to receive two paired messages in closely spaced time relation in order to indicate that a transaction is authorized, the at least one computer operates in accordance with its programming to determine if the two paired messages associated with the one transaction were received. This is accomplished by the at least one remote computer comparing the messages received with the encrypted data that corresponds to the particular account and the timing associated with the receipt thereof. This is represented in a step 92. A determination is made in a step 94 concerning whether the two paired messages for the common transaction were received. If the two paired messages for the single transaction were received close in time as would be normally expected, then the at least one remote computer 58 operates in accordance with its programming to not indicate that there is a problem. In the exemplary arrangement the at least one remote computer operates in accordance with its programming to adjust the transaction count of transactions on the account to accommodate that two messages are received for each transaction. This is represented in a step 96.

Thereafter the at least one remote computer operates to continue to monitor for any potentially problematic conditions.

However, if in the step 94 it is determined that paired messages from the mobile wireless device and from the automated banking machine, host computer or server computer receiving the transaction request were not both received, the computer operates in accordance with its programming to identify an abnormal condition and to generate an alert. This is represented in a step 98. As can be appreciated, the absence of both messages of the expected pair may represent a circumstance where a transaction has been attempted by a criminal or unauthorized person who is not using the authorized mobile wireless device, but is instead providing the account data from an unauthorized source such as a counterfeit card or other fraudulent input device. Alternatively the condition may represent the circumstance where criminals have set up a fraudulent terminal to receive transaction data so as to capture the data for purposes of conducting fraudulent transactions. In either case these circumstances represent a suspect condition.

In the exemplary arrangement the computer operates in accordance with its programming to identify that there is an abnormal condition associated with the account as appropriate to the other computers in the systems. This will enable such computers to identify further attempted transactions on the account and to deny them in accordance with their programming. Further the at least one computer operates in accordance with its programming to hold the alert status associated with the account until it is reset.

Of course it should be understood that these approaches are exemplary and in other arrangements, other additional steps and arrangements may be taken similar to those described herein for purposes of identifying suspect transactions and for denying such transactions and reporting criminal activity.

Figure 5:
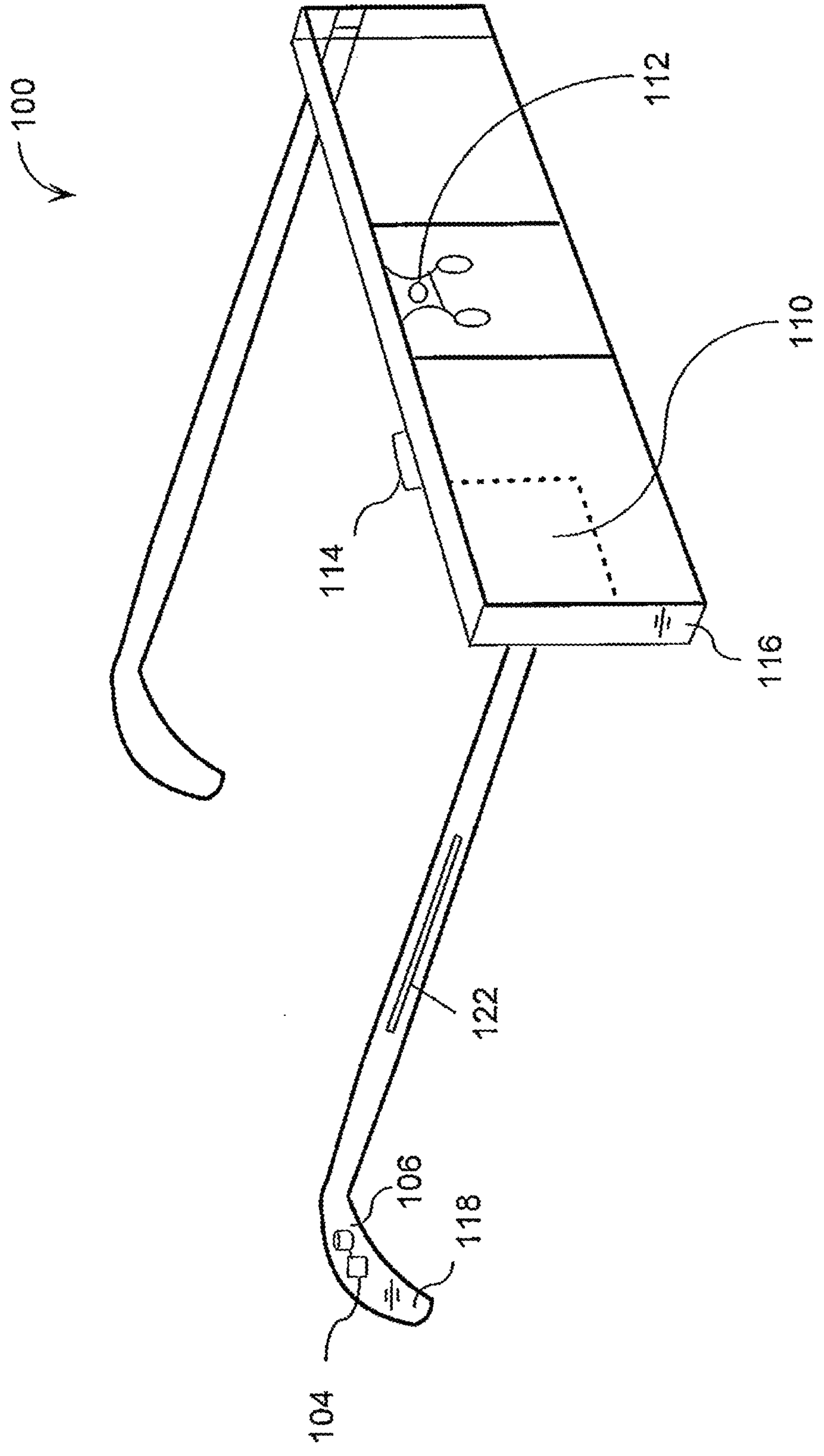
FIG. 5 is an isometric view of an exemplary user wearable mobile wireless device.

FIG. 5 shows an exemplary arrangement of a mobile wireless device generally indicated 100 that may be used in connection with an automated banking machine or otherwise for purposes of carrying out financial transactions. Device 100 may alternatively be referred to herein as a portable wireless device. The exemplary device 100 is configured as a wearable device and specifically wearable glasses. However, it should be understood that in other arrangements other configurations of devices may be used. For example, configurations similar to that of a wrist watch, a medallion or a hat or other item of clothing may be used. The exemplary arrangement of wearable device 100 includes at least one circuit which is operative to control the operation of devices that are included as part of the mobile wireless device. The at least one circuit designated 102 in FIG. 6 includes at least one processor 104 and at least one associated data store 106 which may be of the types previously described.

The exemplary arrangement further includes a source of electrical power such as a battery 108. The exemplary arrangement further includes at least one generally transparent display 110, such as a transparent lens or lenses upon which images are displayed, an outward facing camera 112 and an inward facing camera 114. In exemplary arrangements the transparent display may include both lenses of the glasses. This enables the user wearing the glasses to perceive visually the physical surroundings in a direct field of view and also visual outputs through the display. As the user may perceive both physical items in their direct field of view as well as items displayed on the transparent display, the exemplary wearable device comprises augmented reality glasses. The exemplary arrangement further includes a microphone 116 and a speaker 118. The exemplary arrangement further includes at least one wireless communication device referred to herein as a portable wireless transmitter 120. The wireless transmitter 120 is suitable for transmitting wireless signals between the mobile wireless device 100 and other devices. The wireless transmitter 120 may include a short range wireless transmitter such as a short range RF transceiver or a Bluetooth™ transceiver. Alternatively the at least one wireless transmitter may include an infrared transceiver. Alternatively the wireless transmitter may include a transceiver suitable for communication via a cellular telephone network, WiFi or other wireless network. Further in some arrangements of the mobile wireless device the apparatus may include multiple types of wireless transceivers depending on the nature of the communications to be carried out through operation of the device.

Figure 6:
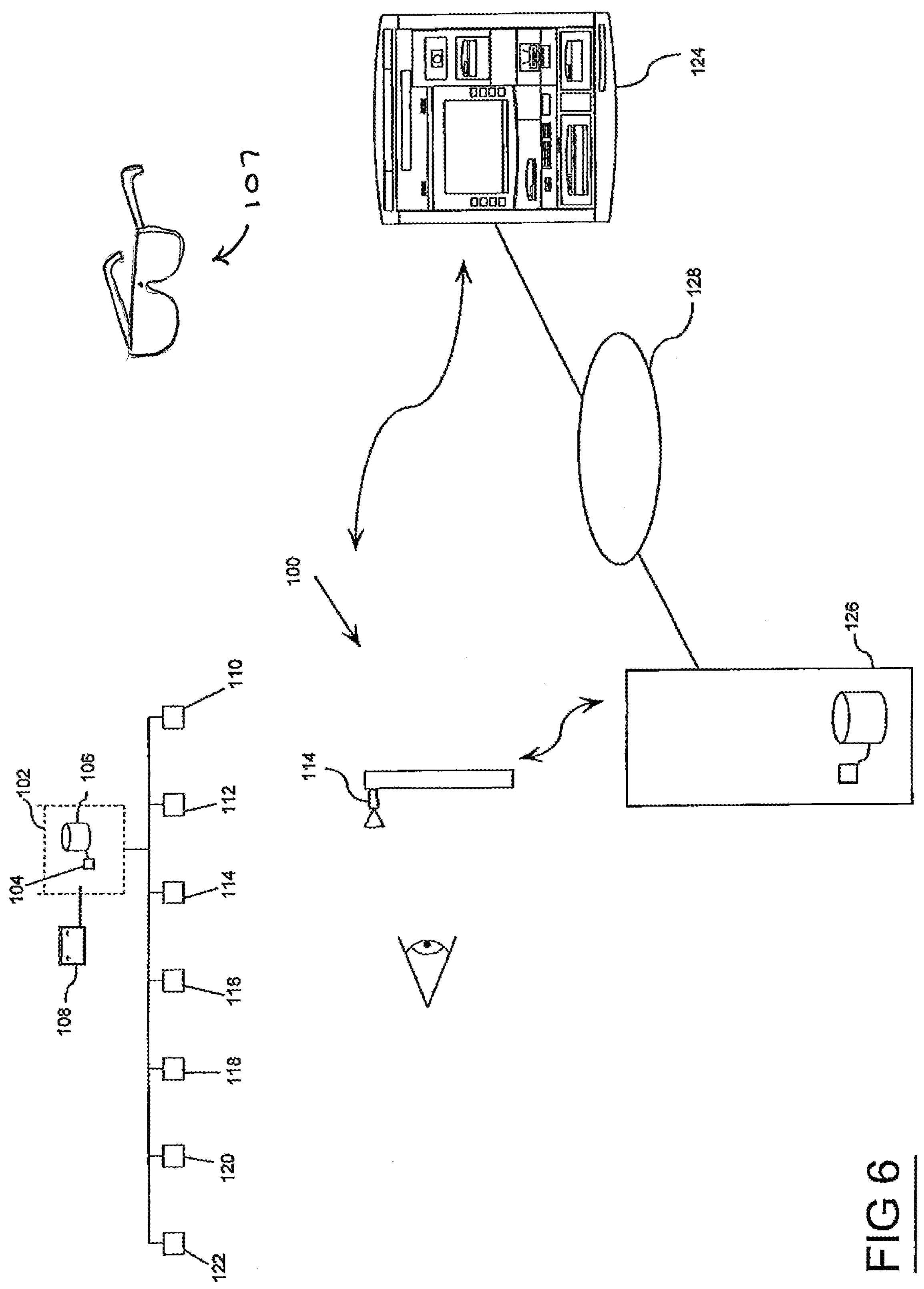
FIG. 6 is a schematic view showing components of the wearable mobile wireless device operating in connection with components of an automated banking machine system.

As represented in FIG. 6, exemplary arrangements of the mobile wireless device may operate to carry out financial transfers. This may be done through communication with an automated banking machine in one of the ways described in the incorporated disclosures. In other arrangements the mobile wireless device may cause financial transfers through communications either directly or through an intermediate device such as a smart phone via a cellular network, a local wireless network or other local or wide area network. The exemplary mobile wireless device is operative to include data in its data store or is enabled to access remote data that is usable to identify a financial account. In the exemplary arrangement the data store of the mobile wireless device also includes data that corresponds to a user biometric feature. In some exemplary arrangements this may include programming in the data store that includes data that corresponds to the topography of an authorized user's iris topography of one or both of the user's eyes. The user's iris topography uniquely identifies the authorized user and can be captured through the use of at least one inward facing camera 114. Further in some exemplary arrangements the mobile device may include multiple inward facing cameras or other cameras that can capture iris topography of both irises of the authorized user. In addition or in the alternative other mobile devices may include capabilities for identifying a user's facial topography, retina features and/or other biometric features that can be utilized to identify the user.

Responsive to the inward facing camera or cameras 114 capturing data corresponding to the user's iris topography or other identifying data, the circuitry 102 may operate in accordance with its programming to verify that the mobile device is being operated by the authorized user. This may be done by comparing captured electronic image data to stored data to determine whether there is correspondence or another predetermined relationship which indicates the user is an authorized user. Responsive to such verification determination the authorized user may then provide instructions to the mobile device in connection with carrying out a financial transaction and the mobile device will operate in accordance with its programming to execute instructions responsive to such commands. This may be accomplished in some exemplary arrangements by the user providing spoken commands that are received by the microphone 116 and determined as transaction related inputs through operation of the control circuit 102. Alternatively the user may be presented with menu options or similar options through the display 110, which options the user may select. Selections may be made and input in some arrangements by providing spoken commands that correspond to the options. Alternatively the user may provide selected inputs which enable selecting transaction options output on the display through moving a finger along a tactile sensing bar or other similar input device 122. In still other exemplary arrangements the user may provide inputs through eye movements or line of sight determinations which are detected by the one or more inward facing cameras 114. This may be done for example by utilizing features such as those described in U.S. Pat. Nos. 8,220,706 and/or 8,883,008 the disclosures of which are incorporated herein by reference in their entirety. For example in some exemplary arrangements the circuitry connected with the at least one camera 114 may determine a location where a user eye is looking on the display 10. By determining what particular transaction selections or options the user is looking at, the control circuitry may determine user provided inputs. For example in some instances the user may look at a particular selection being provided on the display and designate that selection by blinking one eye or both eyes. When this is done the control circuitry may then operate to provide additional outputs and/or messages that enable carrying out the transaction selected by the user.

As represented in FIG. 6, the mobile wireless device 100 may be used for example to send data associated with a user desired transaction to an automated banking machine 124. Such data may include data such as card data that is usable to identify a user's account. Such data may be stored in the at least one data store 106 and then transmitted wirelessly to the machine. Further in some arrangements the user may select through the mobile wireless device an account, a transaction type and/or an amount associated with a transaction that they wish to conduct. Data corresponding to these items of information may be included in messages transmitted to the automated banking machine and received through a wireless portal on the machine. This may be done in any one of several ways that are described in the incorporated disclosures or in another suitable manner.

Alternatively in some arrangements the mobile wireless device 100 may communicate data to at least one server referred to herein as a server 126 that is remote from the automated banking machine. The server 126 may utilize the data sent from the mobile wireless device to resolve transaction data that is needed by the automated banking machine to carry out the transaction. This may include, for example, account data or other data such as amount data, PIN data or other data that is needed by the machine 124 for purposes of carrying out the transaction. This data may be transmitted from the server 126 to the machine through one or more networks 128. This approach may be utilized, for example, when the mobile device does not include data that directly corresponds to the account information, but rather pseudo data that may be utilized by one or more remote servers to determine the actual account information. Thus for example server 126 may include in its associated data store, data that associates the pseudo data that is provided from the mobile wireless device with the actual account data. The actual account data may then be sent in an encrypted and secure manner to the automated banking machine. This approach may avoid the need, for example, for the mobile wireless device to have included in its data store actual account number data.

Also in other alternative arrangements the mobile wireless device may use its outward facing camera 112 to capture data that is output on the display or other output device of the automated banking machine. Such output data may be used in the manner of the incorporated disclosures to identify a particular machine at which a transaction is to be conducted. This identifying data or data based thereon may then be transmitted to the remote server so as to enable user operation of the automated banking machine. Alternatively or in addition data captured through the outward facing camera of the mobile device may correspond to values, functions and/or instructions that may be utilized for purposes of encrypting account data that is stored in a data store of the mobile wireless device. For example, bar codes such as a QR CODE® output through a banking machine display may provide values or instructions utilized for purposes of encryption of account data. Such encrypted account data may then be sent to either the automated banking machine and/or the remote server for purposes of securing the account data to reduce the risk that it can be intercepted during the transaction. This may be done a number of different ways including those described in the incorporated disclosures as well as in other suitable ways depending on the particular operation of the system.

In this manner a user may accomplish transaction steps through the wearable mobile wireless device or other user device for purposes of carrying out financial transfers. Further it should be understood that although in the exemplary arrangement the mobile wireless device is used in connection with an automated banking machine to accomplish transactions, in other arrangements other devices and systems may be utilized and messages from the mobile wireless device may accomplish financial transfers, account balance checking, bill payment, check capture or other desired transaction operations. For example in some exemplary arrangements the mobile wireless device may utilize an outward facing camera for purposes of capturing an image of a check. The user may provide instructions either verbally or through input devices to capture the image of the check and then cause the check to be deposited in the user's account. This may be done, for example, in the manner shown in U.S. Pat. Nos. 8,418,916; 8,286,867; and/or 8,104,676 the disclosures of each of which are incorporated herein by reference in their entirety. Further in other exemplary arrangements data corresponding to electronic tickets or other items representative of value may be loaded into the memory of the mobile device. This may be done, for example, through capturing images thereof through the outward facing camera or otherwise through transmission wirelessly to the device. The mobile wireless device may thereafter be utilized to transmit data which may be utilized for purposes of redeeming or utilizing the items of value. This may be done, for example, through approaches described in U.S. Pat. No. 8,387,864 the disclosure of which is incorporated herein by reference in its entirety. Of course these approaches are exemplary, and in other arrangements other approaches may be used.

Further other exemplary arrangements of the mobile wireless device may be useful to accomplish other transaction functions. For example in some exemplary arrangements the circuitry associated with the mobile device may be programmed to identify genuine items of value such as currency bills. This may include, for example, executable program steps that are usable to verify that visible and/or other sensor perceivable authentication features are present in a particular currency bill. Thus, for example, a user may operate the mobile wireless device to capture one or more images of a currency bill through operation of the outward facing camera 112. This may be done, for example, by the programmed instructions associated with the mobile device instructing a user through audible prompts or the visual outputs through display 110 to look at certain features on a currency bill. The control circuitry of the mobile wireless device may operate to utilize the eye tracking capability to monitor the eye or eyes of a user to direct or analyze areas in the field of view of the outward facing camera at which the user is looking, to a series of features that may identify a currency bill as genuine. In this way the front and/or back of a currency bill may be analyzed to verify that indicia or other visible features indicative of genuineness of the bill are present. In addition alternative exemplary arrangements may include infrared, ultraviolet and/or spaced cameras for purposes of capturing images of authenticity features. Alternatively a user may be prompted to take certain steps with one or more separate devices. This can include illuminating certain areas with radiation at certain frequencies, tilting the bill, bringing the bill closer to the camera to detect features or testing for magnetic or other sensed properties. The camera may capture features or indications of properties or characteristics that are indicative of whether notes are genuine. This approach may be utilized in some exemplary arrangements to enable a user to identify counterfeit or suspect notes that a user receives in a transaction environment and to decline such notes as may appear to be suspect.

Further in some example arrangements the wireless communication capability of the mobile wireless device may enable the user to operate the mobile device to analyze, verify or record data in one or more data stores that correspond to the genuine or suspect status of currency bills that are analyzed through operation of the mobile device. Thus in this manner the user can avoid accepting counterfeit currency bills that may be attempted to be passed to the user.

Alternatively or in addition the mobile wireless device may be operative to verify the authenticity of other items or documents. This may include, for example, the capability to identify the genuineness of a credit or debit card through analysis of the visual or other non-contact sensor detectable features included thereon. Thus for example a merchant who wishes to accept a credit or debit card may utilize the mobile wireless device to analyze the features that are on the card including holograms, security codes, or other features that identify the card as genuine. Further in some arrangements such cards or other items may include wireless transmitters or other similar items, such as RFID tags that can be utilized to output signals which can indicate that the card or other item is genuine. The mobile device may include appropriate sensors to capture and analyze such signals and properties and may operate one or circuits that include processors to determine if the card or other item is genuine.

Further in some exemplary arrangements the mobile wireless device can capture image data or wireless data from the card or other record including for example account number data, verification codes, name data or other items that are usable to carry out a financial transaction. In such arrangements, for example, an operator of the mobile wireless device may utilize the mobile wireless device to obtain the data from a card that is necessary to identify the particular account with which the card is associated and also to verify the genuineness of the card. In this manner by providing instructions to the mobile wireless device, the operator of the device is enabled to accept payments or otherwise accomplish functions that involve a transfer to or from the account associated with the particular card. Such an approach may enable the operator of the mobile wireless device to accomplish the acceptance of credit card and/or debit card payments without a need to have a separate terminal that operates to receive the card, read data from a stripe or computer chip on the card, or otherwise to identify the particular card as genuine and authorized to conduct the transaction. Other exemplary arrangements may include features and capabilities such as those described in U.S. Pat. No. 11,727,374 the disclosure of which is incorporated herein by reference in its entirety.

In still other exemplary arrangements, the mobile device may be utilized to identify features which are indicative of authenticity on articles which are items of value such as event tickets, gaming tickets, lottery tickets, coupons, vouchers, scrip or other items. In this manner the mobile wireless device may be programmed to utilize image data and/or other data which can be visually or wirelessly read by the device, or with the aid of another device, to determine the genuineness of such articles. Of course these approaches are exemplary and in other arrangements other approaches may be used.

In still other arrangements the mobile device may be utilized to provide useful features in connection with conducting transactions in transaction environments where cash or other items of value are accepted by merchants or similar entities. For example in some establishments, merchants may prefer to receive cash payments for the goods and services they provide. Cash payments have the advantages that they avoid the risks and costs that may be associated with taking payments by either credit or debit cards. Some establishments even provide automated banking machines that dispense cash within their establishment so that users can readily obtain cash for purposes of making purchases. However, such automated banking machines that dispense cash in merchant establishments may commonly charge a fee for purposes of conducting the transaction. This fee may be several dollars in some cases.

In order to facilitate the use of cash in some transaction environments, the establishment may be able to track the serial numbers of currency bills that are dispensed from an automated banking machine to patrons within the establishment. This may be done using features like those described in U.S. Pat. No. 8,474,708, the disclosure of which is incorporated herein by reference in its entirety. In such arrangements the serial numbers and/or other machine readable indicia associated with dispensed bills may be stored in a data store associated with one or more computer devices that are accessible by the wearable computer devices worn by employees such as sales associates who are bill recipients within the establishment. Such mobile wearable computer devices may utilize features like those previously described to evaluate currency bills for genuineness and to also determine the serial numbers or other bill identifying indicia thereon. The wearable computer device may communicate the serial numbers and/or other bill identifying indicia from received bills to determine if the bills received by a bill recipient correspond to those dispensed by the automated banking machine in the establishment. This may be done, for example, through the use of cameras on a mobile wireless device capturing the serial number data and/or other indicia and resolving the currency bill identifying data in a manner that can be transmitted wirelessly to the computer which can access the serial number data corresponding to bills dispensed from the banking machine. In cases where a serial number received by an employee is one that was dispensed from the machine, the merchant may offer a credit or a discount to the purchaser. In this way the purchaser is compensated for spending the money that they obtained through use of the machine and paying the surcharge to obtain the cash. Such an approach may be very useful in providing an incentive for individuals to spend the cash that they obtain from the banking machine in the establishment where the machine is located. In addition it may enable the proprietor to evaluate the value of having the machine in terms of how much of the cash that is dispensed therefrom is actually spent by patrons within their establishment. This may be done through programmed instructions associated with one or more computers that evaluate the amounts corresponding to purchases by patrons in the establishment that are based on bills that were dispensed from the machine. Further in the exemplary arrangement the computer data concerning serial numbers of bills that are dispensed from the machine are only held for a limited set period of time. This may correspond in some cases to a one day period, as it would be expected that patrons would likely spend the cash that they receive from the automated banking machine during the same visit to the establishment in which the cash was received. Of course in some establishments the set period may be longer or shorter. After the set period of time, the data concerning the serial numbers of bills dispensed would no longer stored. This avoids the need for creating a large database to hold serial number data associated with dispensed bills. Of course these approaches are exemplary and in other arrangements other approaches may be used.

In some exemplary transaction environments, employees of a particular merchant may have the wearable computer devices provided by the establishment. It may be a requirement of the employment that the employee utilize the wearable computer for business activities during their work hours. In this way, the available functions of the devices can be available at all times which the employee is on duty. In addition in some arrangements the employer may require that each employee store their wearable mobile wireless device in a particular location when it is not in use, such as during off hours when the establishment is closed. In some exemplary arrangements a mounting shelf or stand may be provided onto which the employee may place the wearable wireless mobile device when the employee's shift has ended. The placement of the mobile devices when they are not in use may provide for additional uses of the devices during off hours.

As can be appreciated, the cameras which are utilized on the wearable mobile wireless devices may serve as surveillance cameras during times that the establishment is not open. Such surveillance cameras may be monitored from local or remote monitoring stations so that any intrusions or abnormal conditions can be detected within the establishment. Similarly audio receiving devices included on the wearable computer may be monitored during off hours for purposes of determining abnormal noises which may be indicative of a break-in, machinery malfunction or other problem within the establishment. By having numerous mobile devices positioned in various areas of the establishment during off hours, it may be possible for a monitoring system to observe more areas from more different perspectives than would be possible with stationary security cameras. In addition other detection features of mobile devices such as audible sounds or infrared signals or other things that the wearable mobile devices are capable of sensing, may be utilized in monitoring activities so that such properties may be detected to uncover abnormal or problematic conditions. Of course the capabilities of the wearable mobile wireless devices will determine the capabilities that can be achieved through such arrangements and numerous variations to achieve effective monitoring may be utilized in various arrangements. In some arrangements features similar to those described in U.S. Pat. No. 8,302,856 which is incorporated herein by reference in its entirety, may be utilized.

In other exemplary arrangements the wearable device 100 may be utilized to conduct transactions with an automated banking machine, such as machine 124 that includes the capability to provide the user with virtual items of value such as currency bills. The exemplary virtual currency bills are provided to the user through images output on the display 110 of the wearable device. The virtual currency bills have no physical constituents but are perceivable visually by the user through the display of the wearable device. In an exemplary arrangement the virtual currency bills may appear to the user to be similar to regular currency bills except that they have at least one identifying feature that enables the user to distinguish them from physicals currency bills. Such features may include different coloration, different indicia features, visual halos, visual tags or other visual features that enable the user wearing the wearable device 100 to readily distinguish physical currency bills in the direct field of view of the user through the lenses of the wearable device, from the virtual currency bills that are presented to the user through outputs of the display 110. Unless otherwise expressly indicated herein virtual currency bills shall be considered to be any type of virtual item of value. For example, the virtual currency bills may correspond to a cryptocurrency, such as Bitcoin, Nxt, etc. that has no corresponding physical equivalents. In such cases the virtual currency bills may have a unique distinctive visual appearance with the corresponding symbols or other cryptocurrency value indicators.

In an exemplary arrangement an automated banking machine may be operated by a user wearing the wearable device 100 in a way that enables the user to receive physical currency bills stored in the machine responsive to operation of a cash dispenser, or a delivery of virtual currency bills from the machine. In an exemplary arrangement, the automated banking machine includes at least one reader that reads indicia from data bearing items, which data is usable to identify user financial accounts. Such a reader may include for example, a card reader like that previously discussed. Alternatively the reader may include a biometric reader that is operative to read a biometric feature of the user. For example in some arrangements, the reader may include a fingerprint reader, an iris scan reader or a camera that captures images for purposes of facial recognition. In alternative arrangements the at least one reader may include a wireless reader usable to read RF indicia from a card, token or other item that includes an RFID tag. In other arrangements a wireless reader may be used to read wireless data from a user mobile device such as a smart phone or smartwatch, or the reader may be operative to receive indicia wirelessly from the wearable device itself in a manner like that previously discussed. Numerous different types of readers may be utilized to read indicia that can be used to identify the user financial account.

The exemplary automated banking machine further includes at least one input device through which a user may input transaction or other selections. Such input devices may include devices such as the input devices previously discussed. Such input devices may include a keypad (like keypad 22 previously discussed), function keys (like function keys 30 previously discussed), a touchscreen input device, a microphone for receiving audible inputs, or other input devices suitable for receiving user inputs. An exemplary automated banking machine may further include a cash dispenser. The cash dispenser may operate in a manner like cash dispenser 28 previously discussed to selectively make currency bills stored in the machine accessible to the machine user. The exemplary machine may also include a printer. The exemplary printer may be like printer 24 previously discussed which is suitable for printing a document such as a receipt or other item.

The exemplary automated banking machine may further include a controller, such as the controller 34 previously discussed. The exemplary controller comprises circuitry including at least one processor and at least one data store of the type described herein, suitable for carrying out circuit executable instructions. The exemplary automated banking machine includes at least one interface. The exemplary interface may include a wireless communication device such as the wireless portal 32 and/or interface 40 previously discussed. The automated banking machine may further include other types of wired or wireless interfaces suitable for communicating with remote devices and remote server circuitry directly or through networks in a manner like that previously discussed.

In exemplary arrangements the automated banking machine is operative to conduct currency bill dispensing transactions for a user wearing the wearable device in a manner similar to that previously discussed. However in the exemplary arrangement the automated banking machine is operative to provide an additional transaction selection to the user which enables the user to receive virtual items of value such as currency bills. Specifically in the exemplary arrangement the output device such as the display on the automated banking machine provides the user with at least one output which indicates that the user may receive the requested value in the form of virtual currency bills or actual currency bills. The machine further operates in accordance with its programming to enable the user to provide at least one transaction value type selection input to an input device on the machine. The value type selection input corresponds to whether the user wishes to receive currency bills or virtual currency bills.

Alternatively in some arrangements the automated banking machine may wirelessly communicate with device 100 so that the option for the user to select virtual currency bills is provided to the user through display 110.

In cases where the user has provided a transaction selection input that corresponds to the receipt of physical currency bills, the automated banking machine 124 operates in a manner like that previously discussed to determine if the indicia read through operation of the at least one reader (as well as other inputs such as a PIN or read biometric feature) corresponds to a user financial account that is authorized to conduct a transaction through the machine. Responsive to a determination that the requested transaction is authorized in the amount requested, at least one message communicated with at least one remote server circuit causes the cash dispenser of the machine to operate to make currency bills stored in the machine accessible to the machine user. In an exemplary arrangement the user is also enabled to provide inputs to the machine which cause the printer to provide a receipt for the transaction carried out at the machine.

In some exemplary arrangements because the user is enabled to view output devices such as the display of the banking machine as well as input devices of the machine such as a touchscreen or keypad through the wearable device 100, the user is enabled to provide inputs to the machine based on outputs that are only visible to the user through the display of the wearable device. As a result in some arrangements the controller associated with the automated banking machine may operate to cause communications with the wearable device which provides outputs which are visible only to the user, and in response to which the user may provide selection inputs to input devices of the automated banking machine. This may include for example, visible outputs through the at least one display 110 of the wearable device which appears to the user to be a keypad, buttons, or other manual input device, which to the user appears to overlie a touchscreen or other input device of the banking machine. The user may provide inputs corresponding to a PIN, code or other user selections by making manual contact at locations on the touchscreen or other input device which correspond to the locations of the visually perceived input devices that are output through the display of the wearable device. In such an exemplary arrangement the inputs provided by the user are less likely to be intercepted because a nearby thief or a camera positioned to intercept the user inputs, will be unable to determine the output through the display 110 of the device to which the inputs correspond. Of course these approaches are exemplary and in other arrangements other approaches may be used.

Figure 6A:
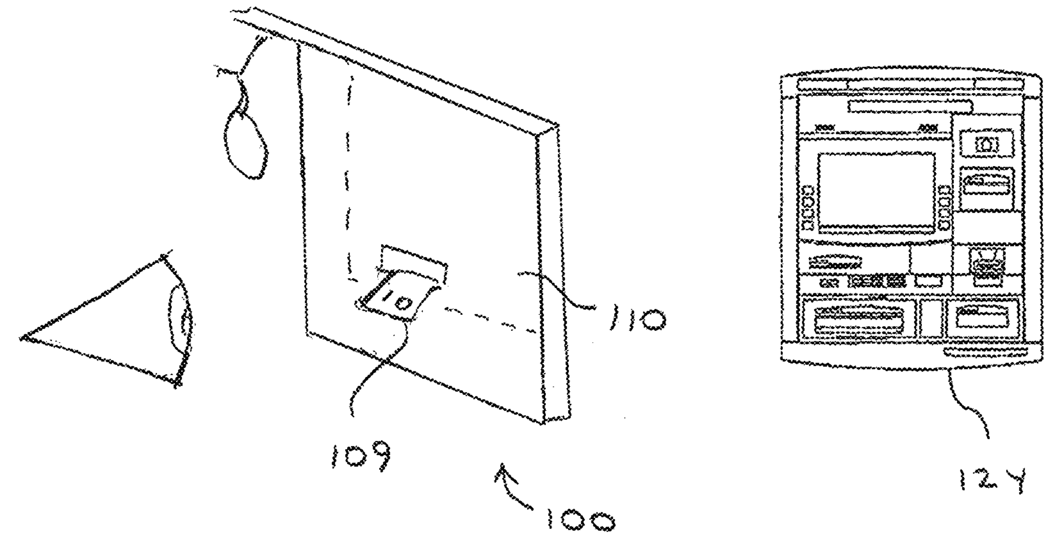
FIG. 6A is a perspective view schematically representing viewing by a user of an output from a display of a wearable device, that is perceived by the user as virtual currency bills being dispensed by a physical automated banking machine that also dispenses physical currency bills.
Figure 6B:
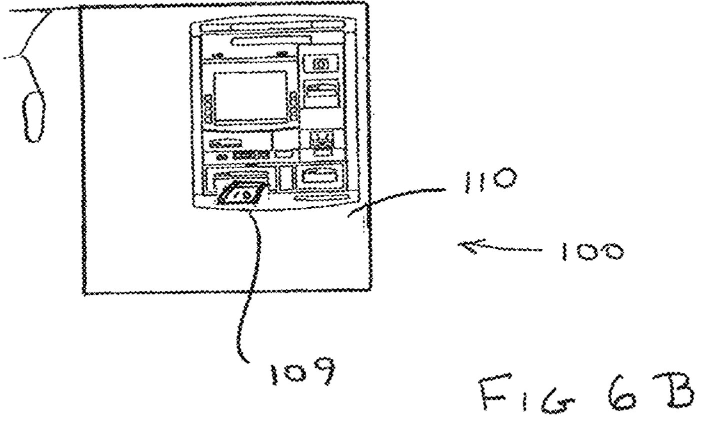
FIG. 6B is a view as perceived by a user of the wearable device, of the virtual currency bills coming from the physical automated banking machine.

Alternatively when the user provides a transaction selection input that corresponds to the receipt of virtual currency bills, the controller operates in accordance with its programming to wirelessly communicate with the wearable device 100 through the wireless communication device 120. Responsive at least in part to the determination that the input data read by the at least one reader corresponds to a user financial account authorized to conduct the transaction, and responsive at least in part to the value type selection input received from the user indicating that the value type selection corresponds to virtual currency bills, the wireless communication between the machine 124 and the wearable device 100 is operative to cause outputs through the display 110 of the wearable device. As represented in FIG. 6A the communication between the machine and the wearable device causes the user to perceive the delivery from the machine of virtual currency bills 109 that have no physical constituents. In the exemplary arrangement as represented in FIG. 6B, the user is enabled to view the virtual currency bills as coming from a suitable physical opening or other area of the automated banking machine 124 which is in the user's direct field of view when viewing the machine, or alternatively an opening or other area which does not physically exist on the machine.

In the exemplary arrangement the automated banking machine is operative to communicate with the wearable device so as to cause outputs which cause the user to perceive on the display 110 of the device, a quantity of virtual currency bills, each of which have a denomination which is visually perceivable to the user by viewing the bill on the display. In the exemplary arrangement the dispense of virtual currency bills that have actual physical currency bill equivalents is made to be generally similar to the dispense of physical currency bills, each of which physical bills also have a physical indication of denomination and are dispensed in a quantity that can be perceived by the user. In the case of cryptocurrency or other virtual bills that have no corresponding physical equivalents, the virtual currency bills have a consistent and distinctive appearance that corresponds to the particular type of virtual bills. In each case whether actual or virtual currency is provided by the machine, the machine is operative to cause a value that corresponds to the quantity and denomination of the dispensed currency bills or virtual currency bills to be assessed to the user's financial account. This is done by the automated banking machine communicating with one or more remote server circuits to cause the user financial account to be assessed the value associated with the currency bills or virtual currency bills that are provided to the user.

In exemplary arrangements the automated banking machine may provide a user with options for receiving a receipt for the transaction conducted at the machine. This may include the controller of the machine offering the user output selections to which the user may provide inputs to input devices in response. In an exemplary arrangement the controller of the machine may operate in a manner like that previously discussed to cause the printer to print a receipt corresponding to the value of the currency bills or virtual currency bills that have been provided to the user. Alternatively or in addition, in some exemplary arrangements when the user has selected the dispense of virtual currency bills, the machine may operate in accordance with its programming to offer the user the opportunity to receive a virtual receipt for the transaction. In such arrangements the machine communicates with the wearable device 100 so as to cause the wearable device to provide outputs through the display 110 which causes the user to perceive a virtual receipt being provided by the machine. The virtual receipt has no physical constituents but may appear to the user like a printed receipt that is provided by the machine. In some exemplary arrangements the virtual receipt may appear to the user as presented from the receipt slot or other location physically present on the machine from which printed receipts are dispensed. Alternatively, virtual receipts may be perceived as delivered from the machine from other locations such as from virtual receipt dispensing slots that are not physically present on the machine but only are perceived by the user through the displays of the wearable glasses.

In other exemplary arrangements the automated banking machine may provide transaction options through outputs to the user which enable the user to provide at least one input to select to receive a virtual receipt, even in situations where the user has not received virtual currency bills. In some exemplary arrangements the wireless communication device of the automated banking machine may wirelessly communicate with the wearable device 100 of the user so that the machine is aware that this capability is available to the machine user. Alternatively, the transaction option may be offered to all machine users without making a separate determination that the user has a wearable device capable of presenting a virtual receipt. In such exemplary arrangements when a user has received physical currency bills (or conducted other transactions at the banking machine) the user may provide one or more inputs to indicate to the machine that they wish to receive a virtual receipt for the transaction. In response to receiving the at least one input, the wireless communication device of the machine is operative to communicate with the wireless communication device 120 of the wearable device 100 so as to cause the display 110 to output visual representations of a receipt delivered by the machine to the user. Of course these approaches are exemplary and in other arrangements other approaches may be used.

In exemplary arrangements when the automated banking machine has operated to dispense virtual items of value such as virtual currency bills to the user, the automated banking machine operates to communicate with remote server circuitry to indicate that the user has received virtual currency bills. The value associated with the virtual currency bills received by the user is credited to a virtual currency bill account associated with the user or other user financial account. The credit to the virtual currency bill account is carried out through operation of one or more remote servers responsive to communication with the automated banking machine. Alternatively in other arrangements the credit to the virtual currency bill account of the user is carried out responsive to communication from the wearable device 100 to remote server circuitry indicating that the user has received the quantity and denomination of virtual currency bills. Further in some other alternative arrangements, the credit to the user virtual currency bill account is accomplished responsive to communication from both the automated banking machine and the wearable device 100 with remote server circuitry, that operates to include the user account data in at least one data store. The particular approach taken will depend on the operation of the particular system.

In an exemplary arrangement the wearable device 100 is operable through images captured by the at least one outward facing camera 112 to perceive the manual movement by the user's arms, hands and fingers. As a result the user is enabled through manual movement to move to "take" the virtual currency bills that are delivered from the virtual delivery location on the automated banking machine. In the exemplary arrangement the at least one portable circuit 102 of the wearable device 100 is operative responsive to the detected manual movement by the user moving an arm, hand and fingers to engage the apparent virtual currency bills as presented on the display, to cause the virtual currency bills to be perceived through the display 110 as moved with the user's hand away from the point of delivery on the machine.

In an exemplary arrangement the movement of the virtual currency bills from the machine may be perceived by the user as the same as the taking of physical bills, except without the tactile feel of physical bills between the user's fingers. However, in alternative arrangements the user operating the wearable device 100 may also wear a virtual reality glove or other devices that are enabled to communicate with the device 100. Such a virtual reality glove may include sensors to sense hand, finger and/or arm movements and provide signals corresponding thereto to device 100. The exemplary glove may also include output devices sensible by the user's hand and fingers that enable the user to have a tactile feel associated with contact with the virtual bills. Such a tactical glove may also operate to generate signals that are received by the wearable device 100 so as to further enable the circuitry of the wearable device to detect the movement of the user's arms, hands and fingers to provide the user with visible outputs through the display that correspond with movement of the user manipulating the virtual bills, as well as tactile sensations associated with contact with such bills. In other alternative arrangements the automated banking machine or wearable device may incorporate mid-air haptic technology that enables a user to perceive virtual items such as currency bills and receipts by touch without the need for a virtual reality glove or similar device. Such mid-air haptic technology uses ultrasonic transducers to project haptic feedback which corresponds to the sense of touching such virtual items directly onto a user's hands and fingers. Such mid-air haptic devices are available from Ultrahaptics of Palo Alto California. Of course such approaches are exemplary and in alternative arrangements other approaches may be used.

In an exemplary arrangement once the user has perceived to have manually engaged the virtual currency bills, the user may choose to "place" such bills in a storage location. In some exemplary arrangements the storage location may correspond to a physical container such as a wallet or purse that is also capable of storing physical items. Alternatively the container in an exemplary arrangement may correspond to a virtual container which in some cases may be a physical item that is not capable of physically containing physical currency bills. For example in some exemplary arrangements the virtual container may comprise the user's ear or other body cavity. Alternatively the virtual container may comprise a ring, button, belt buckle or other object that does not have any internal physical storage space. In other arrangements the virtual container may be a container which does not correspond to any physical object. For example the virtual container may correspond to a virtual representation of a money clip, a safe, or other item which does not physically exist, but which can be visually perceived by the user through the display 110 in response to inputs to the wearable device. Such inputs may include verbal inputs from the user that are perceived by the microphone 116 or physical inputs that are provided through the sensing bar or other input device 122.

In an exemplary arrangement the manual movement of the user's physical arms, hands and fingers in engagement with the virtual currency bills, is detected by the wearable device 100 through the at least one outward facing camera 112. The movement by the user hand in engagement with the perceived virtual currency bills is perceived by the user through the display of the wearable device to include the placement of the virtual bills within a selected physical container or a selected virtual container. In the case of a physical container, the display may present outputs which show the user the bills as moved into the container in the same manner as physical bills being placed into the container such as a wallet or purse. In the case of a virtual container which is a physical item that does not have internal storage space, the programming associated with the circuitry of the portable device provides outputs perceived by the user showing the virtual bills stuffed or sucked into the physical item which is to serve as the virtual container. In other arrangements when the virtual container does not include any physical object, the virtual container and virtual currency bills may be perceived as manipulated by manual movement of the user into engagement with a virtual container that is perceived as located in a particular place. Such a place may include for example, the user's hand or other location on the user. Alternatively the programming associated with the wearable device may enable the virtual container to be clipped onto the user or the user's clothing or other location where the user can visually perceive the virtual container. Alternatively in other exemplary arrangements the user may provide inputs to the wearable device that causes the virtual container to disappear from the user's view and then reappear at a later time responsive to user input. Of course these approaches are exemplary and in other arrangements other approaches may be used.

In the exemplary arrangement the circuitry 102 of the wearable device 100 is operative to store data corresponding to the virtual currency bills and the physical or virtual container in which they have been perceived as stored by the user. Further in an exemplary arrangement the circuitry 102 is operative to cause the wireless communication device 120 of wearable device 100 to communicate data corresponding to the virtual currency bills and the container in which they have been stored, to one or more remote server circuits such as those previously discussed. In an exemplary arrangement the remote server circuitry may include a server such as server 126 previously described. The stored data may include data corresponding to physical features and locations detected through the at least one outward facing camera on the portable device 100. Such image data is usable to identify such physical features subsequently so that the virtual bills can be later perceived as "found" in a container located where the user previously "placed" such bills. Further in exemplary arrangement the server circuitry which stores the information concerning the virtual currency bills and their location and container information may also store the data concerning the user's virtual currency bill account.

In an exemplary arrangement virtual currency bills may be exchanged with other persons who operate wearable devices similar to wearable device 100. Such further wearable devices schematically indicated 107 may be substantially identical to wearable device 100. Such wearable devices 107 include the same elements as are found in wearable device 100 and provide the same capabilities to further users who wear such devices. Alternatively such wearable devices may include other types of augmented reality devices such as contact lenses made by Mojo Vision Inc. of Saratoga, CA. Of course it should be understood that in some arrangements wearable devices 107 may provide other or different capabilities in addition to those of wearable device 100 described herein that are utilized for purposes of handling and transferring virtual currency bills.

In an exemplary arrangement a user of wearable device 100 is enabled to remove the virtual currency bills from the physical or virtual container in which they were "placed" by the user. In some exemplary arrangements this may include the wearable device 100 operating to track user manual movement to the physical container in which the user perceived he placed the virtual currency bills through user manual movement. Data stored in the at least one data store associated with the circuitry of device 100 and/or data stored in a data store of remote server circuitry, is operative to cause the display 110 of device 100 to have the virtual bills be perceived by user as in the physical container. Alternatively in situations where the user "placed" the virtual bills in a virtual container, the portable device 100 responsive to manual movement as detected through the at least one outward facing camera 112 and other user inputs, is operative to enable the virtual container and virtual bills to be visually perceivable by the user so as to enable the user to perceive that they manually engage and remove the virtual bills from the container.

In an exemplary arrangement the wearable device 100 is operative in accordance with its program instructions, to communicate wirelessly, messages corresponding to the virtual bills and their location as perceived by the user. Such wireless messages may be communicated to remote server circuitry and/or directly to nearby further wearable devices such as wearable device 107. In an arrangement under which the user of wearable device 100 wishes to transfer one or more of the virtual currency bills to a user of further wearable device 107, the wearable device 100 detects the manual movement of the user of such wearable device and perceived movement of the one or more virtual currency bills output to the user through the display 110, to a point of delivery from which the virtual currency bills may be perceived as taken by the further user wearing the further portable device 107. In the exemplary arrangement the further user of the further portable device 107 also sees the manual movement of the user and perceives through the display of the device 107 movement of the virtual currency bills to the point of delivery. The user and the further user perceive visually through the respective displays of the wearable devices the taking of the virtual currency bills by the further user responsive to detected manual movement of the further user. In an exemplary arrangement in connection with this transfer of the value associated with the virtual currency bills, the wearable device 100 is operative to capture and store in at least one data store of the device and communicate to remote server circuitry, data corresponding to the transfer of the virtual currency bills. Such data corresponding to the transfer may include one or more of several different types of data corresponding to the virtual bill transfer. For example, the wearable device 100 may communicate data with the further wearable device 107. The communication may include identifying data which is operative to identify the further wearable device and/or the user thereof. In other exemplary arrangements the wearable device 100 may be operative to capture biometric data associated with the further user wearing device 107 through the outward facing camera 112. The exemplary wearable device 100 may also operate to resolve location data associated with the transfer of the virtual currency bills. This may be done for example through GPS or cellular location calculations accomplished through operation of the circuitry of the wearable device. Other data captured in connection with the transfer may include images displayed to the user of device 100 corresponding to the transfer of the virtual currency bills by the user to the point of delivery and the images representing the taking of the virtual bills by the further user. Further exemplary arrangements may also capture images corresponding to the exchange through operation of the outward facing camera on the portable device 100. In exemplary arrangements one or more of these items of identifying data associated with the transfer of the virtual currency bills is stored in the at least one data store of the wearable device 100. In exemplary arrangements one or more of such data items are also transferred to remote server circuitry which is operative to track the virtual bills and the user's virtual currency bill account.

In an exemplary arrangement in connection with such a transfer of virtual currency bills, the further wearable device 107 also captures, stores and transmits to at least one remote server circuit similar identifying data corresponding to the transaction. The communication of the data corresponding to the transfer of the virtual currency bills from both wearable devices enables the at least one remote server to identify the parties involved in the transfer. It further enables determining the identity of the virtual currency bills subject to transfer, including the quantity and denomination thereof, to be identified. In addition the at least one remote server circuit receiving the data is enabled to operate to deduct the transferred virtual bills and/or the value thereof from the user's virtual currency bill account, and credit the further user's virtual currency bill account with such bills and the corresponding value. The communication between the one or more remote servers and the wearable device and the further wearable device may be operative to communicate all the data which is necessary to accomplish the transfer such that the further user of further wearable device 107 is enabled to "take" the virtual bills from the user. The further user through wearable device 107 is also enabled to "store" the received virtual currency bills in a physical or virtual container in a manner like that previously discussed. Of course the further user may also transfer the bills to others who operate wearable devices similar to devices 100, 107 which communicate with the server circuitry that is operated in connection with the system. Of course it should be understood that these approaches are exemplary and in other arrangements other approaches may be used.

In some exemplary arrangements the further user who receives the virtual currency bills as perceived through wearable device 107, may act as a merchant that provides goods or services. Such a merchant may provide such goods or services to the user in exchange for such virtual currency bills. In addition such a merchant user may also provide to the user in a similar manner, other virtual currency bills and/or value perceived as associated with virtual coinage, as change in connection with transactions for which payment is provided using virtual currency bills. The virtual currency bills provided by the other user as change may be perceived, appear to be manipulated, and tracked through operation of the system in a manner similar to that for the virtual currency bills that are dispensed or transferred as described herein.

In some exemplary arrangements the type of virtual container utilized for the perceived storage of virtual currency bills may include a virtual automated banking machine. The programming associated with wearable device 100 may include executable instructions that enables the output through the display 110 of images that correspond to an automated banking machine that appears to the user to be similar to automated banking machine 124, for example. Alternatively the wearable device 100 may receive communications from one or more remote servers that cause outputs through the display 110 receivable by the user that correspond to a virtual automated banking machine. The virtual automated banking machine may be presented to the user through the device 100 responsive to inputs to the device 100 in a manner like that previously discussed.

Figure 6C:
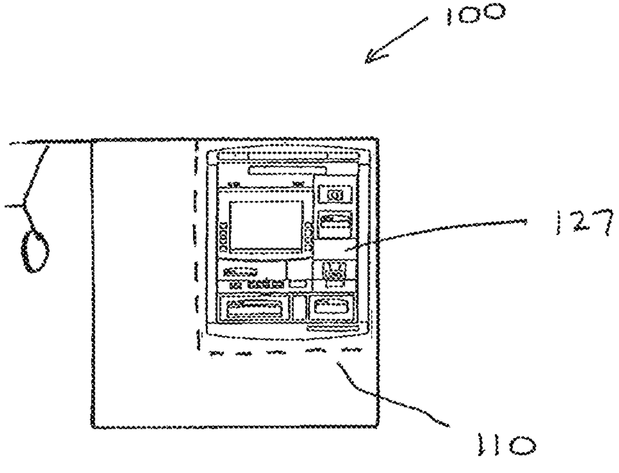
FIG. 6C is a view showing a virtual automated banking machine perceived by a user wearing a wearable device.

The exemplary virtual automated banking 127 machine may have features and operational capabilities that correspond to a physical automated banking machine as represented in FIG. 6C. However, in an exemplary arrangement rather than using a separate physical item such as a card which is read by physical reading device on the machine, the reader of the virtual automated banking machine may operate responsive to a virtual reading device which receives the identifying data associated with the user or the user account, which is stored in at least one data store of the device 100. Alternatively or in addition, the at least one virtual reading device of the virtual automated banking machine may utilize the at least one inward facing camera 114 or the at least one outward facing camera 112 of the device 100 for purposes of reading a biometric feature of the user. Alternatively or in addition the device 100 may include the capability for reading wireless signals output from a debit, credit or other card, token or other item of the user which includes data usable to identify a financial account.

In an exemplary arrangement the virtual automated banking machine 127 may include virtual input devices, virtual output devices and the like that are perceived by the user through outputs through the display 110 of the device 100. These virtual input and output devices can provide instructions to the user for operation of the machine and receive inputs from the user in a manner that is perceived by the user as similar to that provided in connection with a physical automated banking machine. Further in an exemplary arrangement, manual movement by the user as detected through the at least one outward facing camera 112 of the device 100, or other devices such as a virtual reality glove (if used), may be utilized to detect user manual movement corresponding to the manipulation of input devices of the virtual automated banking machine. Contact with the components of the virtual automated banking machine may also be perceived by touch when using mid-air haptics apparatus.

Figure 6D:
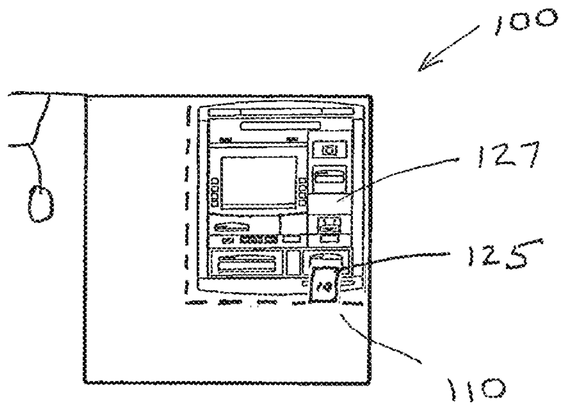
FIG. 6D is a view showing a virtual automated banking machine perceived by a user wearing a wearable device, receiving virtual currency bills into the virtual machine.

In an exemplary arrangement the virtual automated banking machine 127 may be operated responsive at least in part to the detected manual movements of the user or other inputs to perform a deposit transaction of virtual currency bills. The perceived operation of the virtual automated banking machine may be similar to that of a physical automated banking machine in the user perceiving to provide manual inputs selecting a deposit transaction and perceiving to provide inputs which correspond to the amount of virtual currency bills to be deposited. The functions of the physical automated banking machine in making the determination that the account identifying data and/or user data corresponds to an authorized account on which the requested transaction is authorized to be conducted, is carried out through operation of the wearable device 100 through communication with the one or more remote servers. Responsive at least in part to the determination, the wearable device causes the virtual automated banking machine to be perceived as operating to carry out the transaction functions associated with the deposit. Alternatively in some arrangements because the availability of the user's virtual currency bill account is known to be authorized to conduct the transaction through the communications with the device 100, and the denominations and value of each virtual currency bill is known by the device 100 or the operatively connected remote server circuitry, the user may through manual movement perceive the input of selected virtual currency bills 125 to the machine which is then perceived to receive such bills therein as represented from FIG. 6D and indicate the value of the deposit to the user. Of course these approaches are exemplary and other operational features may be provided for the virtual automated banking machine.

In an exemplary arrangement the virtual automated banking machine may be perceived by the user as receiving the virtual currency bills for deposit. The crediting of the user's virtual currency bill account for the deposit of such virtual currency bills may be accomplished through operation of the one or more remote servers communicating wirelessly with the device 100. Further the virtual automated banking machine may be perceived as operable in a manner like that previously discussed to issue to the user a virtual receipt in connection with the transaction. The virtual receipt may be perceived as taken by the user responsive to user manual movement and stored in a physical or virtual storage container in a manner like that previously discussed in connection with the storage of virtual currency bills. When the user has completed his or her transaction with the virtual automated banking machine, the user may provide one or more inputs to the device 100 in a manner like that previously discussed. Such inputs may cause the virtual automated banking machine to disappear from the user's display 110. The machine can then be caused to reappear at the direction of the user responsive to inputs to the device 100 when the use of such machine is again desired by the user.

In an exemplary arrangement the device 100 operating in conjunction with one or more remote servers connected in the system is also operative to provide to the user an initial dispense of virtual currency bills. This provides an alternative to the user to not require interaction with a physical automated banking machine for purposes of obtaining virtual currency bills. In an exemplary arrangement the user can provide one or more inputs to the wearable device 100 which cause the virtual automated banking machine to appear to the user through outputs from the display 110. Such inputs may include audible inputs or manual inputs that are received by the device 100 and that are identified through operation of the circuitry 102 as corresponding to the user's instructions to provide user access to the virtual automated banking machine.

In exemplary arrangements the virtual automated banking machine may be perceived to operate in the manner like that previously discussed in connection with the deposit of virtual currency bills therein, to appear to receive inputs or otherwise identify the user and/or the user's account. The device 100 further causes the virtual automated banking machine perceived by the user through the display 110, to operate to make a determination that the dispense of virtual currency bills requested by the user is an authorized transaction that can be conducted through operation of the virtual automated banking machine. Manual movement of the user as detected by the device 100 and the at least one outward facing camera 112 (and in some arrangements a virtual reality glove or similar device) may operate to cause the perceived receipt of user inputs to the machine is appropriate in connection with a bill dispensing transaction.

Figure 6E:
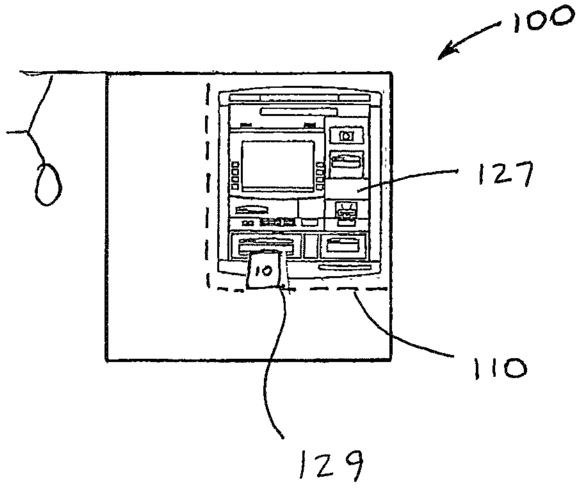
FIG. 6E is a view showing a virtual automated banking machine perceived by user wearing a wearable device, delivering virtual currency bills to the user.

In an exemplary arrangement the virtual automated banking machine 127 as perceived by the user through the display 110 of the device 100, is operative responsive at least in part to the determination that the user is authorized to receive value corresponding to the requested virtual currency bills, to cause such bills 129 to be perceived as dispensed from the virtual automated banking machine. Such dispense may be perceived by the user through outputs through the display 110 of the device 100 as represented in FIG. 6E. The visual outputs correspond to providing a quantity of such virtual bills and bills with denominations that correspond to the requested value. In a manner similar to that discussed in connection with the provision of virtual currency bills from a physical automated banking machine, an account of the user is assessed the monetary value associated with the delivered virtual currency bills. The user is also enabled responsive to manual movement as detected by the device 100 to be perceived as taking the virtual currency bills from the virtual machine. A mid-air haptics device may also provide the user with a sense of touching the virtual bills. Such virtual currency bills may be perceived as manipulated through detected manual movement by the user. The virtual automated banking machine may also provide the user with a virtual receipt like that previously discussed. Once the transaction with the virtual automated banking machine is completed, the user can provide one or more inputs to the wearable device 100 which causes the virtual automated banking machine to be perceived by the user through the display to again disappear. Of course it should be understood that this transaction description with the virtual automated banking machine is exemplary, and in another arrangements other approaches and transaction elements and steps may be utilized.

The virtual currency bills that are perceived by the user is being received from the virtual automated banking machine may be perceived as handled and manipulated in a manner like that previously discussed. Such virtual currency bills may also be moved by hand engagement to locations and stored in a physical or virtual container in a manner like that previously discussed. Such virtual currency bills may also be subject to transfer to another user through approaches like those previously described.

As can be appreciated the use of the virtual automated banking machine enables the user to obtain virtual currency bills in any location without the need to travel to a physical automated banking machine. Further in an exemplary arrangement the virtual currency bills may be transferred by the user to other users including merchants who accept such bills in exchange for goods or services. In some exemplary arrangements the wearable device of the user and/or remote server circuitry may communicate with a further wearable device worn by a further user in a manner that enables the further user to perceive the virtual automated banking machine and the delivery of virtual currency bills therefrom, through the further wearable device. This may be done for example, when the user plans to transfer the virtual currency bills delivered by the virtual automated banking machine to the further user shortly after they are delivered from the virtual machine. Further in other exemplary arrangements, virtual currency bills being delivered from a physical automated banking machine may also be perceived by a further user through a further wearable device responsive to wireless communication between the wearable device, the further wearable device, and machine and/or at least one remote server circuit. Thus exemplary arrangements enable users to receive benefits that are associated with the use of cash, without the need to possess and store physical currency bills. Further exemplary arrangements may provide perceived currency bills for currency types which have no physical equivalents, such as cryptocurrencies. Of course it should be understood that these approaches are exemplary, and that the principles described herein may be applied in numerous different arrangements to achieve some of the advantages described.

In other exemplary arrangements apparatus of the type described may be utilized to provide users with types of virtual items of value other than virtual currency bills that correspond specifically to a type of currency. Virtual items of value may be redeemable for goods, services or other forms of value. In some exemplary arrangements, the user of the automated banking machine may also receive a tangible printed receipt or other tangible item that is provided by the machine in conjunction with the virtual item of value. This may be in the nature of a printed receipt similar to that available for the provision virtual currency in the examples previously discussed, or other types of printed or otherwise available tangible items that are indicative that the user has received or is in possession of the virtual item of value.

For example in some exemplary arrangements the automated banking machine may be operative to deliver virtual tickets to a user. Such tickets may correspond to gaming tickets such as lottery tickets or value that can be utilized in gaming machines or in games located in gaming establishments. Other forms of tickets may include wagering slips associated with sports betting that are redeemable for value contingent on certain outcomes. Other tickets may include transit tickets such as those that are redeemable for transport via airlines, rail systems, ships, buses or other forms of transport. In other exemplary arrangements virtual items of value may include event tickets such as tickets for access to sporting events, concerts, festivals, theaters or other activities. Items of value which provide facility access may also be provided from automated banking machines in other exemplary arrangements. Examples of virtual items of value which provide facility access may include items which enable the user to gain access to structures, venues or locations such as amusement parks, arenas, zoos, museums, theme parks or other facilities for which a user normally must provide value to gain access. As can be appreciated such virtual items of value may be stored by the recipient, perceived, transferred and accepted by other individuals utilizing wearable devices such as devices 107 which are utilized by persons and merchants in a manner like that previously discussed in connection with virtual currency bills, or may be accepted through operation of physical machines or virtual automated banking machines or other virtual machines that operate to accept such virtual items in a manner similar to that previously discussed.

In other exemplary arrangements the automated banking machine may operate to provide virtual items of value that include virtual items that bear or otherwise embody an access code or other indicia, all of which herein will be referred to as a code. Such virtual access code bearing items may in some arrangements include an alphanumerical code or other code that is visible to the user through operation of the wearable device, which code may be usable to gain access to facilities, locations or other resources. For example the code may enable the user to provide inputs to a keypad or other input device that enables a user to access a facility such as a health club, spa, resort or recreational facility. In other exemplary arrangements the code may be utilized to provide inputs to input devices that enable access to a housing unit, such as temporary housing, a hotel or motel room, a dormitory room or other facility. In other exemplary arrangements the code included in the virtual access code bearing item may be usable to enable the user to access a storage unit. Such a storage unit may contain items of value that a user may have purchased, rented or otherwise been authorized to access or utilize. This may include for example a storage unit which houses an item that the user has purchased and that has been delivered to or is otherwise housed in a particular storage unit, and for which the access code bearing item that enables the user to take delivery of the item has been provided to the user through the banking machine. Other exemplary arrangements may include virtual access code bearing items that enable user to obtain access to a vehicle, such as a rental vehicle that the user is enabled to operate responsive at least in part to the input to an input device of the code included on the code bearing item. Code bearing items that are usable to access and/or operate machines may also be provided through other exemplary arrangements. This may include for example, virtual access code bearing items that enable user to operate machines such as watercraft, drones, personal aircraft, construction machinery, or other items which require authorization to use. In some exemplary arrangements the virtual item of value may be utilized in conjunction with other user authenticating factors such as data corresponding data bearing items such as data bearing articles, biometric data or other data associated with the user of the wearable device that receives the virtual item. Such additional authenticating factors may be verified through operation of circuitry associated with the device or facility to enable the authorized user to have the benefit of the virtual item of value. Of course it should be understood that these types of virtual items of value and the uses thereof are exemplary. Numerous different virtual items of value may be provided through operation of automated banking machines. Further in exemplary arrangements the types of virtual items of value that can be delivered may be readily expanded or changed, as in many cases no changes to the physical aspects of the automated banking machine would be required to deliver a wide variety of different virtual items of value.

In other exemplary arrangements an automated banking machine may operate to associate virtual indicia that are perceivable through wearable mobile devices, with a tangible item that is provided from the machine. For example in some exemplary arrangements the controller associated with the automated banking machine may operate to output virtual indicia that is perceivable by the user of the machine through the at least one display 110 of the wearable user device 100, and that is in attached connection with the dispensed tangible currency bills. In some exemplary arrangements the virtual indicia may be indicative of the dispense of the tangible currency bills from the particular automated banking machine. Such virtual indicia may be perceived by the user through the wearable device as in attached connection with the tangible currency bills through the course of storage and exchange of such tangible bills. Likewise a merchant representative wearing a device such as mobile device 100, or 107 is enabled to perceive the virtual indicia in attached connection with such currency bills. Such virtual indicia that has been placed in attached connection with such bills may be utilized by a merchant who receives such bills in the establishment where the automated banking machine is located, to determine that the bills were dispensed from the machine in the establishment. For example the attachment of the virtual indicia may be based on a determination through operation of the wearable mobile devices that the physically determined characteristics of the bills such as denominations and serial numbers correspond to bills dispensed from the machine in the establishment. However the perceivable virtual indicia that is in connection with such bills avoids the need to utilize other approaches to determine that the bills were received from the machine in the merchant establishment. Thus the virtual indicia may be utilized in lieu of or in addition to other indicators such as those previously discussed, that enable the merchant to provide the user providing such currency bills with attached virtual indicia, with a credit for transaction fees incurred by the user to receive the bills, or other benefits or incentives for spending the bills in the establishment where the machine is located. Further in exemplary arrangements the wearable mobile devices operated by the merchant representatives in the establishment that receives the tangible bills may operate to erase or otherwise remove the virtual indicia associated with the tangible bills once they have been received by the merchant. Of course these approaches are exemplary.

In other arrangements such virtual indicia may be attached to other tangible items that are provided through operation of the automated banking machine. For example in some exemplary arrangements, the physical currency bills that are delivered by the machine may have virtual indicia attached thereto to indicate the genuineness thereof to persons who receive such bills and are users of wearable mobile devices such as devices 100, 107. In other exemplary arrangements virtual indicia may be associated with receipts or other items that are provided by the machine in connection with virtual items of value, to provide recipients of such virtual items a way to further verify the authority of the user to possess or redeem such a virtual item of value. This may be accomplished through inspection of the receipt which has the virtual indicia perceivable in attached connection therewith. Such virtual indicia may be generated based on physical features or indicia of the receipt as well as other data associated with the receipt, for example. In other exemplary arrangements the user may utilize the virtual indicia that is perceived as attached to a physical currency bill to keep track of the source of each bill so that the user may determine the source from which the user obtained the bill if there is a later determination that the bill is counterfeit, for example. In still other exemplary arrangements the user may operate the wearable device to selectively mark tangible items which have been provided through operation of the automated banking machine with virtual indicia. This may be done in some exemplary arrangements through operation of the wearable device and inputs provided through the wearable device and/or through an input device of the banking machine by the user. For example in some exemplary arrangements the user may wish to have virtual indicia attached to one or more tangible currency bills as a reminder that the user is to use or transfer those bills in connection with a particular obligation, such as for example, to provide reimbursement for a loan from a friend or family member. Of course these approaches are exemplary and in other arrangements other approaches may be used.

In other exemplary arrangements an automated banking machine may be operative to provide communication between the user at the machine who is wearing a wearable mobile device 100 and a service representative who may assist the user in carrying out transactions at the automated banking machine. In an exemplary arrangement after a determination is made that a machine user is an authorized user, the controller associated with the automated banking machine such as automated banking machine 124, is operative to provide outputs through output devices that include transaction selection options to the user. The transaction selection options provided to the user may include the options for the user to receive a dispense of currency or a virtual item of value in a manner like that previously discussed. In addition the controller may be operative to present the user with other transaction selection options through a display such as display 26 or other output devices that include the option for the user to communicate with a service representative. The user at the machine may wish to communicate with a service representative in order to facilitate transactions that the user wishes to conduct through operation of the machine 124. In alternative arrangements the machine user may be required to communicate with a service representative in order to conduct certain transactions that may be available through operation of the machine. In exemplary arrangements the user is enabled to provide a transaction selection input corresponding to the request to communicate with the service representative through an input device of the machine such as a touch-screen display, function keys or other input device such as those previously discussed.

In some exemplary arrangements the controller associated with the automated banking machine is operative to communicate with at least one remote server such as server 126. The controller is operative to cause the server to communicate with a terminal that is operative responsive to a service representative that is located remotely from the machine. The terminal that is operated responsive to the service representative may be a mobile wireless device such as the device 78 which may comprise a smart phone, tablet or other similar mobile computer, or a wearable device such as devices 100, 107. In other exemplary arrangements the terminal device operated responsive to the service representative may be a computer such as a desktop computer or other suitable device that operates responsive to the service representative to enable the service representative to be notified of the request by the user and to provide communications by providing visual and/or audible inputs to the terminal and by receiving visual and/or audible outputs from the terminal. Such systems may include a plurality of different interconnected networks and service representative operated devices such as those described in the incorporated disclosures.

In other exemplary arrangements the terminal that operates responsive to the service representative may correspond to a computer that has been programmed to provide communications with humans and to respond in certain programmed ways to inquiries and requests. Such a computer may correspond to a chat bot, an artificial intelligence system, or a virtual service representative that has the ability to communicate with the user at the automated banking machine. Of course these approaches are merely exemplary.

Figure 6F:
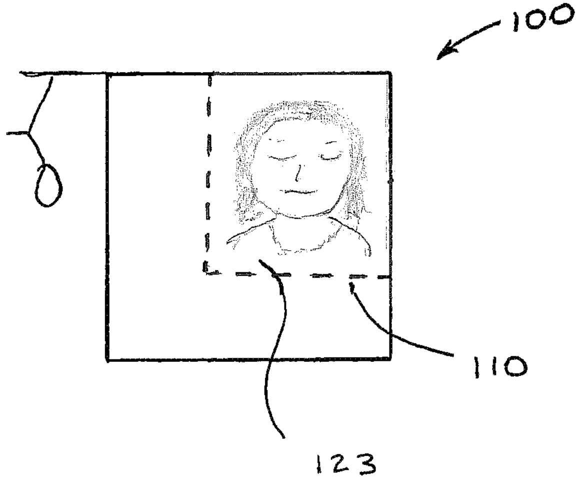
FIG. 6F is a view showing a service representative perceived by a user wearing a wearable mobile device.

In an exemplary arrangement in response to the transaction selection input from the user through an input device of the machine corresponding to a request for communication with a service representative, the controller operates in accordance with its programming to communicate with the appropriate service representative system and terminal device or server process that corresponds to the service representative capabilities. Responsive to receiving communications through the network 128 or another network such as a wireless network, the controller associated with the machine is operative to communicate through the wireless interface of the machine with the wearable device 100 of the user. The controller is operative to cause the circuitry 102 of the wireless device to receive signals that are operative to cause the at least one display 110 of the device 100 to output visual outputs through the at least one display 110 and audible outputs through the speaker 118 which correspond to the visual and/or audible communications from the service representative. As represented in FIG. 6F, in the exemplary arrangement the at least one display 110 of the wearable device 100 is operative to output to the user images corresponding to a service representative 123 while the user receives audible outputs from the speaker 118 of the wearable device corresponding to the audible communications from the service representative. Of course this approach is exemplary, and in other arrangements only visual images such as text, or audible outputs may be provided, or the visual outputs may not correspond to the appearance of a person.

In exemplary arrangements the user is enabled to communicate with the service representative that is perceived through the wearable device 100. This is accomplished through the microphone 116, speaker 118, at least one display 110 and in some arrangements the outward or inward facing camera 112, 114 of the wearable device. In some exemplary arrangements communications are made through the wireless interface 120 associated with the wearable device which communicates through the wireless interface of the automated banking machine. The automated banking machine in such arrangements communicates through the one or more wired or wireless networks in which the machine is connected, with the terminal that is operative responsive to the human service representative, or the server that comprises the terminal operative responsive to the programming that comprises the service representative. However in other exemplary arrangements the controller associated with the automated banking machine may operate to provide to the wearable device 100 with a link or other data and instructions usable by the wearable device to communicate wirelessly in a system in which the service representative terminal or server is connected. In this way the user is enabled communicate with the service representative without requiring the communications to pass through the automated banking machine. In some such exemplary arrangements the capabilities provided through the automated banking machine and the wearable device enable the user to obtain assistance from remote service representatives in systems that otherwise could not enable the user at the machine to receive service representative assistance. Of course it should be understood that these configurations and approaches are exemplary.

In exemplary arrangements the user is enabled to communicate with the service representative through the wearable device. Such communications may involve the service representative receiving and answering questions that the user has concerning transactions, the status of their account, or other services that the user may be seeking from the entity that holds their financial accounts or that otherwise provides the user with financial or other services. In other arrangements the communications with the service representative may enable the service representative to carry out transactions on behalf of the user. For example in some arrangements the user may communicate with the service representative and request to have the service representative carry out transfers of funds, make payments or take other actions. In some exemplary systems the service representative may carry out these requested transactions through the operation of the terminal device or other systems that are operative responsive to the service representative. In such arrangements the terminal device of the service representative may be operative to communicate through one or more networks such as network 128 with the automated banking machine. In such exemplary arrangements the terminal device may be operative responsive to the service representative to provide communications that cause the controller of the automated banking machine to display information to the user through the display of the machine or through the display of the wearable device 110 related to the transactions as requested by the user. Alternatively or in addition, the service representative may operate their terminal device to cause communications with the controller of the automated banking machine which cause devices of the machine to operate. This may include for example, communications that cause operation of the printer included in the machine to print a receipt for other document for the user that documents the details of the transactions that have been conducted on the user's behalf by the service representative. Of course this approach is exemplary of numerous different types of transaction functions that can be conducted through systems of exemplary arrangements.

In other exemplary arrangements the service representative may operate the service representative terminal to cause communications with the controller of the machine that cause operation of other devices included in the machine. For example in some exemplary arrangements the service representative may operate their associated terminal to cause a transaction in which physical currency bills are dispensed to the user from the dispenser of the automated banking machine. The communications from the service representative terminal received by the controller cause the controller to operate in accordance with its programming to cause the currency dispenser to deliver to the user the physical currency bills that the user has requested. In such an arrangement the controller may operate to communicate with the service representative terminal to confirm the dispense of bills which has been made by the machine. Further in some exemplary arrangements the wearable device 100 may further provide the ability for the service representative to view images from the outer facing camera 112 that confirm the dispense of the currency bills from the machine. The service representative may further communicate with the controller of the automated banking machine to operate the printer or other devices to provide the user with a receipt or other items in connection with the requested transaction. Of course it should be understood that the dispense of currency bills that is carried out by the machine responsive to the service representative terminal is exemplary of numerous different transactions that may be provided. Other transactions may include for example, the acceptance of cash by the automated banking machine into a currency acceptor or recycling mechanism of the machine. Other transactions may include acceptance of checks or other instruments through operation of the check acceptor or other depository device on the machine. Numerous different types of transactions may be carried out responsive to communication with the service representative depending on the capabilities of the automated banking machine and the particular system.

In other exemplary arrangements, the service representative may provide communications with the controller of the machine and/or the wearable device that enable the provision of virtual items of value to the user through operation of the wearable device and the automated banking machine. In such arrangements the terminal that operates responsive to the human service representative or the automated service representative server, may operate to cause virtual items of value of the types previously discussed, or other items of other types such as virtual documents, certificates, agreements or other things to be provided to the user responsive to actions and operations of the service representative. Such provision of virtual items of value may be done responsive to communications provided by the user through inputs to input devices of the automated banking machine and/or inputs through the input devices of the wearable device as well as communication with the service representative. Of course it should be understood that these approaches are exemplary and in other arrangements other approaches may be used.

Figure 7:
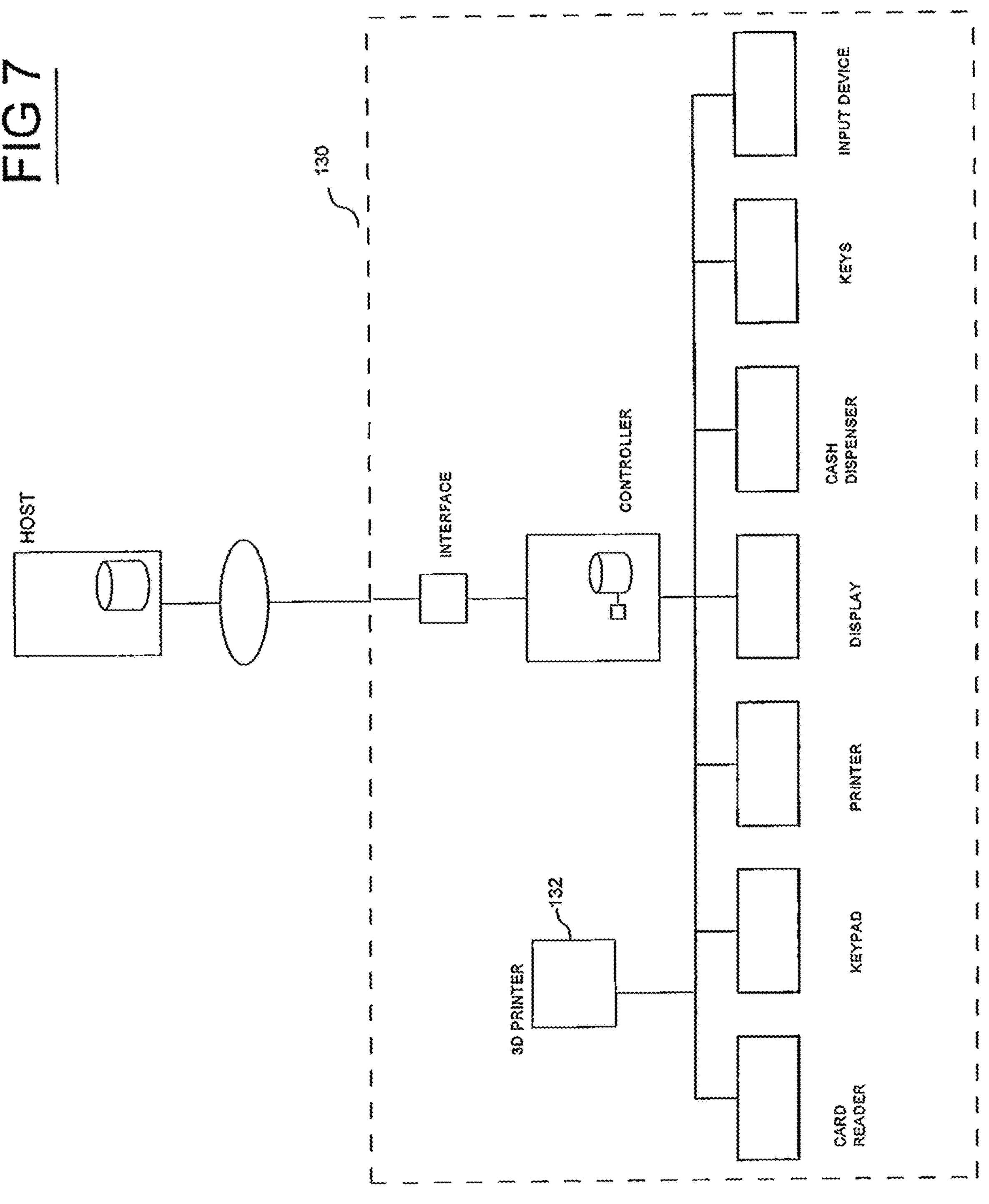
FIG. 7 is a schematic view of components of an alternative exemplary automated banking machine that has the capability of producing or configuring an article for a user.

FIG. 7 shows another exemplary automated banking machine with an alternative arrangement generally indicated 130. Automated banking machine 130 may generally operate in a manner similar to automated banking machine 12 previously described and may include similar components. This alternative arrangement also includes an item producing device generally indicated 132. In the exemplary arrangement the item producing device 132 includes a 3D printer. The 3D printer is utilized to produce items that are dispensed from or otherwise made available by the automated banking machine to a user.

In an exemplary arrangement a 3D printer or other type of material printer is utilized to produce an item that is representative of and/or is usable to obtain or is redeemable for value. Specifically in some exemplary arrangements the printer is operative to print patterns of conductive material that comprise RFID tags on a substrate to produce a token article. The RFID tags are usable to produce signals corresponding to values that identify the token article as genuine and that are associated with or representative of the value for which the token article is redeemable.

For example in some exemplary arrangements a user may operate the automated banking machine in a manner similar to that previously described in connection with a cash dispensing transaction. However, in an exemplary alternative arrangement the user may elect through inputs to the machine, to receive a token article corresponding to a selected value rather than cash. This would be done, for example, where a user wishes to receive a token article that is redeemable for a particular type of merchandise or services available from a particular identified retailer. For example in some arrangements the retailer may offer an additional bonus in terms of goods or services value above the amount that the user pays for the particular token in order to provide an incentive for the user to acquire the merchant's goods or services. Of course this arrangement is one of many that may be utilized in connection with the described features.

Figure 8:
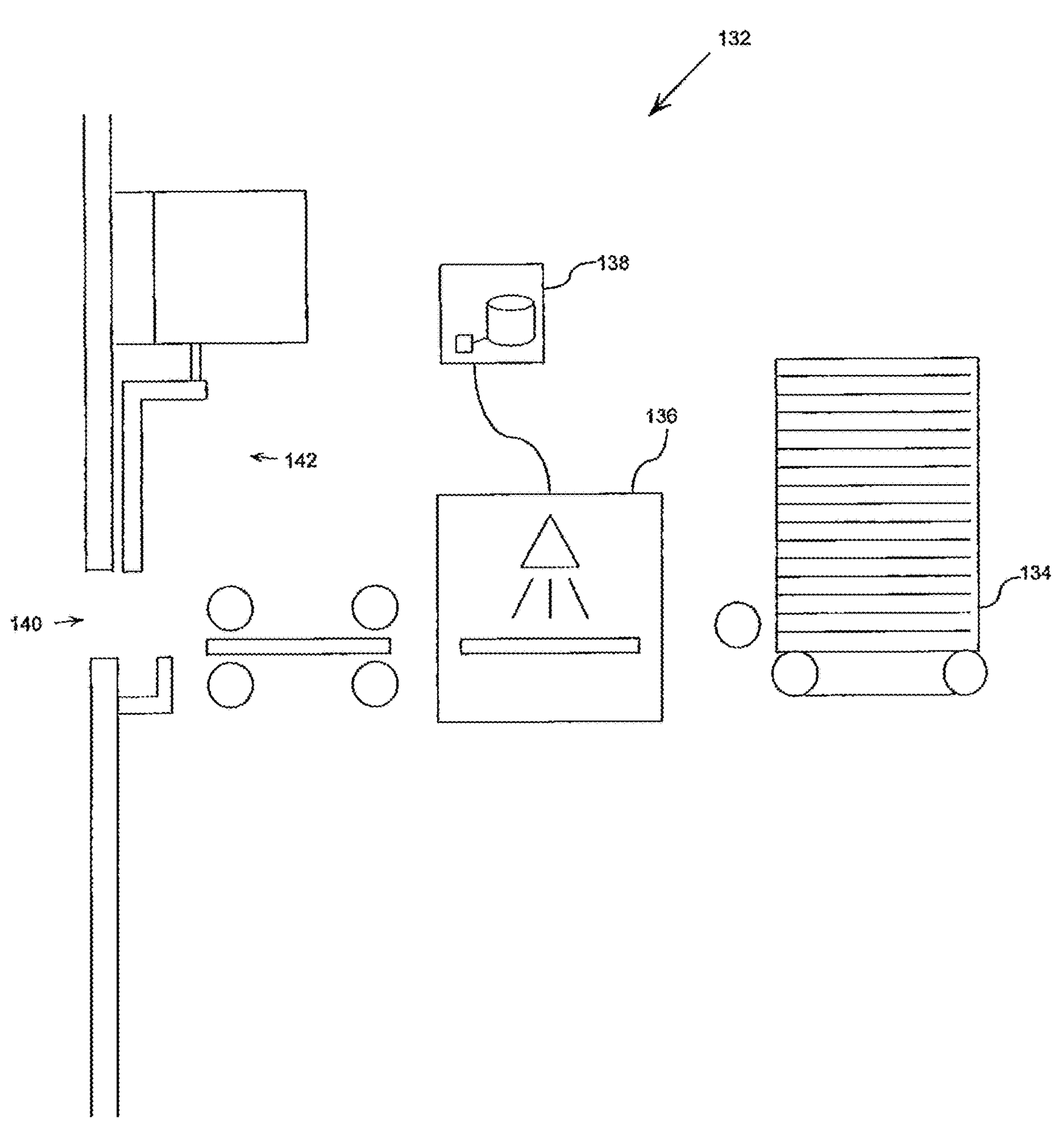
FIG. 8 is a schematic view of a 3D printer operated in connection with articles dispensed from an exemplary automated banking machine.
Figure 9:
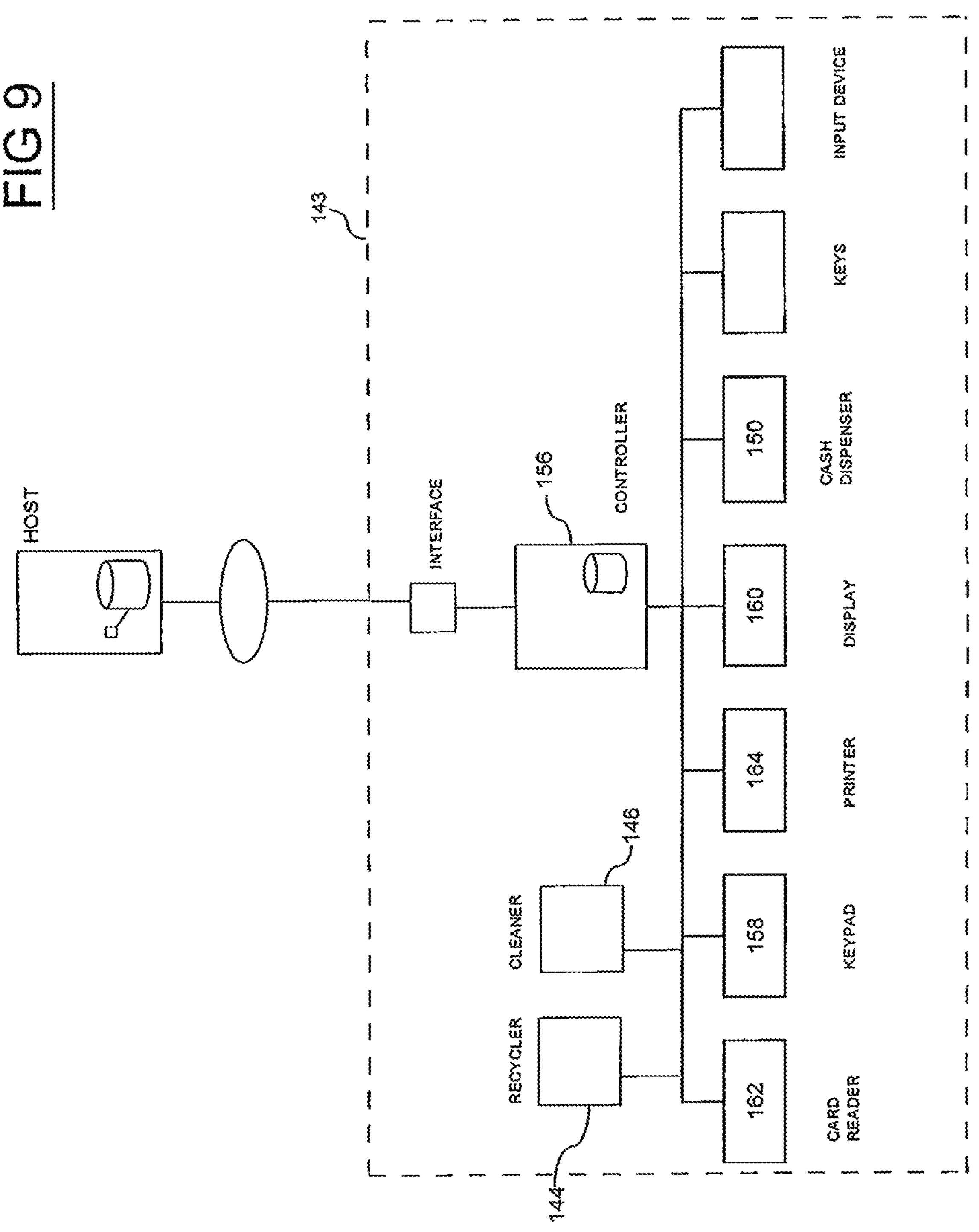
FIG. 9 is a schematic view of an alternative arrangement of an automated banking machine that provides the capability for disinfecting items dispensed from the machine.

In such arrangement the printer may operate as represented in FIG. 8 to produce a token article that includes indicia that can be securely redeemed for value by the particular merchant. In this arrangement the printer 132 includes a mechanism that operates to receive a piece of token substrate material from a storage magazine or similar storage area generally indicated 134. The single item of substrate that is removed from the storage area is then printed upon by applying one or more patterns of metallic conductive material thereon in a printing chamber 136. The printing chamber includes a printing head that deposits the metallic material such as silver or copper inks in patterns that correspond to one or more RFID tags. This is accomplished through control provided by circuit 138. Circuit 138 includes one or more processors and one or more data stores with programmed instructions such as those previously described that are usable to determine the value or values corresponding to the desired tags and to produce the patterns corresponding to the RFID tags that are produced on the token article.

It should be understood that in the exemplary arrangement one or more RFID tags that are produced on the substrate correspond to values that are known by the controller of the automated banking machine and that are communicated to one or more remote servers. This enables the token article that is produced through operation of the printer to be identified as genuine or otherwise acceptable by RFID tag readers or other items positioned at the locations where the token may be redeemed for goods or services of the merchant. Further as can be appreciated, the RFID tags and associated circuitry that are included on the token articles produced may include security features, encryption features, verification features, redemption indicating features, wireless outputs or other items and features that are usable to prevent counterfeiting and assure that the token presented is usable and genuine.

Once the exemplary token article has been produced by the printer, it is moved through operation of a suitable conveying mechanism through an opening 140 in the automated banking machine so that the token article may be received by a user. As can be appreciated, the opening may be controlled by one or more suitable gate mechanisms 142 or other mechanisms to help assure that access to the interior of the machine and the 3D printer from outside the machine is prevented. Of course it should be understood that production of token articles corresponding to value is merely exemplary of the types of items that may be produced through operation of an automated banking machine including one or more 3D printers or other printer types. For example in some exemplary arrangements the automated banking machine may be usable to produce plastic sheet materials. Such plastic sheet materials may include embedded metallic or non-metallic materials which may be usable to identify the sheets as genuine and also to indicate the value associated therewith. In addition visible and non-visible elements may also be produced within or on the sheets so as to provide a visual appearance that may indicate to a user the nature and/or value of the particular item. Such items may commonly include items such as scrip, coupons, tickets or other items that are representative of or are redeemable for value. Further in some exemplary arrangements such items may include embedded items that are included during their production in the machine. This may include, for example, batteries, sensors, output devices, input devices or other suitable items that may be either pre-produced and embedded in the appropriate locations within the item when it is produced, or alternatively produced by multiple different types of 3D printers and/or other printers or devices included in the machine. For example and without limitation, some arrangements may include the capability of the automated banking machine to produce a token, card or similar article that in itself can be operated as a transaction terminal that can be operated by a user to carry out certain types of financial transactions. This may be accomplished by producing an item that includes a wireless transceiver, input and output devices, contact or non-contact connectors and other things necessary to accomplish financial transfers through communication. Such a produced item for example may include the capability of transferring funds in an amount up to the associated value that the user selected in connection with the transaction that resulted in production of the item. Of course this approach is exemplary and many different types of items may be produced utilizing the principles discussed herein.

In some exemplary arrangements the automated banking machine may provide tokens, cards or other articles that include circuits including microprocessors and other electronic components. In some exemplary arrangements the microprocessors and other circuitry may include organic microprocessors and other electronic components. Such components may be produced for example in some exemplary arrangements by depositing thin films of alternating layers of organic material (for example, pentacene and insulators) and metallic materials such as conductive inks for interconnections. Such layers may be deposited onto a substrate such as a plastic material to produce microprocessors and other circuit components that can execute instructions and other circuit component functions, and to provide outputs via card contacts, RF transceivers or other devices that are usable in connection with providing transaction data or other information used for purposes of transactions.

In some exemplary arrangements such technology may be utilized for purposes of providing microprocessors on or in transaction cards that can be used to provide verification of the genuineness of the card. This may include, for example, producing microprocessor circuitry from organic material that carries out algorithmic functions that identify the particular card as genuine. These algorithmic functions may be those developed by certain industry standard setting organizations such as EMV. Using such approaches data supplied as signals to circuitry on a card produces a result which indicates that the card is the genuine card and not a counterfeit. Such techniques are particularly useful in connection with magnetic stripe cards for which providing the separate circuitry including processor capability is usable to generate verification values that provide an indication that the card is not counterfeit. Thus for example in an exemplary arrangement, data from a magnetic stripe on a card may be read by a card reader to provide account number and other data related to an account on which a transaction can be conducted. In addition, certain inputs to the microprocessor circuitry can be used by the circuitry to produce one or more results. Such one or more output results may be communicated and/or compared or otherwise used for purposes of comparison to data that indicates the genuineness of the card. Different types of algorithms may be used for purposes of the programming of the microprocessors so as to utilize different input values or other parameters to produce results which can be verified as appropriate and corresponding to a genuine card. As can be appreciated, various forms of encryption and decryption and other security functions may also be included in such circuitry that includes the microprocessor.

In some exemplary arrangements an automated banking machine may be operated to apply microprocessor including circuits directly to an area of an existing card. Such microprocessor based circuitry may then be utilized thereafter to verify the genuineness of that particular card. In some exemplary arrangements the microprocessor based circuitry may communicate via direct contact with conductive contacts that engage the circuitry on the card that is applied through printing or other techniques. In other arrangements the applied microprocessor circuit on the card may communicate in a wireless manner via radio signals or other signals similar to RFID tags previously discussed.

In some exemplary arrangements the automated banking machine may operate to take an existing card and with the permission of the user, apply the appropriate circuitry thereto to add verification capabilities that are usable in the future to verify that the card is the genuine card. In other arrangements, the automated banking machine may operate to build for the user a new card or other article that includes appropriate circuitry to verify that the card or article is genuine.

This may be done in some arrangements, for example, by having a stored group of cards or other items which serve as the substrate or base part for the articles to be produced. The circuits including microprocessors and other components is then applied to the substrate or base part to produce an article that can be used to provide transaction data such as account number, user name and other information, and then also provides outputs that can be used to verify that the item is genuine.

In still other arrangements, 3D printer technology may be utilized to produce an item without the use of a starting substrate or base part. In some exemplary cases the 3D printer may be operated to produce a card shaped article that includes therein circuitry and other components that enable the use of the article as a credit card or a debit card. This may include, for example, circuits including microprocessors or other devices produced via substance deposition techniques in appropriate configurations. Such circuits are operative to store and securely deliver account data, verification data and other data that can be utilized to carry out transactions. For example card-like articles that wirelessly communicate with automated banking machine card readers can provide account data to be used to carry out purchase or banking transactions through connected terminal devices.

In still other exemplary arrangements, articles may be produced that include appropriate circuits that communicate transaction data and/or other data with other devices so that a user can obtain goods or services through use of the particular item. For example in some exemplary arrangements a 3D printer may be utilized to produce a wearable article for a user that provides account data and other transaction data to systems that communicate with the device. This enables a user to make purchases, transfer funds and carry out other functions without need for interaction with dedicated financial transaction terminals. For example in a transaction environment where a user makes purchases, the user may be provided with a wrist band or pendant that the user can wear while in the area where transactions are enabled to be conducted. Articles that a user can purchase are labeled with RFID tags or other indicators of a price associated therewith. By transporting the items from a location where they can be viewed and are positioned for sale within the establishment, to another area of the establishment such as an area adjacent to the exit, wireless transceivers determine the particular articles that the user is carrying and the user's account data by communication with the wearable article worn by the user in the transaction environment. The user's account may then be automatically charged for the items that are taken.

In alternative exemplary arrangements that article may be produced via 3D printing or other techniques previously discussed, and provided to a user for use in an area where the user may receive and be charged for goods or services. Such areas may include for example, amusement parks, theme parks, fairs, movie theaters or other areas where a user is charged based on where they travel within the establishment or venue. The article provided to the user may wirelessly communicate with sensors located in different areas so that the user's account is automatically charged for the attractions that are visited and/or services or goods received by the user. This may involve wirelessly sensing the presence of the article and receiving the account data therefrom as the user travels adjacent to sensors located at the entrance and/or exits of various attractions/services areas. Thus, for example, in an environment where a user is attending a theme park, the user may be charged for visiting certain premium areas of the park when their portable article is sensed within the premium area of the park.

In some exemplary arrangements, the article produced for the user may correspond to the particular transaction environment in which the article is to be used. For example if the article is to be presented in a theme park, the article may be produced as an attractive pendant including a design based on the logos of the theme park or the characters (such as cartoon or other characters) associated with the theme park. Further 3D printing techniques may be used to include in the transaction article that is produced, personalized information such as the user's name or initials or features such as words or symbols selected by a user. For example if a theme park is associated with several different cartoon characters, the article produced for the user can be made in the shape of the user's chosen character that is selected via inputs to the automated banking machine that operates to produce the item via 3D printing techniques. Of course these approaches are exemplary and in other arrangements, other approaches may be used.

In still other arrangements, the transaction articles produced may be suitable for generally continuous use in multiple different transaction environments. This would enable the user to use the article that is produced in making purchases of goods and/or services in any establishment where the account data and verification data can be read by suitable sensing equipment. Alternatively such articles produced may be programmed so that they are limited and can only be used during a given period of time. For example in the case of a theme park where a user has purchased a one-day pass, the transaction article produced through operation of the banking machine may be operable to provide transaction data that is accepted for carrying out transactions only during that day. In still other arrangements wireless or contact communication with the article may be used to selectively turn the transaction capabilities of the item on and off. Thus for example if the particular article is a token article that is usable for making purchases in a particular type of store, wireless communication or other communication with a transceiver may be utilized to turn on the capabilities of the article to provide account or other transaction data when a user enters the store and the capabilities of the article may be turned off automatically when the user exits. This may be done securely so that user transaction data cannot be obtained from the item by unauthorized persons. Alternatively or in addition provision may be made for the transaction capabilities of the article to be selectively turned on and off by a user. This may be done, for example, by inputs to switches, buttons, keypads or other input devices that are included in the article. Such input devices may be included through the 3D printing techniques or other printing techniques for including circuitry and other features in articles as previously discussed.

Further some exemplary arrangements may include using an automated banking machine to produce an article that has additional verification features. Such features may include, for example, circuit components and microprocessors that have the capabilities to receive inputs from users. As previously discussed, such articles may include input devices such as user actuatable keypads or similar devices that can receive personal identification numbers or other codes from a user. Thus for example in some exemplary arrangements an article can be produced for a user that includes a small keypad into which a user can provide a selected input that enables the device to output user account data and/or otherwise carry out transactions until the capability is disabled. Such disabling capability may be provided by the user providing an additional input through the keypad or other device. Alternatively in other arrangements the article may be made so that use of the device in connection with conducting a transaction causes the circuitry therein to be operable responsive to the programming of the circuitry, to disable the operation of the device after a single transaction has been conducted. Thereafter the user would have to provide inputs or otherwise enable the article again if the user desired to conduct another transaction. For example in some arrangements if the article has been transaction enabled via inputs from a user, the article may wirelessly communicate via RF to deliver data corresponding to the user's account and data which indicates the genuineness of the article, in response to signals received from a transceiver associated with a particular merchant terminal or a merchant establishment. In situations where the article was not transaction enabled, the article would not provide such communications and no such transactions could be conducted.

In other arrangements other types of input devices may be included in transaction articles that are produced through operation of the automated banking machine. Such input devices may include, for example, sensors that are suitable for reading biometric inputs such as fingerprints. For example layers of suitable materials for sensing the ridges of a user's fingerprints may be utilized to receive the unique data associated with contact with an authorized user's finger. For example in some arrangements if the user's finger is not currently in contact with the sensing area of a given article, the article will not operate to communicate account data with transceivers that are connected to a transaction system. Alternatively in other arrangements, programming associated with the article may be enabled to remain operative to deliver account or other data for a period of time after the sensing area has been in contact with an authorized user's fingerprint. In still other arrangements other types of sensing devices may be utilized for purposes of verifying codes, images, audible words, voice recognition or other things that are uniquely associated with a user for purposes of verifying that the article is in possession of and is being used by an authorized user to conduct transactions. Of course these approaches are exemplary and in other arrangements other approaches may be used.

In still other exemplary arrangements enhanced security for card based transactions may be accomplished by providing a user with a card, token or other device that may be used as an adjunct to their transaction card when carrying out transactions. As previously discussed, enhanced security for card based transactions is achieved by including a circuit including a microprocessor on or in a card, which circuit executes algorithms and produces results which indicate that the card is genuine. Processor chips may be included on magnetic stripe cards for purposes of verifying card genuineness and reducing the risk that the magnetic stripe card has been counterfeited. In such arrangements the fact that the magnetic stripe of the card includes proper data identifying the user and/or their account and the chip on the card, when properly supplied with certain input signals and/or values produces a particular result, shows that the card is genuine. However, providing users with a card with both a magnetic stripe and a chip may be more expensive or have other drawbacks than providing to the user a card with a magnetic stripe alone. This is particularly true if the user has already received a magnetic stripe card that does not include a processor chip.

In exemplary arrangements in order to provide enhanced security, the user is provided with a separate article that can be used in conjunction with the magnetic stripe card. In some exemplary arrangements the user is provided with a card or token that includes a circuit including a processor programmed with suitable program instructions to produce results that can be used to verify authenticity of a card. Such programmed instructions may correspond to the algorithms developed by EMV Co. and which have been adopted by many transaction processors and card issuers. Of course these approaches are exemplary and in other arrangements other types of algorithms for card verification routines may be utilized.

In some exemplary arrangements the circuitry embedded in the validation device may include wireless communication capabilities so as to enable non-contact communication with a transaction terminal such as an automated banking machine. Such communication may include radio frequency communication of messages with a transceiver positioned in the machine. Such a transceiver may include an RF transceiver positioned within the card reading device of the banking machine that reads the magnetic stripe data on a card. Alternatively the transceiver may be located in another location on the automated banking machine. An advantage of positioning the transceiver in the card reader is that it may be used to communicate with circuits including microprocessors that are embedded in cards that include readable indicia such as a magnetic stripe, as well as with separate verification articles that are separate from the magnetic stripe card. For example in some arrangements the transceiver may operate to communicate with the verification article which is positioned in close proximity to the card slot of the automated banking machine. In such arrangements while the card bearing the magnetic stripe or other machine readable indica is received and read by the card reader, the verification article is placed in close proximity to the card reader slot and communicates with the transceiver so as to receive the initiation messages and provide the results in response thereto so as to confirm the genuineness of the associated magnetic stripe or other type card. Further in exemplary arrangements, the verification article is programmably changeable through communication with the transceiver so that in subsequent transactions the verification results data produced through operation of the circuit and microprocessor on the verification article corresponds to different results required to verify the identity of the magnetic stripe or other type card in such subsequent transactions.

In other arrangements the verification article may include other types of devices. For example in some arrangements the verification article may comprise a wearable computer device which is worn by a user. In such arrangements the programming associated with providing the results data to the transaction terminal which confirms the authenticity of the magnetic stripe or other type card, is provided through communication with the RF transceiver and processor circuitry included in the wearable computer article. The processor included in the wearable computer executes the algorithms that provides the results which verify the authenticity of the card. Further one or more data stores associated with the wearable computer article enables the results to be modified and to correspond to what is required to authenticate the card in subsequent transactions. Further in some exemplary arrangements the wearable computer article may include data for multiple magnetic stripe or other type cards so that each may be authenticated through communication with the wearable article. As a result the wearable computer device can serve as the verification article for multiple cards.

In still other exemplary arrangements a portable communication device such as a smart phone may include programs that cause the at least one processor in the smart phone to execute the verification algorithms that receive inputs and produce results that can be used to authenticate one or more magnetic stripe or other type cards. Such a smart phone may communicate via radio frequency communication with a transceiver in an automated banking machine so as to receive the initiation data and provide the necessary results which help to prove the authenticity of the card. This may be done via communication by a near field communication, Bluetooth or other suitable communication type.

Thus these exemplary arrangements enable a magnetic stripe or other type card that does not include a processor thereon to nonetheless be verified as a genuine card by a user having possession of the verification article which executes the verification algorithms and provides to a transaction terminal the one or more results that indicate that the card and/or card-article combination is genuine. Such approaches can be used to avoid the need to deploy magnetic stripe or other cards that have included thereon processors which execute algorithms to verify the genuineness of the card. Of course these approaches are exemplary and in other arrangements other approaches may be used.

In still other exemplary arrangements remote communications may be utilized for purposes of verifying the genuineness of a transaction card such as a magnetic stripe or other type card. In such exemplary arrangements, a portable device such as a smart phone with the ability to communicate over a wide area network may execute the algorithms that produce results which demonstrate the genuineness of a card. These may include, for example, the EMV algorithms or other algorithms that are normally executed on a microprocessor chip that is resident on a card. Rather than providing short distance RF communication as in the previously described arrangement, such a smart phone or other device may provide other wide area network communications such as via cellular phone or wireless Internet connections to the transaction processing host that processes the card data. The communication of the verification data via the wide area network may be encrypted to further assure that such communications are not fraudulent. Further in order to avoid the risk of fraudulent communications, the location of the verification article which comprises a portable wireless device such as the smart phone, can be determined by the one or more computers associated with the system via global positioning system signals to verify that the device is in proximity to a transaction terminal or other transaction request location. This may be done using features such as those disclosed in U.S. Pat. Nos. 8,479,983; 8,505,814; 8,540,147 and/or 8,561,889 the disclosures of each of which are incorporated herein by reference in their entirety.

Of course it should be understood that these approaches may be combined or used in conjunction with other approaches that are described in the incorporated disclosures for purposes of verifying that a transaction that a user is requesting at an automated banking machine or other transaction terminal, is authorized by the user. Such approaches may include, for example, approaches where the user is contacted via their smart phone or other mobile wireless device through an automated system, and requested to provide at least one input to verify that the transaction should proceed. In such arrangements the portable wireless device of the user may operate not only to provide a message to the system to indicate that the transaction should proceed, but may also communicate with the system to receive the necessary initiation data and provide the results which demonstrate that the user card being utilized in connection with the transaction, is genuine. Such systems may utilize features such as those described in U.S. Pat. No. 8,353,450 the disclosure of which is incorporated herein by reference in its entirety. Of course these approaches are exemplary and in other arrangements other approaches may be used.

FIGS. 9-17 describe an alternative automated banking machine generally indicated 143. Machine 143 is generally similar to machine 12 previously described except as otherwise indicated.

Machine 143 includes at least one recycler module generally indicated 144. In exemplary arrangements the recycler may be a belt type recycler. Exemplary arrangements may include features like those described in U.S. Pat. Nos. 6,367,692; 6,367,691; and/or 6,264,102 the disclosures of each of which are incorporated herein by reference in their entirety.

The exemplary arrangement further includes one or more cleaner/disinfecting devices generally indicated 146. In exemplary arrangements the cleaner/disinfecting devices may include one or more ultraviolet radiation emitting devices. Such a device may be used in an ultraviolet germicidal irradiation (UVGI) cleaning/disinfecting method. Such devices may be operative to emit UV-C or other radiation that operates to kill bacteria and viruses on surfaces, including the surfaces of currency bills (which are alternatively referred to herein as notes). In addition or in the alternative the cleaner/disinfecting devices may also include devices that operate to scrub currency notes and to apply vacuum or other forces designed to cleanse the surfaces thereof of impurities and other unwanted substances. In some arrangements the cleaner/disinfecting devices may be usable to kill disease transmitting organisms that may reside on the surfaces of currency bills. Alternatively or in addition in some arrangements such cleaner/disinfecting devices may be usable to remove undesirable substances such as the residue of illegal drugs or contaminants or other impurities that may be present on bills, so that such substances cannot be detected or absorbed through the skin by persons who receive and handle such bills.

Figure 10:
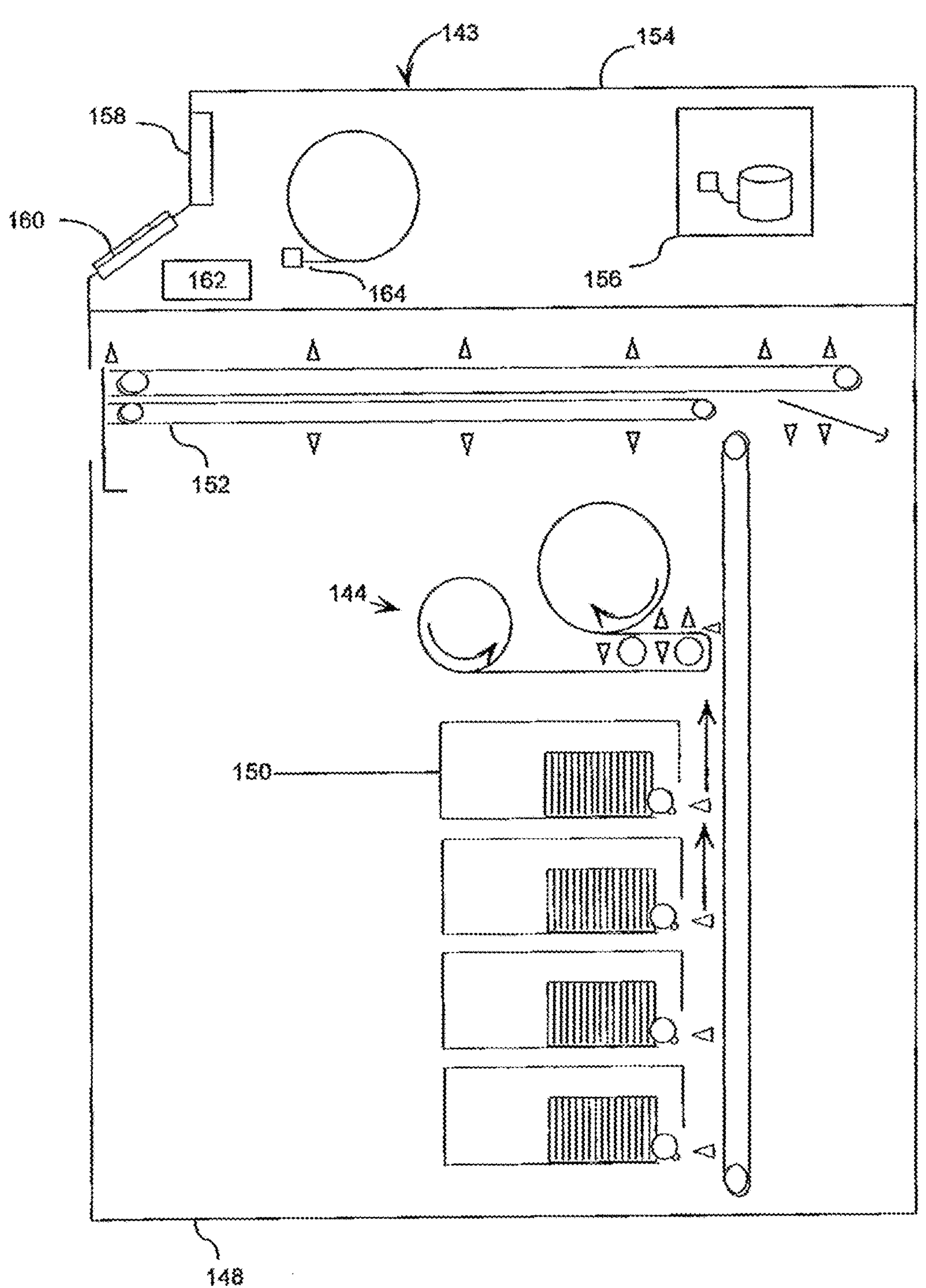
FIGS. 10-12 are schematic views demonstrating operation of the exemplary automated banking machine shown in FIG. 9 in connection with dispensing disinfected items.
Figure 11:
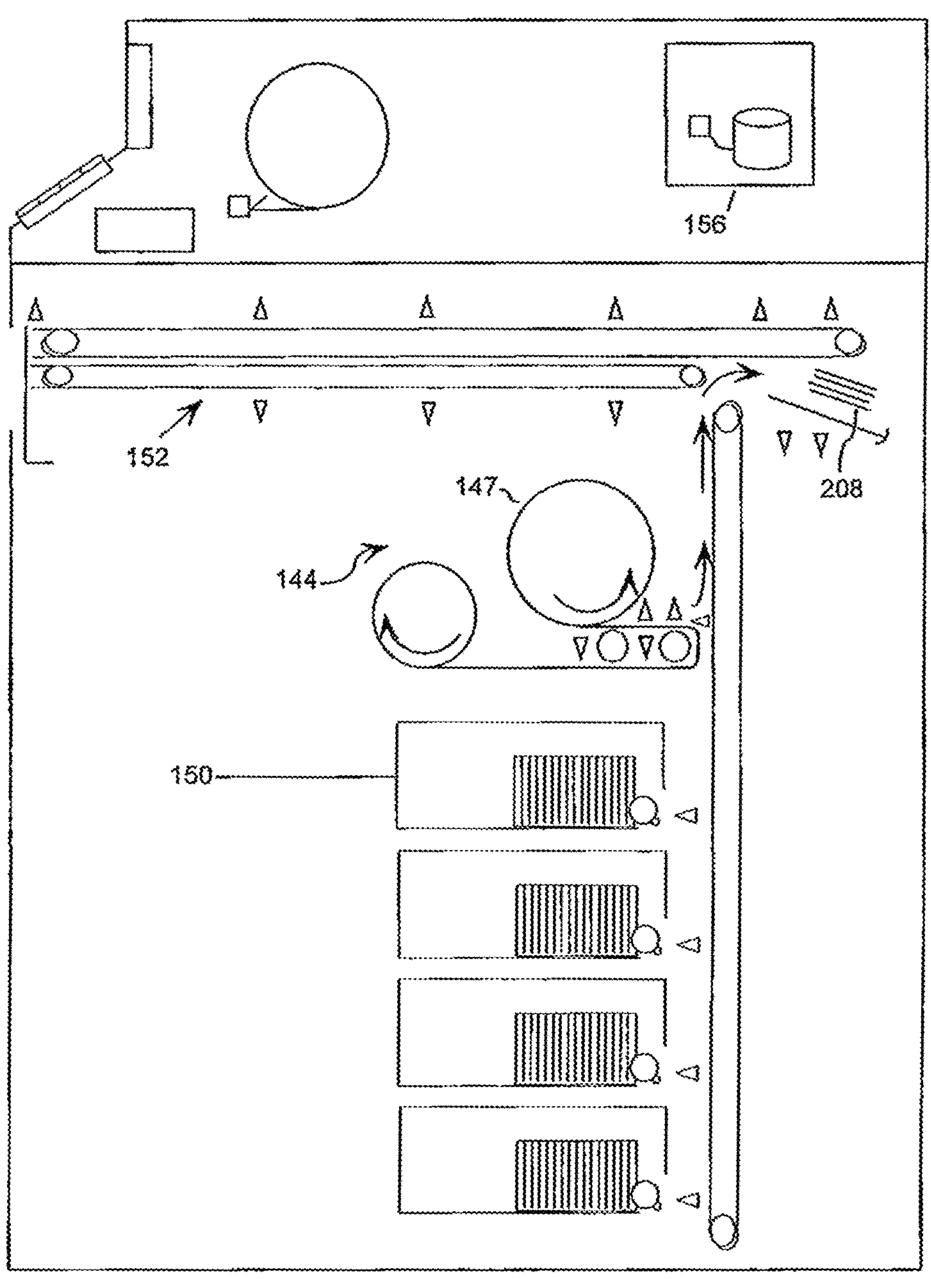
Figure 12:
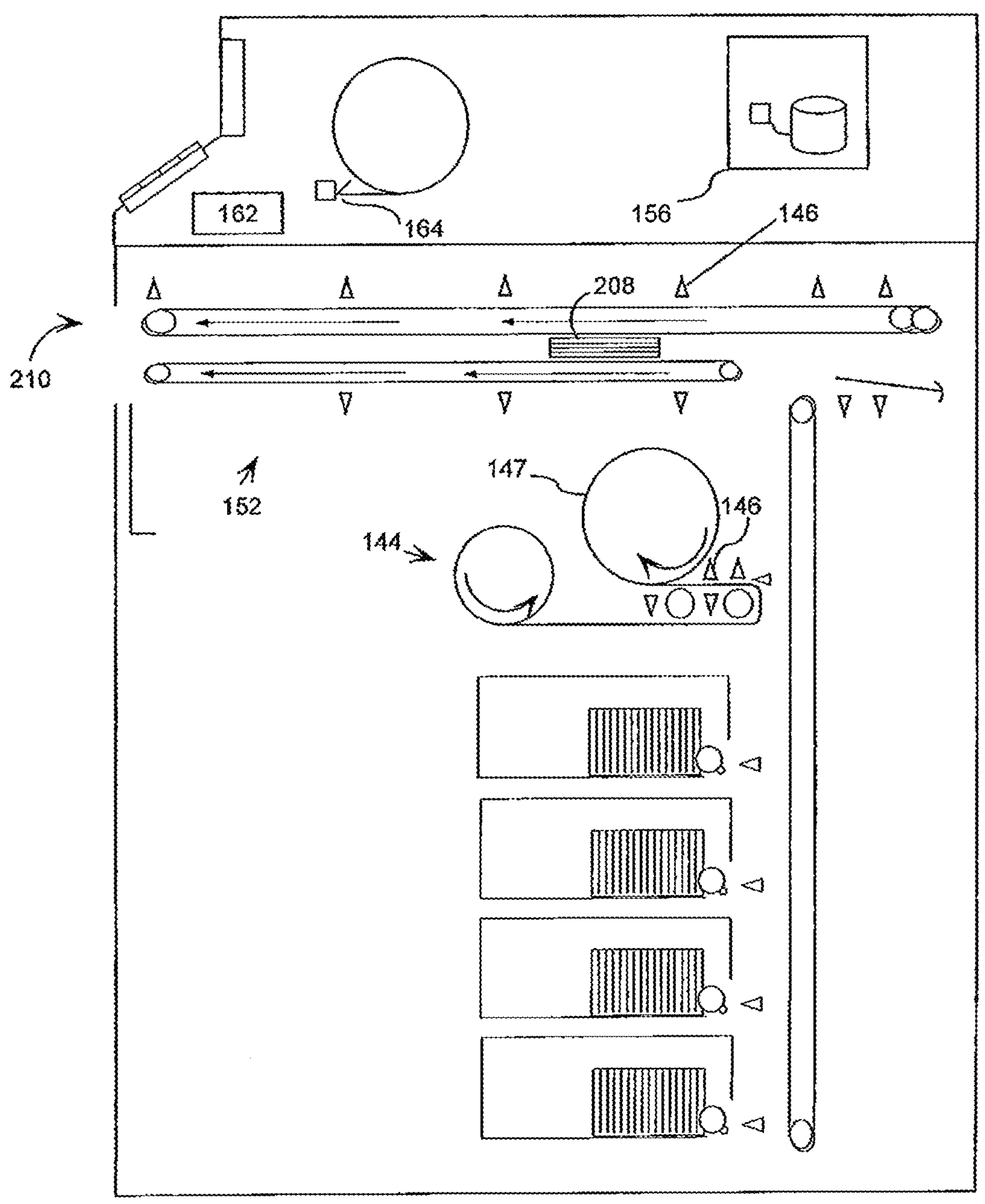
Figure 13:
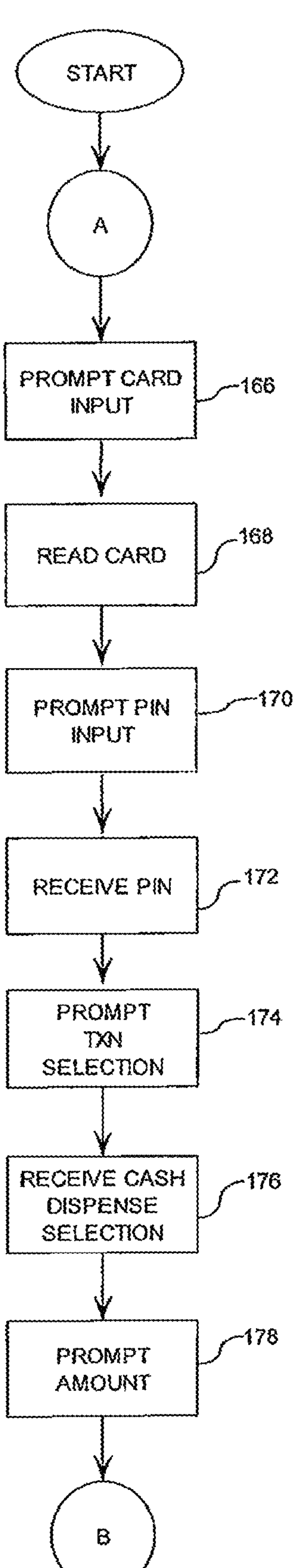
FIGS. 13-17 are a schematic representation of steps carried out by an exemplary controller of an automated banking machine in connection with dispensing disinfected items.
Figure 14:
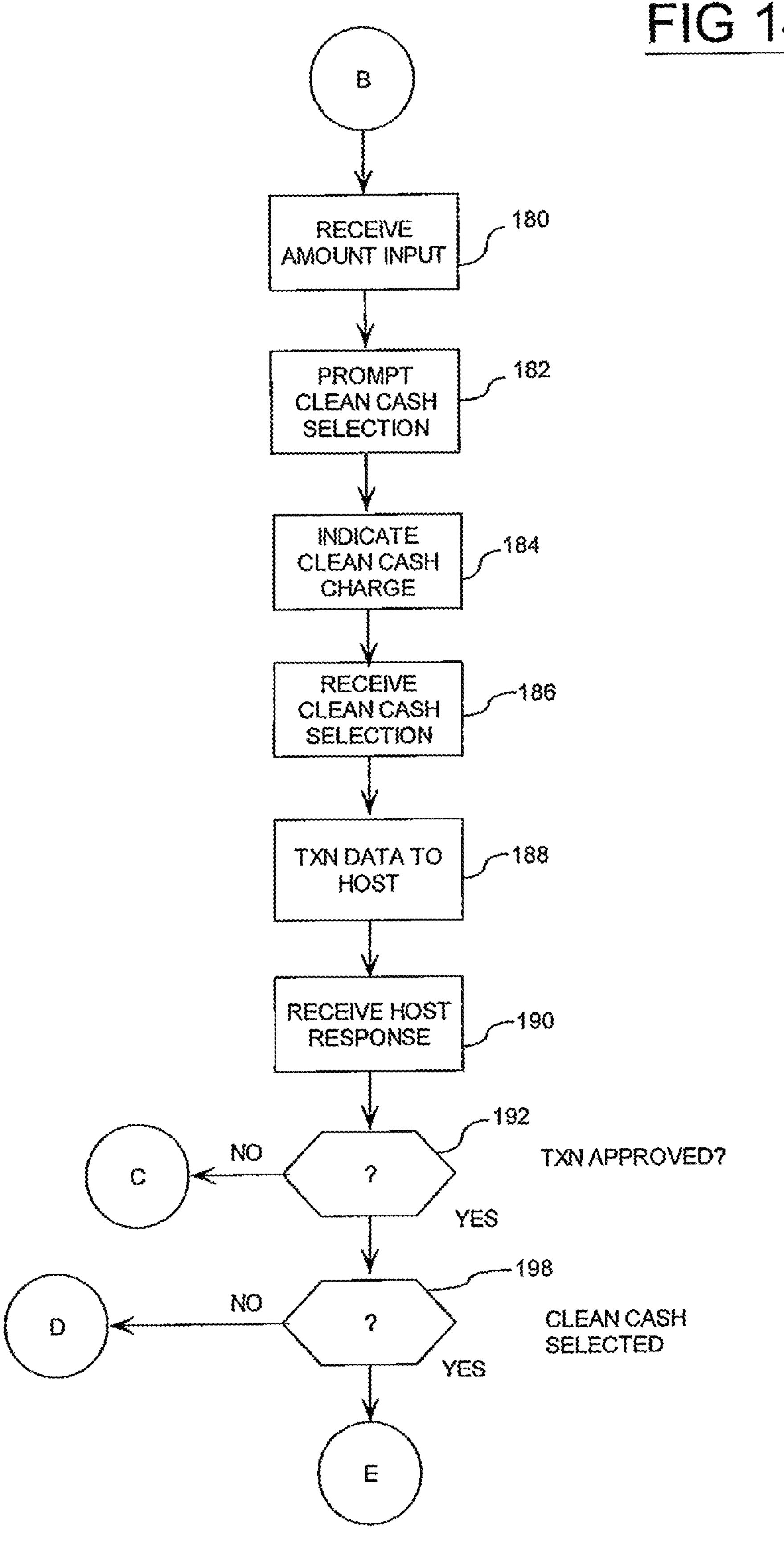

FIGS. 10-12 schematically show certain components of exemplary automated banking machine 143. In the exemplary arrangement the automated banking machine includes a lower chest portion 148. Chest portion 148 includes bill dispenser mechanisms 150. The exemplary bill dispenser mechanisms 150 may operate to selectively dispense currency bills that are stored in the machine and deliver them to machine users through a presenter 152. The bill dispenser mechanisms may include features of the type shown in U.S. Pat. No. 7,780,073, the disclosure of which is incorporated herein by reference in its entirety. In other exemplary arrangements the bill dispenser mechanisms may include bill recycler mechanisms. These may include mechanisms that both receive and store currency bills and also selectively dispense currency bills from storage. These currency recycler mechanisms may operate in the manner of incorporated disclosures, including U.S. Pat. Nos. 6,331,000 and 8,356,748, the disclosures of each of which are incorporated herein by reference in their entirety. Further in some exemplary arrangements the automated banking machine may include some mechanisms that are suitable only for dispensing sheets from storage, while others are usable to both receive and store as well as dispense sheets. The particular configuration utilized will depend on the particular requirements of the machine. Further in the exemplary arrangement the chest 148 houses the belt type recycler mechanism of the exemplary arrangement 144. Of course it should be understood that the exemplary arrangements include actuators, controllers, sensors and many other mechanisms not specifically shown that enable the machine to carry out the functions that are hereinafter described.

The exemplary automated banking machine 143 further includes a top housing portion 154. The top housing portion 154 is positioned above the chest and houses the machine controller 156. The top housing 154 also supports the display 158 and the keypad 160. The exemplary top housing further supports the card reader 162 and the printer 164. The top housing also may support additional devices such as function keys, input devices, output devices, transceivers and other suitable devices for the operation of the machine.

In the exemplary arrangement the automated banking machine 143 is operative to utilize the cleaner/disinfecting devices 146 to produce currency bills that are generally free of bacteria, viruses and other potentially harmful items so as to reduce the risk of disease (or other illnesses) that may occur from handling such items. This is done in the exemplary arrangement by operating the currency dispenser mechanisms responsive to the at least one controller 156 when the machine is not performing transactions for a user. This is done as represented in FIG. 10 by the machine operating to move currency bills from at least one bill dispenser mechanism 150 into storage on the belt recycler 144. During the exemplary operation the cleaner/disinfecting devices operate so as to irradiate the bills before they are loaded onto storage in the belt recycler device using UV-C emitters. In the exemplary arrangement the bills moving into storage on the bill recycler move in supported connection with sets of transversely staggered belts. These belts which move the bills into engagement with a bill storage roll 147 of the belt recycler are offset so that all of the surface areas of all the bills are irradiated.

Further, in some exemplary arrangements the belts which move the previously irradiated bills include impregnated silver or other substances that are operative to retard the growth of harmful bacteria. Similarly, the storage roll, tape, or other storage media can include such substances that will retard and/or prevent the growth of undesirable bacteria and viruses on currency bills. In this way the machine operates to store a supply of clean, disinfected bills on the storage roll 147 of the bill recycler 144. In alternative arrangements, cleaned or disinfected currency bills can be stored by the machine in one or more currency cassettes instead of (or in addition to) on the storage roll 147. Such a currency cassette can be designated (or recognized) by the controller (or the machine) to only contain (or hold) cleaned or disinfected currency bills.

Further in some exemplary arrangements the cleaning/disinfecting devices may operate to not only irradiate the bills but also to clean the bills so as to remove undesirable substances. This may include, for example, passing the bills through a cleaning mechanism such as sets of moving brushes or other devices to loosen particulate materials or other materials that are adhering to the bills.

Further in exemplary arrangements a vacuum system may operate to pull and collect the impurities that are dislodged from the bills so as to carry the impurities away from the bill surfaces. Such systems may be used for example to remove residues of narcotics that may be present on the surfaces of bills that have been passed by persons who use or deal in illegal drugs. This may avoid, for example, persons receiving from the machine currency bills that may cause drug sniffing dogs or other narcotics sensing systems to be triggered from the use of the particular bills. Of course it should be appreciated that additional or alternative methods for cleansing bills and disinfecting bills may be used. This may depend on the quality of the particular bills. For example in some countries where plastic currency notes are used, certain solvent or other cleaning materials may be appropriate for use in connection with disinfecting such bills that would not be appropriate for use in connection with paper or cloth bills. Alternatively in some arrangements heating or cooling devices may change the temperature of bills to kill undesirable organisms. Of course the particular type of cleaner/disinfecting devices included in the automated banking machine will depend on a number of different circumstances that are involved and the particular substances and organic material that is desired to be removed or neutralized.

The exemplary arrangement of the automated banking machine may be operated responsive to programmable instructions stored in the one or more data stores associated with controller 156. The exemplary logic flow carried out by machine 143 is represented in FIGS. 13-17. In operation of the exemplary machine, the user may be prompted through an initial display screen output to input their user card to the card reader of the machine. This is represented in step 166. The controller 156 in the machine operates to cause the card reader to read data from the card that is usable to identify the financial account. This is represented in the step 168. The controller then operates in accordance with its programming to output through the display a prompt message which instructs the user to input their personal identification number (PIN). This is represented in a step 170. The controller then operates to receive the user input of the PIN through the keypad in a step 172.

The controller 156 then operates to cause the display to output at least one screen that prompts the user to make a transaction selection. This may include a step that presents the user with a display prompt to select a particular account on which their transaction is to be conducted, such as checking or savings. This is represented in a step 174. For purposes of this example, it will be assumed that the user requests the transaction that includes a dispense of cash from the machine. The controller operates to receive the user's input request to receive cash through one or more input devices. This is represented in a step 176. Once the user has input their selection to receive a cash dispense, the controller operates to provide at least one output through the display that prompts the user to input the amount of cash they wish to have dispensed. This is represented in step 178. The controller then operates to receive the user input amount through a user input device on the machine. This is represented in a step 180.

In the exemplary arrangement the program steps stored in the at least one data store associated with controller 156 include data that enables the controller to output a display that prompts a user to provide at least one input concerning whether they wish to receive clean and disinfected cash from the machine. This is represented in a step 182. The machine also provides at least one output that indicates to a user that a charge will be assessed for receiving clean and disinfected cash from the machine. This is represented in a step 184. Steps 182 and 184 may be combined as a single step. In response to these outputs, the machine operates to receive at least one input from the user which indicates whether they wish to receive clean and disinfected cash from the machine or not. The receipt of this indicating input is represented in the step 186.

After receiving the input from the user concerning whether they wish to receive disinfected and cleaned cash, the at least one controller 156 operates in accordance with its programming to send the transaction data associated with the user selected transaction to the remote host computer. This is represented by step 188. The host computer of the exemplary arrangement operates in a manner like that previously described to obtain a determination whether the transaction is authorized or not. It should be appreciated that in this exemplary arrangement the user has selected to receive cleaned cash from the machine. The associated surcharge associated with receiving the cleaned cash will be included in the amount to be assessed to a user's account if the transaction is approved. If the user has not elected to receive cleaned and disinfected cash from the machine, the surcharge is not included in the transaction data sent to the host concerning the amount of the transaction. Of course it should be understood that this approach is exemplary and other approaches, such as independently assessing the surcharge fee through separate machine communications with the host or another computer (e.g., a remote server), may alternatively be used.

As represented in a step 190, the automated banking machine receives a response from the host which indicates whether the transaction is approved or not approved. The at least one controller operates responsive to the received host message in a step 192. If the transaction is not approved, the at least one controller 156 operates to cause the display to provide an output that the transaction has been denied. This is represented in a step 194. The controller also operates to return the user's card in a step 196 and returns the machine to a wait state for the next transaction.

If in step 192 the transaction is indicated to be approved, the at least one controller 156 then makes a determination whether the user has elected to receive cleaned and disinfected cash from the machine. This is indicated in a step 198. If the user has not elected to receive cleaned and disinfected cash from the machine, the at least one controller operates in accordance with its programming to dispense the cash from the bill dispensing mechanisms 150. This cash has not been cleaned or disinfected through operation of the machine. This is represented by a step 200. The machine is operated to dispense the cash to the user and provide (e.g., print) a receipt as reflected in step 202. The controller then operates the machine in step 204 to cause the card reader to return the card to the user. The controller 156 then operates to notify the host that the cash was successfully dispensed to the user so that the host or other connected server may assess the user's account for the value of the cash dispensed. This is represented in a step 206.

In the exemplary arrangement if the user has elected in step 198 to receive (high) quality cash (e.g., uncirculated, new, cleaned, and/or disinfected cash), then the at least one controller operates at step 212 (in FIG. 17) to cause the quality cash stored in the recycler 144 to be dispensed to the user. This is accomplished by the controller operating to remove bills from the storage roll of the belt recycler 144 and to stack the clean bills in a stack 208 of the presenter 152, as shown in FIG. 11. Once the stack of cleaned and disinfected currency bills has been built in the presenter, the stack 208 is moved through operation of the presenter through a bill outlet opening 210 from which the bill stack may be taken by the user. This is represented in FIG. 12. In some exemplary arrangements the bill cleaning and disinfecting devices such as ultraviolet emitters or other irradiation devices may operate during the time period when the bills are being delivered from the belt recycler 144 and to the presenter. Further UV disinfecting devices and other devices 146 may be operated in various other locations in the machine to help assure that the bills which have been disinfected do not attract contaminants as they are moved from the belt recycler to the user. Of course this approach is exemplary and in other arrangements, other approaches may be used. In some exemplary arrangements the machine may be operated without the need for the user to physically contact input devices on the machine. For example, in some arrangements the machine interface may include one or more cameras that are operative to capture images which include the position of the machine user's fingers as they approach keys, buttons, the surface of a touchscreen or other input devices on the machine. At least one controller in the machine may operate responsive to the image data to determine movements and/or positions of the user's finger or fingers in proximity to the various input devices. A mid-air haptics output device like that previously discussed is operative responsive to the determined finger movements and/or finger positions of the user, to cause the user to sense that they are contacting input devices on the machine when the user's fingers are actually disposed away from the physical input devices. This avoids the need for the user to physically contact the input devices in a manner that may result in a transfer of bacteria, germs, viruses etc. from the devices to the user's fingers. The at least one controller determines inputs from the user to the machine based on the determined positions and/or movements of the user's fingers in proximity to the input device locations as calculated by the at least one controller. Alternatively in other arrangements the automated banking machine may include radiation output devices which produce holographic images that are visible to the machine user and that correspond to the appearance of input devices of the machine. Such holographic images may correspond to input locations to which the user may provide finger movements to provide machine inputs without the need to physically contact input devices on the machine. Cameras and a finger position image tracking controller may operate to determine inputs based on movements and/or positions of the user's finger or fingers. Mid-air haptics output devices may provide the user with the tactile feel of contacting physical input devices that correspond to the holographic output images. Of course these approaches are exemplary and in other arrangements other approaches may be used to avoid the need for the user to physically contact the machine to provide inputs.

In an exemplary arrangement a clean currency bill has at least one higher factor of cleanness relative to a non clean currency bill. For example, factors of bill cleanness can include newness, age, received a cleaning treatment (e.g., radiation treated), timeliness of cleaning treatment received, type of cleaning treatment received, material quality (e.g., paper quality) of the bill, uncirculated versus circulated, etc. A non clean currency bill can include for example a bill that has been used in public circulation, or a bill that has at least one defect detected by a note analyzer of the machine, or a bill that has not been treated by the machine, etc. A factor of cleanness can be deemed (or recognized or designated or determined) by at least one controller associated with the machine. Again, an exemplary automated banking machine can dispense both clean and non clean currency bills (or notes) of the same denomination value.

Figures 15, 16, 17:
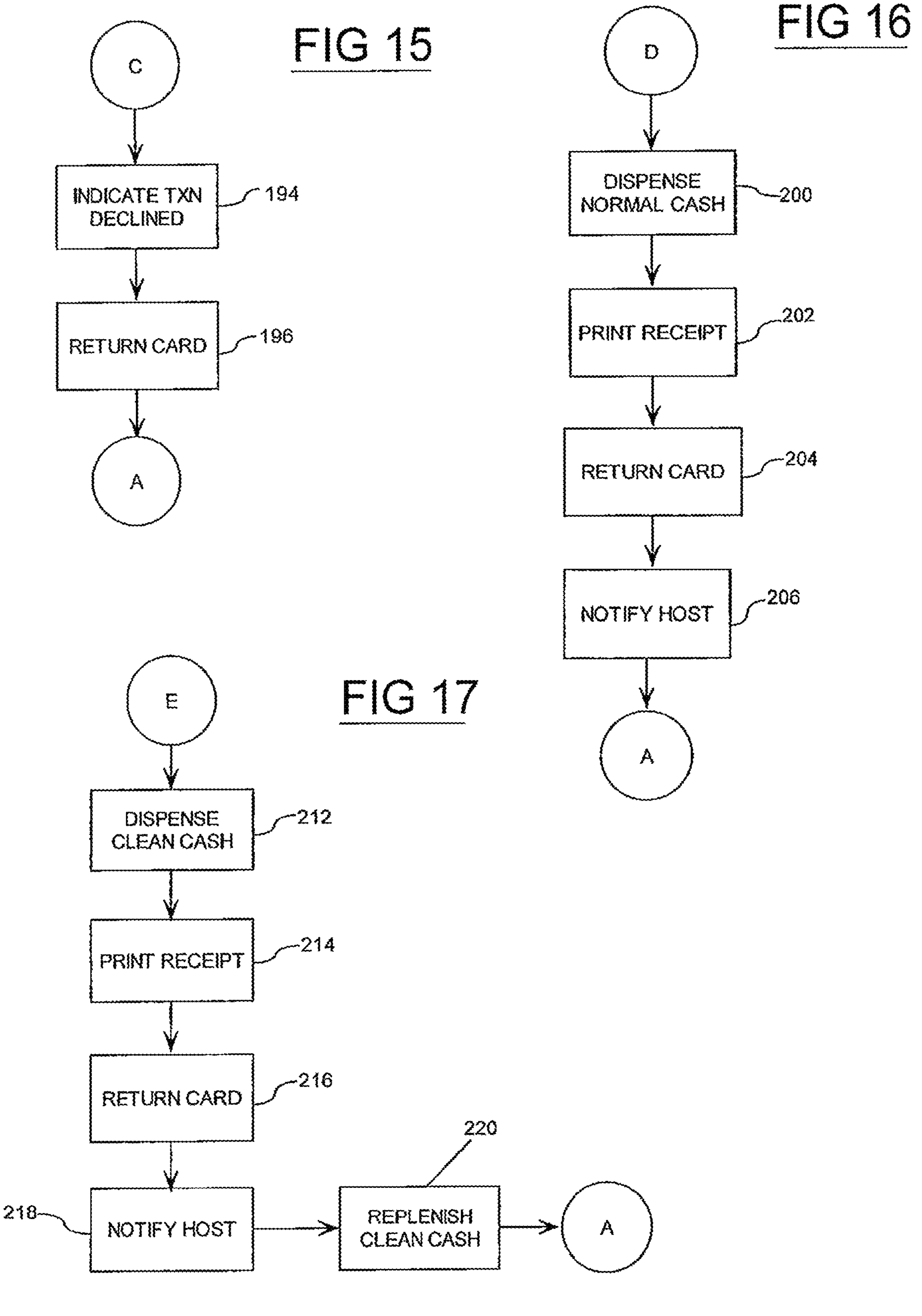

As represented in FIG. 17, the machine operates to dispense the cleaned and/or disinfected cash to the user from the machine as represented in step 212. Thereafter the machine operates in accordance with its programming to provide (e.g., print) a receipt for the user as represented in step 214. The at least one controller 156 then operates to cause the card reader to return the card to the user in a step 216. The controller then operates to notify the host computer that the cash was dispensed successfully from the machine. This is represented in a step 218. As previously explained, the messages from the automated banking machine cause the host to assess the user's account for the value of the cash dispensed including the surcharge for the user receiving the cleaned and disinfected cash. Further in this exemplary arrangement the at least one controller 156 operates in accordance with its programming to then (if determined necessary) replenish the supply of cleaned and disinfected cash stored in the recycling mechanism 144. This is done in the manner previously described by moving currency bills from the dispensers 150 into the storage roll of the recycler 144. This is represented by a step 220. Of course it should be understood that these transaction flows are exemplary and in other automated banking machine arrangements, other or alternative approaches may be used for providing a user with bills that have been cleansed of potentially harmful or undesirable impurities.

In other exemplary arrangements the machine 143 can operate to analyze the quality of currency notes stored in the cash dispenser 150. For example, during a cash reloading process the cash dispenser 150 is supplied with currency notes. The added currency notes may be inside currency cassettes that get inserted into the cash dispenser 150. The controller is programmed to cause notes to be removed from these currency cassettes and then moved past a note analyzer, which can measure several factors of note quality. The note analyzer can be used to determine whether a note is of high quality. For example, a high quality note may not need to be cleaned and/or disinfected. As a result, a high quality note can be directly placed (without cleaning) onto a storage roll of the recycler 144. Of course notes determined to be of high quality may also be thoroughly cleaned before being stored onto a storage roll of the recycler 144.

In another exemplary arrangement a designated portion of the cash dispenser 150 includes currency cassettes that hold uncirculated (brand new) currency notes. That is, these notes have never been in public circulation. Thus, these notes should be relatively free of any dirt, disease, germs, viruses, harmful bacteria, etc. The controller is operable to maintain a real time count of the quantity of uncirculated notes (and their respective denominations) that are available to be dispensed by the machine. Uncirculated notes can be dispensed to user for an extra fee. The fee assessed to a user can vary. For example, the extra fee may be on a per note basis, a single fee for a specific quantity of notes (e.g., three notes), or a single fee for the entire cash dispense, etc. The uncirculated note fee may be waived for select users, such as VIP customers. Also, some machine users may be permitted the option to withdraw more uncirculated notes than other users.

The uncirculated notes stored in the machine may also be of higher denominational value than regular (unclean) notes stored in the machine. For example, an uncirculated note may be a $50 and/or a $100 bill, whereas a regular note may be a $20 bill. As can be appreciated, the arrangements allow a user of an automated banking machine (e.g., an ATM) the ability to easily obtain an uncirculated note, such for use as a gift.

Figure 20:
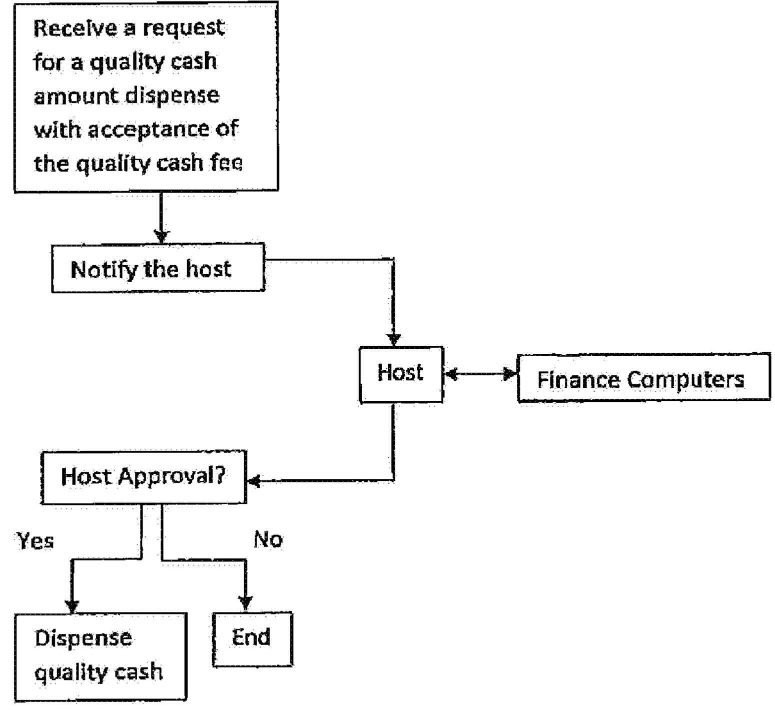
FIGS. 20-23 are schematic representations of steps carried out by logic flow associated with automated banking machine transactions involving quality cash.

FIG. 20 shows a further exemplary programming logic flow that can be carried out by the machine 143. As can be seen, the machine can receive a user request for a cash withdrawal transaction which includes quality cash and user acceptance of the extra quality cash fee. The machine sends a transaction authorization request to the host. The authorization request includes the cash withdraw amount and the extra fee amount. The amounts are presented to the host to be assessed against the user's account. The amounts may be combined by the machine into a single total value that is presented to the host. Upon host approval of the transaction, the machine operates to dispense the requested amount of quality cash. Upon host disapproval of the transaction, the machine operates to notify the user that the transaction request is denied, which may include ending the user session with the machine.

Figure 21:
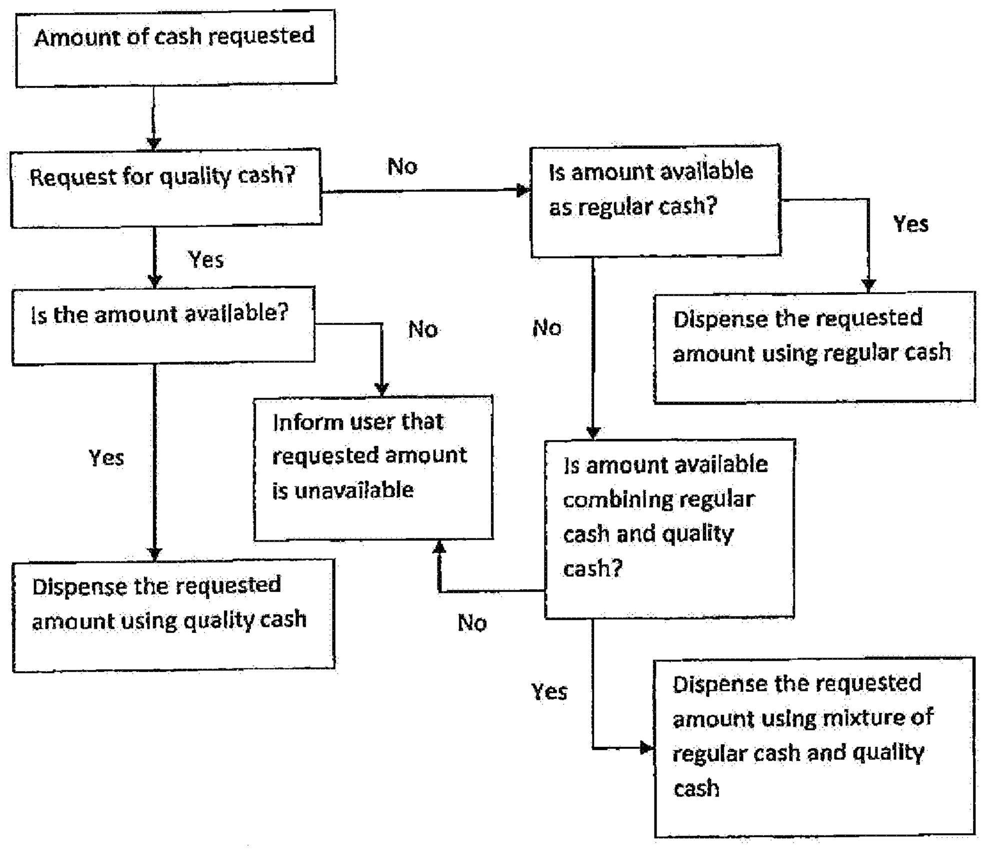

FIG. 21 shows a further exemplary programming logic flow that can be carried out by the machine 143. As can be seen, the machine can determine the real time quantity and denomination of both clean (quality) and unclean (regular) notes currently available to be dispensed.

The machine can compare a requested amount of quality cash to the amount of quality cash currently available. If available, then the total amount of quality cash can be dispensed. Otherwise the user can be informed that the requested amount of quality cash is unavailable. The logic flow may then lead the user back to a screen where a smaller amount of quality cash can be requested. For example, the machine may notify the user of the total amount of quality cash available to the user. The machine may also provide the user an option to mix regular notes with quality cash to meet the total cash withdrawal amount. The logic flow may eventually lead the user back to a screen where a regular cash dispense can be requested.

The machine can also compare a requested amount of regular cash to the amount of regular cash currently available. If available, then the total amount of regular cash can be dispensed. Otherwise the user can be informed that the requested amount of regular cash is unavailable. Alternatively, the machine logic flow may try to meet the requested total cash withdrawal amount by mixing the available regular notes with some quality cash (e.g., a small amount, such as one note). The user would not be charged a fee for receiving the quality cash.

Figure 22:
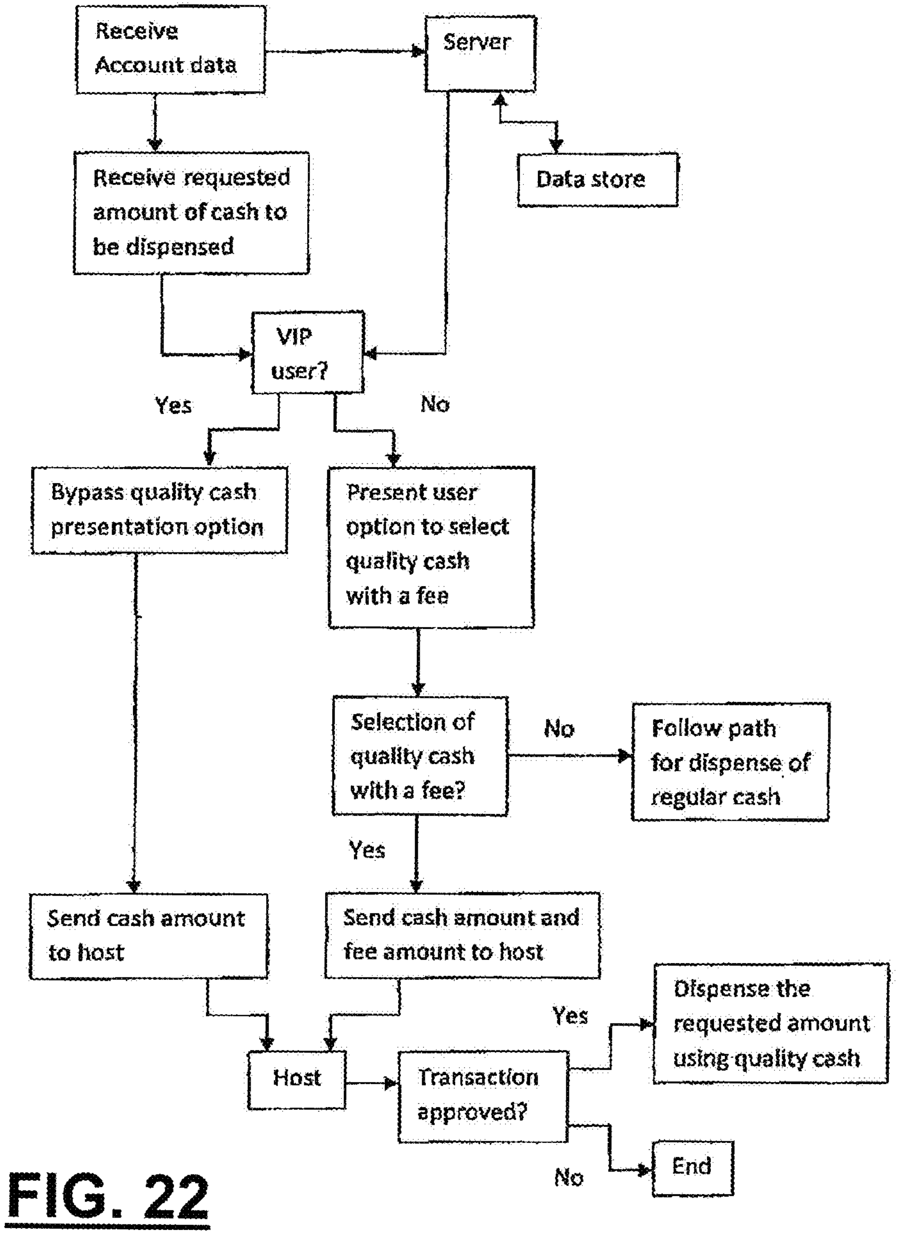

FIG. 22 shows a further exemplary programming logic flow that can be carried out by the machine 143. As can be seen, the machine can communicate with a server to determine whether the current user is in a special program (e.g., a VIP user). The machine-to-serve communication is independent of the transaction host. That is, the machine can (directly) communicate with the server without involving the host in the communication path.

The machine sends user data (e.g., account data or other user identifying data) to the server. The server operates to determine whether the user data corresponds to VIP user data. The server can access a data store that includes the VIP user data for a plurality of users that are to automatically receive quality cash. Depending on the VIP program, the user may or may not be assessed the extra fee. As can be seen, if the user is determined to be a VIP then the logic flow causes the machine to bypass presenting the normal user option to select purchasing quality cash. The machine can send a transaction authorization request to the host. Again, the machine has an ability to send an authorization request that does not include the extra fee that is normally assessed to a user account for receiving quality cash.

As can be seen, if the user is determined not to be a VIP then the logic flow causes the machine to present the user option to select purchasing quality cash. If the non VIP user selects to pay the fee to receive quality cash then the machine sends a transaction authorization request to the host that includes the extra fee for receiving quality cash. The extra fee can be assessed to the user's account through operation of the host. As discussed in more detail later, in other arrangements the extra fee can be assessed by use of an independent server instead of the host.

Figure 23:
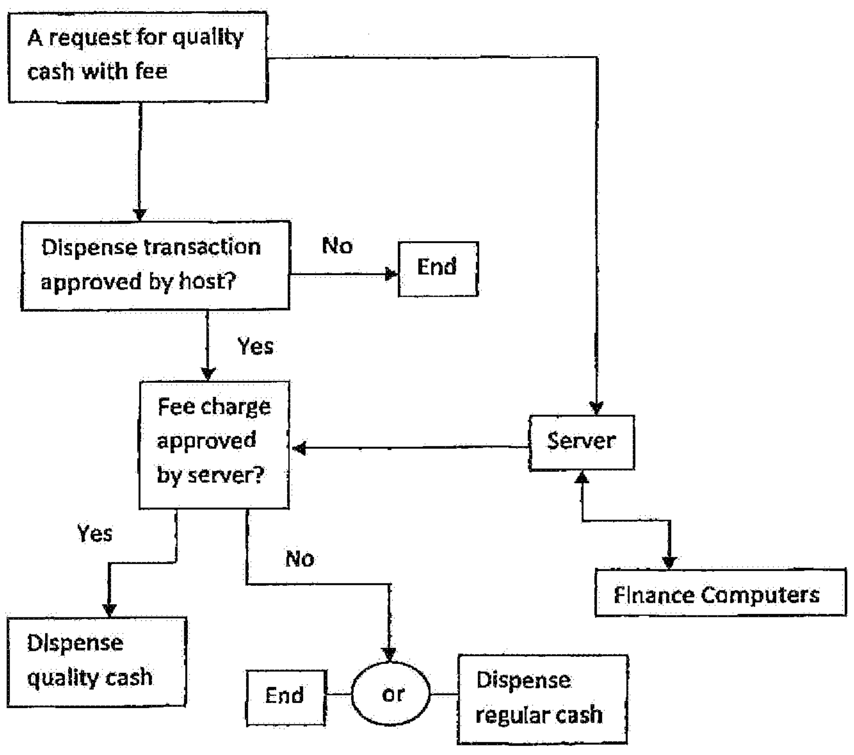

FIG. 23 shows a further exemplary programming logic flow that can be carried out by the machine 143.

As can be seen, the machine can independently communicate with a server which can assess the extra fee associated with a quality cash dispense. The charging of the extra fee amount can be a separate financial transaction that is carried out independent of the cash withdrawal transaction. That is, the extra fee transaction can be performed independent of host involvement. The host can still handle (and approve) the cash withdrawal transaction.

As shown, user data (e.g., a user account number or data usable to determine a user or an account) can be sent from the machine to the server. The server can communicate with one or more financial computers to determine whether the user account can cover (is good for) the extra fee. The server may assess (debit or charge) the fee at this time in the logic flow or may wait until later receiving a confirmation message from the machine that the amount of quality cash was properly dispensed from the machine. The server notifies the machine of the determination. Upon receiving a fee approval message from the server, the machine operates to carry out the dispense of the requested amount of quality cash. However, upon receiving a disapproval message from the server the machine operates to either end the user session or allow the user an option to request a cash withdrawal involving regular cash. It should be understood the steps shown are exemplary, and in other arrangements other arrangements of the steps can be used. For example, the machine may be notified of the server's determination regarding the extra fee assessment before the machine sends the transaction authorization request message to the host for approval of the cash withdrawal transaction. Again, the machine logic flow allows for both one transaction portion carried out through machine-to-host communication and another transaction portion carried out through machine-to-server communication. Each communication portion can be independent of the other.

It should be understood that the logic flows shown in FIGS. 20-23 are exemplary. That is, in other automated banking machine logic flow arrangements, other or alternative approaches or programming may be used for providing a user with quality cash. Likewise, other or alternative approaches or programming may be used for assessing (if necessary) the extra fee.

In alternative arrangements automated banking machines may accept and/or dispense other types of documents that may be desirably disinfected. For example, such machines may accept and disinfect financial checks, tickets, vouchers or other types of documents representative of value. Disinfecting such documents may reduce the risks of contacting viruses or bacteria by persons who subsequently receive or handle such documents. Machines for handling such documents may include features like those described in the following U.S. patents, the disclosures of each of which are incorporated herein by reference in their entirety: 7,780,073; 6,331,000; 8,356,748; 8,763,897; 8,695,874; 8,695,873; 8,701,985; 8,613,388; 8,608,060; 8,608,055; 8,573,483; and 8,517,260.

Figure 18:
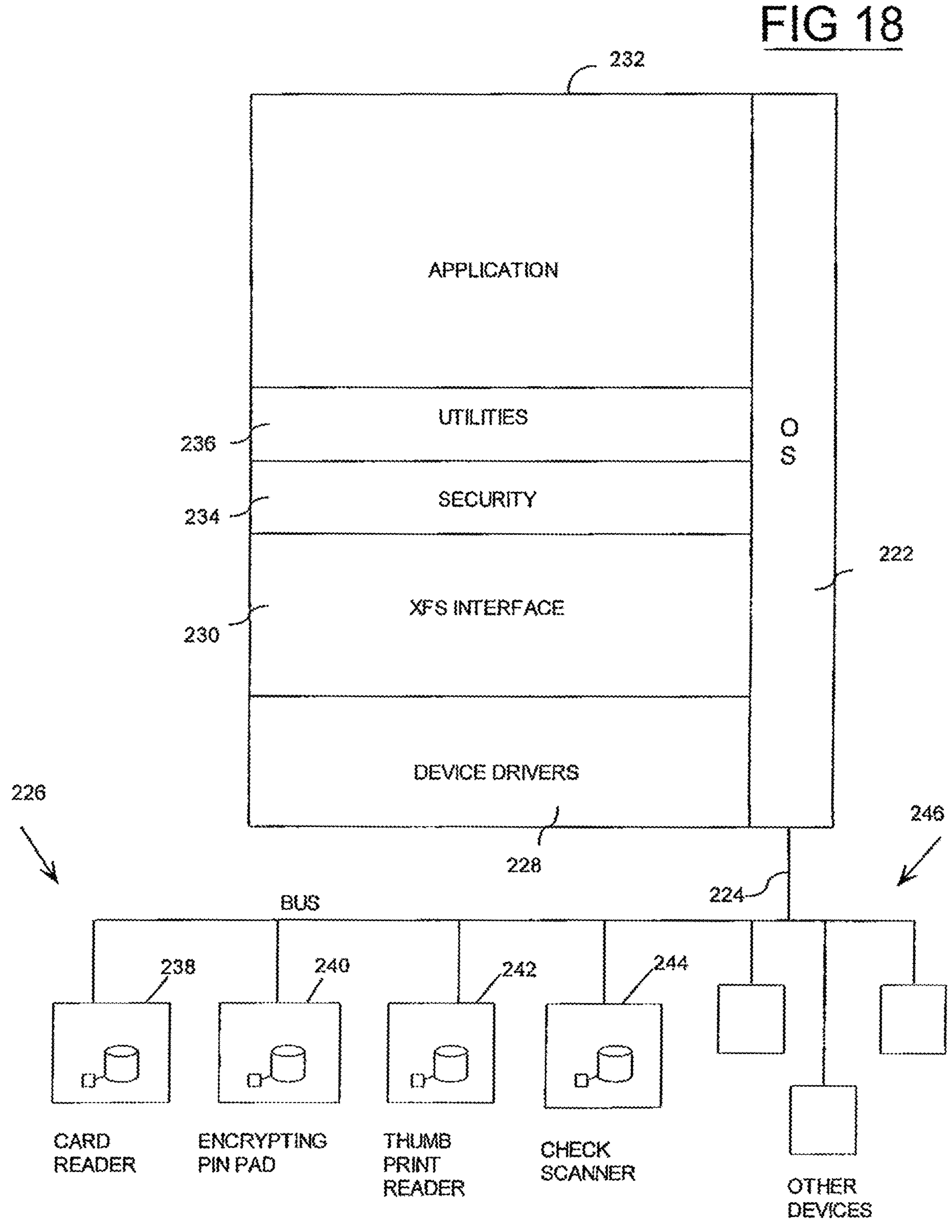
FIG. 18 is a schematic view of software architecture used in connection with an exemplary arrangement of an automated banking machine.
Figure 19:
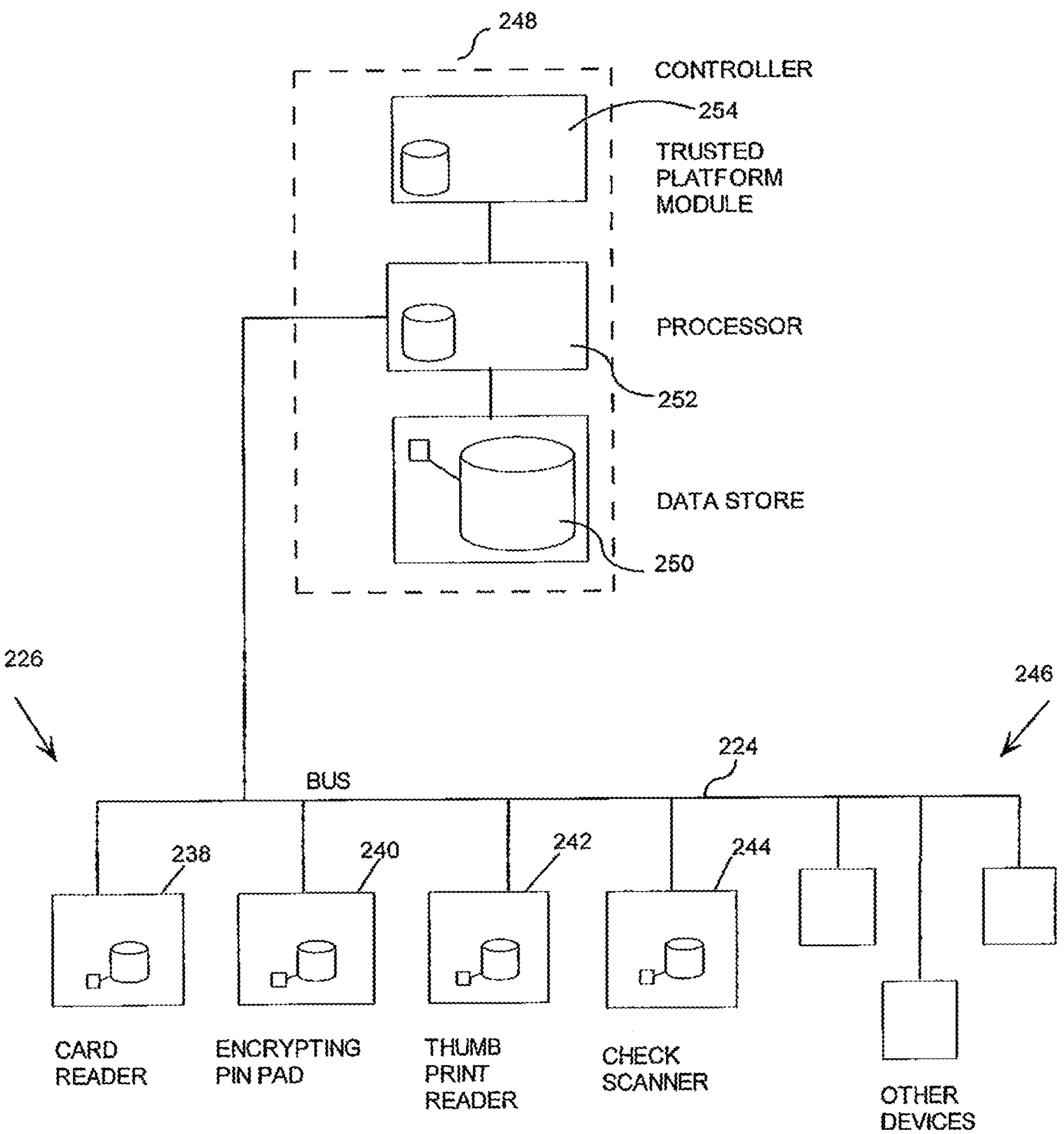
FIG. 19 is a schematic view of a controller and devices used in an exemplary automated banking machine.

FIGS. 18 and 19 represent the software and controller architecture associated with an alternative exemplary automated banking machine. As can be appreciated in exemplary arrangements the controller includes circuitry which has one or more processors that execute computer executable instructions. Computer executable instructions corresponding to various types of computer programs are stored in the at least one data store associated with the processor. These computer executable instructions when executed cause the machine to operate to carry out the transaction functions such as the functions previously described.

The exemplary computer executable instructions include a number of different software programs. These software programs as represented in FIG. 18 may include an operating system schematically indicated 222.

Operating system 222 may include, for example, a Windows® operating system, a Linux operating system, a Chrome operating system or other suitable operating system for the particular environment in which the processor and associated software operate. The operating system also communicates via a communications bus schematically indicated 224. Communications bus 224 may include a proprietary or non-proprietary communications bus such as for example a Universal Serial Bus communications architecture that is suitable for communicating with transaction function devices generally indicated 226, which are later described in detail. The exemplary software architecture includes a plurality of device drivers schematically indicated 228. Device drivers 228 provide an electronic communication interface to the transaction function devices 226. In the exemplary arrangement specific device drivers for each particular transaction function device are included in the software architecture.

In the exemplary arrangement the device drivers 228 are in operative communication with an XFS interface 230. The XFS interface may in some exemplary arrangements comprise a device interface layer that meets the requirements of the CEN Extensions for Financial Services Standard. This Standard provides a standardized software interface for numerous different types of devices that are used in financial systems. By including an XFS interface the exemplary software architecture provides a standardized software interface to which different software developers may interface their machine operating software applications. This is possible because the communications that are necessary to operate and receive data from the devices are presented in a standardized format which is available to application developers. Of course this approach is exemplary.

Further in the exemplary software architecture a software application 232 is included. In the exemplary arrangement the software application includes the computer executable instructions that are executed by the at least one processor of the at least one controller to cause the machine to carry out the transaction functions of the machine. In exemplary arrangements the application software is what causes the machine to perform the necessary activities and to operate the various devices so as to enable the machine to carry out the various types of financial transactions of which it is capable.

The exemplary software architecture further includes some other programs including security software programs represented 234. The security software 234 may include types of software that are suitable for the particular type of automated banking machine. Such security software may include, for example, firewall software that prevents the machine from connecting to unauthorized network addresses. Security software may also include software that is usable to identify viruses or other exploits that might execute on the machine. The security software may also include software that operates to enable security features of the machine and provide secure communications of the type hereinafter described. The exemplary software architecture further includes certain utilities schematically represented 236. Utility software may include, for example, software that is needed to perform ancillary functions associated with the machine. This may include, for example, software that keeps track of currency stored in the machine so that the machine can report its current status to one or more remote computers. The utility software may also include in some arrangements predictive maintenance software which monitors aspects of machine operation and reports conditions that are likely to need attention in the near future. This may include potential device failures, replenishment of supplies such as paper, cash or other things that will likely need to be done to the machine. Various types of utility software may be included in the software of the machine depending on the particular type of automated banking machine involved.

As represented in FIG. 18, the exemplary transaction function devices communicate messages through the bus 224 with the controller that includes the representative software stack. The transaction function devices in the exemplary arrangement include a card reader 238.

Another transaction function device of the exemplary arrangement includes an encrypting PIN pad 240. A thumbprint reader 242 which is an input device usable to receive identifying inputs from users is also included in this exemplary arrangement. As schematically represented each of the devices 238, 240 and 242 include one or more circuits which have respective processors and data stores. The circuits are capable of carrying out computer executable instructions stored in their respective data stores to enable these devices to not only carry out functions but also to provide security features in a manner hereinafter discussed.

Another exemplary transaction function device that is included in this automated banking machine is a check scanner 244. Check scanner 244 operates to produce images of financial checks that are received through the check scanner. The check scanner also includes circuitry which includes at least one processor and at least one data store as schematically represented. Check scanners and other devices used in exemplary arrangements may include features like those described in U.S. Pat. Nos. 8,418,916; 7,922,098; 7,837,096; 7,815,104; and/or 7,595,816 the disclosures of each of which are incorporated herein by reference in their entirety. In addition numerous other types of devices generally referred to as 246 may be included in the machine. Devices 246 may be of the types previously described such as displays, portals, output devices, input devices, sensing devices or other types of devices that may be included in the machine. Of course additional or different devices may be included in various arrangements.

Shown in FIG. 19, the software components referred to in FIG. 18 are executed in a controller 248 of the exemplary machine. The controller includes one or more circuits that include one or more data stores schematically indicated 250. Data store 250 of the exemplary arrangement may include a processor controlled hard drive or other suitable data storage unit that is controlled through operation of at least one associated processor. The control circuitry of the exemplary arrangement further includes at least one processor schematically indicated 252. The processor 252 may include an Intel iCore processor or other suitable processor having structures and features like those previously described that is capable of executing the instructions stored in the at least one data store.

The exemplary controller further includes a trusted platform module (TPM) schematically represented 254.

The trusted platform module of the exemplary arrangement operates in accordance with programmed instructions and provides a security device to reduce the risk of unauthorized devices operating in the machine. Further the trusted platform module may also be used to assure that the devices which operate in the machine have not had their software programming modified from documented secure programming conditions. Such changes in software in the devices may result from attempts to conduct exploits on the machine. Further in exemplary arrangements the trusted platform module may operate to provide secure communication between the controller and one or more of the transaction function devices in the machine. Exemplary arrangements may include features like those described in the following U.S. Patents, the disclosures of which are incorporated herein by reference in their entirety: 8,474,698; 8,342,395; 7,988,039; 8,448,850; 7,967,193; 8,100,323; 8,052,048; 8,052,047; 8,038,057; 7,988,039; and 7,229,009. Of course it should be appreciated that although in some exemplary arrangements the trusted platform module is utilized to provide secure communications and secure operation of the controller and the associated devices, in other arrangements other hardware and software may be utilized to accomplish these functions.

In exemplary arrangements the software architecture operates to avoid possible security problems that might otherwise arise due to compliance with the CEN XFS Standards or other standards, particularly security vulnerabilities are possible due to the required standardized interface between the application and the device drivers, and which requires that certain data that is received through or produced by the transaction function devices must be presented to the application so that the application can carry out the necessary transaction steps. Presenting the data to the application in the required standard and/or unencrypted format may present issues as criminals may be able to intercept the data within the machine at the standardized interface.

In the exemplary arrangement the devices that are enabled to provide secure communication between the devices and the controllers are operated to prevent the transmission of sensitive data through the XFS device interface or other standard device interface. This is accomplished by using substitute data which can then be correlated through operation of the originating device with the actual data that is needed for the transaction. Such actual data may then be sent from the device to the controller in a secure and encrypted manner to avoid the unauthorized interception thereof.

In exemplary arrangements a card reader may read card data from the magnetic stripe of a user card. Alternatively or in addition the card reader may operate to read data from a chip of a smart card. This may be done via electrical contacts or via wireless communications. Such data read through operation of the card reader may be caused to be stored in accordance with the programming of the processor associated with the circuitry of the card reader in the at least one data store of the circuitry. In some exemplary arrangements the circuitry of the card reader may operate to cause the card data and/or chip data to be stored in an encrypted manner.

Responsive to the programming of the circuitry of the card reader, instead of sending the card and/or chip data to the XFS interface software layer, the card reader operates to produce substitute data that can be correlated through operation of the circuitry in the card reader with the actual read data from the card. Substitute data which may be alternatively referred to herein as pseudo or token data, produced by the card reader may then be utilized and passed through the XFS interface to the application. The application may be configured to operate to then securely recover the actual card data at an appropriate place in the transaction steps when such data is needed. Alternatively in some arrangements the security software included with the software installed on the machine may operate to determine when the card data is needed and take the necessary steps to cause communication with the card reader to recover the actual data. In the exemplary arrangement when the application calls for the card data, the at least one controller operates in accordance with its programming to communicate securely with the control circuitry in the card reader 238. The application and/or the security software communicates the substitute data to the card reader that then operates in accordance with its programming to recover the actual card data. Such card data can then be recovered from the data store in the card reader and transmitted in a secure and encrypted manner to the application layer or the security layer where the actual card data needed for carrying out the transaction is resolved and utilized for purposes of further carrying out the transaction steps. As can be appreciated, this approach avoids passing the card and/or chip data in a clear and unencrypted manner through the XFS or other standard interface.

Similar approaches may be utilized with certain secure input devices such as the exemplary thumbprint reader 242. Again the thumbprint reader may operate in accordance with its programmed control circuitry to provide data that is a substitute for the actual data which is read from the user's thumbprint. Instead the substitute data is utilized by the thumbprint reader to recover the actual data. The controller operates in accordance with the software programming to transfer the substitute data through the XFS software interface to the software application. Again the security related software for the application operates to cause communication with the thumbprint reader so that when the actual data is needed, secure communication of the substitute data is sent to the thumbprint reader. The thumbprint reader then recovers the actual data and transmits it in a secure and encrypted manner to the application which then may utilize it for purposes of carrying out the transaction.

Other exemplary arrangements may include secure operation of the check scanner. The check scanner produces images of checks that are received through operation of the machine. These checks include private data such as the check writer's account number, the check writer's name and address and other information that may present privacy concerns. In exemplary arrangements to minimize the risks associated with transmitting this data and/or images in the clear through a standardized interface, substitute data is generated through operation of the circuitry in the check scanner. The substitute data is then correlated with stored data in the data store of the check scanner. Again as with the other examples the substitute data is processed and passed through the software layers. The substitute data is utilized until the actual data is needed by the application. At the point in the transaction where the actual data is required, secure communication of the substitute data to the check scanner is made. The substitute data is then utilized to recover the actual data which is then sent in an encrypted and secure format to the application. The application can then use this data for purposes of processing the transactions in a manner like that described in the incorporated disclosures. As can be appreciated, numerous applications of these approaches may be utilized in exemplary arrangements to avoid having to store or to pass data in the clear between software applications at the XFS or other standard interface. Thus the exemplary arrangement enables the configuration of software architectures in machines in accordance with the XFS standards or other suitable standards but avoids the possible security risks that compliance with such standards may impose. Of course it should be understood that the principles may be utilized in various types of automated banking machine environments to help in providing enhanced security.

Figure 24:
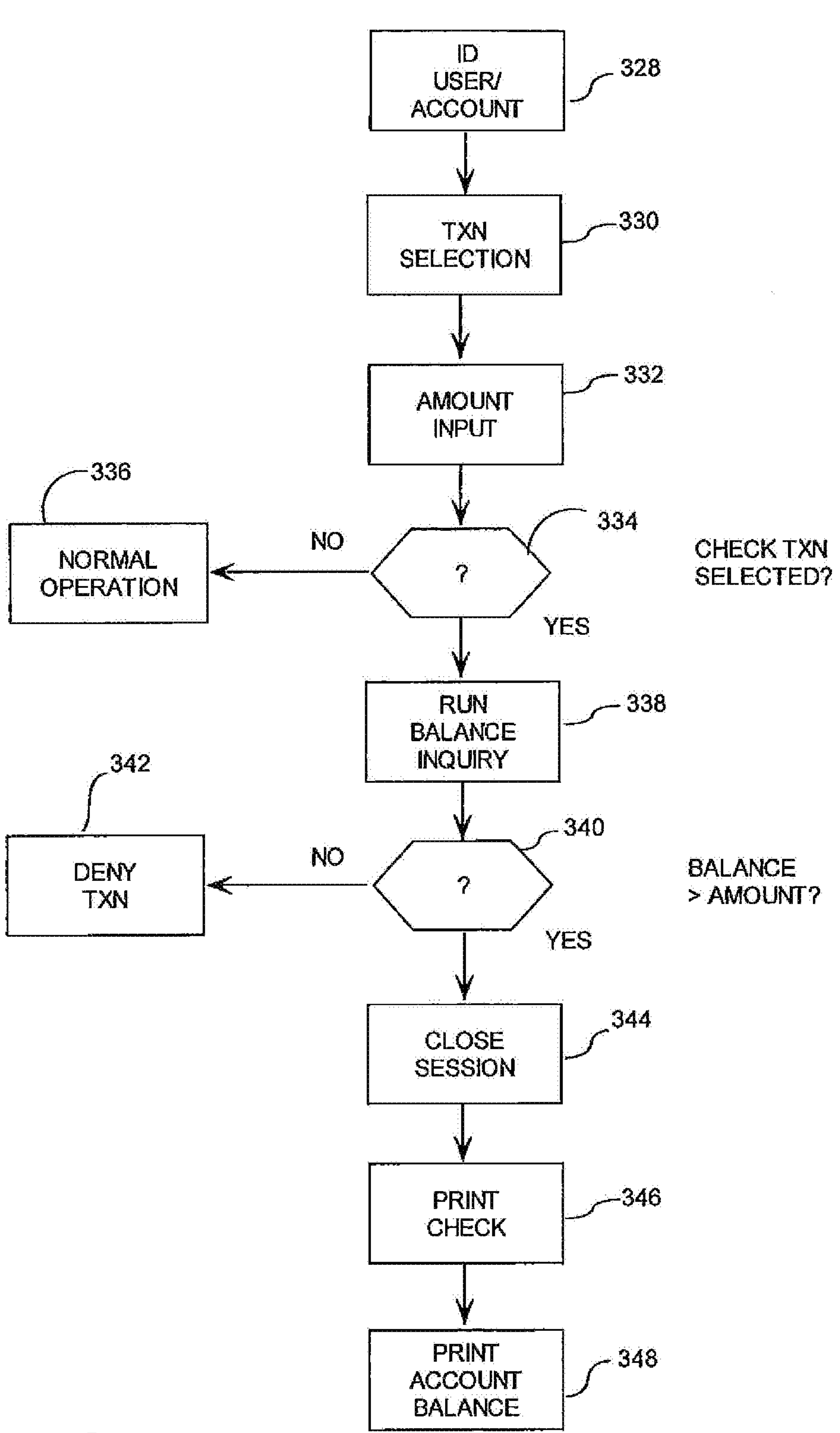
FIG. 24 is a schematic representation of program logic carried out by an automated banking machine that issues financial checks.

Exemplary arrangements may include features like those described in the following US Patents which are incorporated herein by reference in their entirety: 8,308,057; 8,393,534; 8,469,266; 7,988,041; and 9,594,954. FIG. 24 shows a schematic view of program logic carried out through an exemplary automated banking machine that may be similar to those previously described. The exemplary automated banking machine is operative to provide users with financial checks. Such financial checks may include printed paper checks. Alternatively in some arrangements the automated banking machine may be operative to provide electronic representations of checks that can be processed as checks. In still other arrangements, electronic tokens or tangible items may be provided to a user in connection with exemplary transactions.

The exemplary program logic flow which may be carried out by one or more terminal controllers in an automated banking machine may be utilized in circumstances where a merchant or other vendor wishes to provide items of value such as goods, services or cash to a user. Such a system may be employed in some circumstances where the merchant and/or user wishes to avoid the transaction fees that may be associated with withdrawing cash or transferring value via communication with a transaction processing network. As can be appreciated in some arrangements, significant transaction surcharges are applied to cash withdrawal transactions on certain machines. Further certain network rules may cause the liability for fraudulent transactions to shift from an entity issuing a credit or debit card to a person accepting such a card if a transaction is conducted at a device or a system does not include all of the security features that the card issuer has indicated are required in order for the card issuer to have liability. An automated banking machine carrying out transaction logic as represented schematically in FIG. 30 may in some arrangements avoid such a liability shift. Of course it should be understood that these approaches are exemplary and the represented features may be used in other types of systems as well.

In the exemplary arrangement the automated banking machine executes program instructions to receive from a user data bearing records or other information that is suitable to identify the user or an account. This is represented in a step 328. Such activity may include in some arrangements the reading of account identifying data from a user card, the receipt of a PIN number, the reading of biometric data or other data through input devices on the machine so as to identify the user and/or their account. The automated banking machine then operates in accordance with its programming to present the user with transaction selection options, and the user provides a transaction selection input as represented in a step 330. In the exemplary arrangement the user may elect to receive value such as cash or goods or services through the machine by making payment by check. If the user wishes to make such a transaction selection, they may do so by providing the corresponding transaction selection input. The user also is prompted through operation of the machine to indicate the amount associated with their transaction. This is represented in a step 332. In an exemplary arrangement if the user has selected a check transaction, the user will be prompted to provide inputs corresponding to the amount of the check that they wish to have accepted by the merchant or other associated entity.

In a step 334, the terminal controller or other processor operates to determine if a check transaction has been selected by the machine user. If the machine user has not selected a check transaction, and has chosen a cash withdrawal transaction, cash acceptance transaction or other transaction that can be carried out through operation of the machine, the terminal controller operates in accordance with its programming to carry out the transaction steps associated with those other transactions. This is represented in a step 336.

If the user of the automated banking machine has selected a check transaction, the terminal controller operates in accordance with its programming to automatically formulate an account balance inquiry transaction. This account balance inquiry transaction is operative to cause the machine to communicate through one or more associated networks with computers to determine if the account corresponding to the user is valid and also whether the account has a sufficient balance and/or status so as to allow the check transaction in the selected amount to be carried out. In some exemplary arrangements the formatted transaction messages may be comparable to those carried out in response to user inputs making an account balance inquiry to check the amount of money in their account. Alternatively in other arrangements, the formulated transaction inquiry may include messages that inquire as to other features such as whether the account is in good standing, includes overdraft protection, qualifies for cash advances or other information which is appropriate for determining whether the check transaction should be carried out. The nature of the formulated inquiry messages will depend on the nature of the account on which a check has been requested to be drawn. These steps as carried out through operation of the terminal controller and associated networks is represented schematically by step 338.

If the account is determined not to have a sufficient balance or otherwise qualify for writing a check in the amount requested by the user, a determination is made at step 340 that the transaction could not be carried out. The user is so informed as represented in a step 342. This step may include, for example, the terminal controller operating in accordance with its programming to inform the user that the transaction cannot be carried out. Further in some arrangements the terminal controller may operate to return the user's card or otherwise close the transaction.

If in step 340 it is determined that the user's account balance is sufficient for writing a check in the amount, the automated banking machine operates in accordance with its programming to take steps to close the network session which was involved in making the determination. This is represented by step 344. In some arrangements, step 344 may include additional communications between the automated banking machine and other computers in the network such as obtaining appropriate information from the network about the user's account which may be utilized by the automated banking machine in producing a financial check in the amount requested by the user. The information obtained may include data that cannot be derived from the data bearing record such as the user card or other information that the user has input to the machine in connection with requesting the transaction, which information is necessary for purposes of producing the financial check. Alternatively or in addition, the automated banking machine may in step 344, communicate with computers in multiple systems which can derive the data necessary for purposes of producing the check. This may include, for example, obtaining information on bank identification numbers, routing numbers or any other information that may be required to produce the check such as for example, the data that appears in the micr line of a financial check indicating the account and routing data used for processing the check. Of course these approaches are exemplary and the exact approaches used will depend on the particular system.

The terminal controller of the exemplary arrangement then operates in a step 346 to produce a printed financial check in the amount requested by the user. The printed financial check will include the data necessary for processing and may include all of the data normally found on a preprinted check. Alternatively or in addition, the check may include extended micr line data or other data so as to cause the amount of the check to be routed and paid to the account of the merchant or other person who is to receive the amount. Further in the exemplary arrangement the terminal controller operates in a step 348 to print an account balance statement. The account balance statement of the exemplary arrangement may include information such as the user's account data and their account balance. Further in exemplary arrangements, the account balance statement may include information on whether the user account has overdraft protection, certain statuses or other information that may provide the merchant with assurance that they may accept the check. Of course it should be understood that this logic flow is exemplary and in other exemplary arrangements other or alternative approaches and additional or different steps may be utilized.

The printed financial check and account balance statement may be taken by the machine user from the machine and presented to a merchant at a transaction location who can provide value in exchange for the check. In some exemplary arrangements the merchant station may include a terminal or other device for accessing information that enables the merchant to verify that the check has been issued by the machine and that it is unaltered. This may include, for example, a merchant terminal communicating through a local network with the banking machine or through a wide area network with the systems that provided information on the account balance or other authorization to issue the check. The merchant may also physically or electronically review the account balance statement.

In exemplary arrangements if the merchant finds that everything is in order, the merchant may accept the check and provide the user with value for the check in the form of cash, goods or other agreed value. The merchant may then scan the check using a scanner connected to the merchant terminal or other system commonly employed by the merchant to scan received checks issued by the automated banking machine as well as preprinted checks. The merchant may then carry out the necessary steps to have the funds represented by the check deposited in the merchant's account by a financial institution or other financial services provider associated with the merchant's account.

In other exemplary arrangements, the automated banking machine may operate in alternative ways to provide check data or items to a user that the user can exchange for value. For example in some exemplary arrangements, the automated banking machine may operate to securely communicate with a user's portable wireless device. The data communicated to the user's portable device may correspond to value for an electronic check. For example in some arrangements the data may correspond to a visual image of a check that a user may present on the display of a smart phone to the merchant's system. Alternatively or in addition, the automated banking machine may provide the user with an electronic token or other data which can be stored in the memory of a smart phone and then communicated to the merchant's system in exchange for receiving value. In still other alternative arrangements, the automated banking machine may issue a stored value card or other tangible item which is representative of the value that the user wishes to receive. The tangible item may then be taken to a merchant station and the value transferred in the manner of a check or similar article so the merchant can obtain a deposit of the funds in the merchant's account. The merchant may then provide inputs to a merchant terminal or take other steps to authorize the use of the card. The user can then use the card for purposes of obtaining goods or services from the merchant or other affiliated merchants which accept the card. Of course these approaches are exemplary of many different approaches that may be used.

In some exemplary arrangements the automated banking machine may be operative to cause one or more transaction messages to be communicated which place a hold on the user's account for an amount corresponding to the check. The hold can be maintained for a sufficient period of time to allow the merchant to scan and present the check to a check payment processing system. This may be done in a manner similar to that used for certain credit and debit card transactions where the actual charges that the user will incur are unknown. For example, in some arrangements the hold for the amount could be placed on the user's account for a period of one day and then automatically lifted through operation of the system. This might be done, for example, by having the machine perform in accordance with its programming on a timed basis to submit messages to the network that cause a reversal of the initial hold transaction. Alternatively or in addition, communication with a merchant terminal which would show submission of the check for processing would then cause the automated banking machine to operate so as to send transaction reversal messages that release the hold on the user's account. Further it should be understood that these approaches may be used in connection with the other types of articles or data discussed herein which represent value and which can be received from the machine. Of course these approaches are exemplary and in other arrangements, other approaches may be used.

FIGS. 25-28 show schematically program logic carried out through operation of one or more devices in connection with providing a user with cash or other value from an automated banking machine or other fulfillment point. In this exemplary arrangement the user may request a transaction using a mobile device such as a smart phone or wearable computer of the types previously discussed. The exemplary arrangement is further usable to assist the user in locating a fulfillment point that can complete the user's transaction which involves a transfer of value. Exemplary arrangements may include features described in U.S. Pat. Nos. 10,453,041; 10,540,644; or 10,825,005 the disclosure of each of which is incorporated herein by reference in its entirety.

Figure 25:
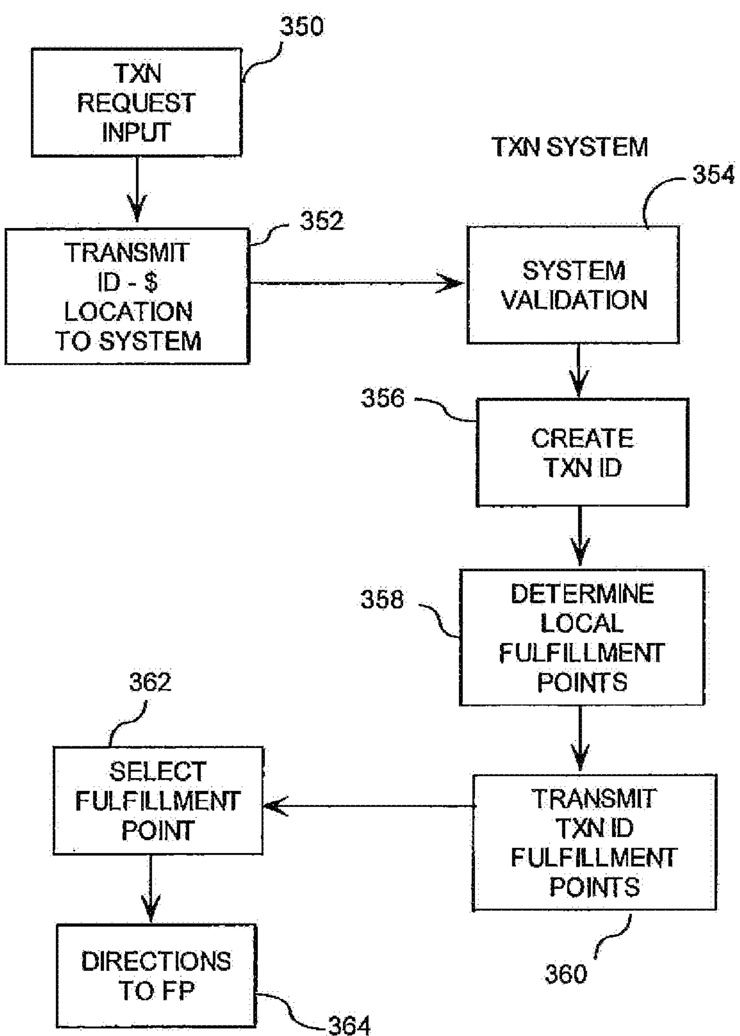
FIGS. 25-28 are a schematic view of program logic carried out in connection with a transaction that involves a wearable computer.

As represented in FIG. 25, a user who desires to receive cash may, for example, provide a transaction request input through an input device associated with a mobile device. The mobile device may include a smart phone which includes a program such as an application for receiving such a transaction request. Alternatively other arrangements may involve a wearable computer, such as in the form of glasses like those previously discussed, wallets, watches or other articles which include programming for receiving such a request. This transaction request is represented by a step 350. In response to receiving the request, the mobile device operates in accordance with its programming to transmit information that is appropriate for purposes of conveying a request for the transaction that the user wishes to conduct to a remote transaction system. For example the mobile device may submit messages including an identifying value associated with the user's account, the amount of value such as cash the user wishes to receive, and data corresponding to the user's current location, to the transaction system. It should be understood that in some exemplary arrangements the account identification may include an account number. Alternatively the identification data may include token data which can be used by the transaction system to derive data corresponding to a user account number or other information that can be associated with a user account. The use of a token instead of an actual account number may be used to enhance security associated with the system. The transmission of the data concerning the user's transaction request to the system from the mobile device is represented in a step 352.

The data transmitted in step 352 along with other data which is transmitted from the mobile device for purposes of requesting the transaction is received in an exemplary arrangement wirelessly by the remote transaction system. The exemplary transaction system includes one or more servers and data stores that are capable of validating the transaction data and carrying out financial transfers. The communications to the transaction system may include communications via cellular phone communications, wireless broadband or other suitable methods for communicating the data between the mobile wireless device and transaction system.

In a step represented 354 the transaction system receives the identifying data and other information from the mobile device. The system then operates in accordance with its programming to validate that the user identification data and other information that is transmitted corresponds to a valid user and/or account which can be used to carry out the transaction as requested by the user. The system 354 operates in accordance with its programming to create a transaction identifier (ID) for the particular transaction is represented in a step 356. The system then further operates in accordance with its programming to determine locations where the user's requested transaction can be fulfilled. In the exemplary arrangement the transaction system uses the location information received from the user to determine the fulfillment points that are in proximity to the user that can complete the transaction the user has requested. This is done based on stored data that the transaction system can access as to the locations of automated banking machines, merchant facilities or other systems that can fulfill the user request. This is represented in a step 358. The transaction system then operates in accordance with its programming to cause to be sent to the mobile device, the resolved transaction ID associated with the requested transaction as well as data corresponding to the fulfillment points that are currently in proximity to the user which can fulfill the transaction. This is represented in a step 360.

The mobile device of the user receives the data from the transaction system including the data corresponding to the fulfillment points that can carry out the requested transaction. The user's mobile device then operates in accordance with its programming to present to the user a user interface that enables the user to provide inputs to select a fulfillment point. This is represented in a step 362. The user's mobile device then operates in accordance with its programming to determine or obtain from a remote system directions from the user's current location to the selected fulfillment point. This may be done based on stored data included in one or more data stores accessible by the mobile device. Alternatively or in addition, such directions may be resolved through communication of the mobile device with remote servers such as Google Maps, MapQuest or other similar service that can provide a user with directions. The presentation of the directions to the user from the mobile device is represented by a step 364.

The user may then travel to the selected fulfillment point. The mobile device may provide turn-by-turn instructions or similar guidance to the user to help them reach the desired fulfillment point. It should be understood that in exemplary arrangements the fulfillment point may include an automated banking machine, a merchant transaction area, a particular facility or other apparatus that can fulfill the user's transaction request. It should be understood that although the exemplary arrangement may be discussed in connection with an automated banking machine, such other devices and systems may be utilized in exemplary arrangements to fulfill transactions.

Figure 26:
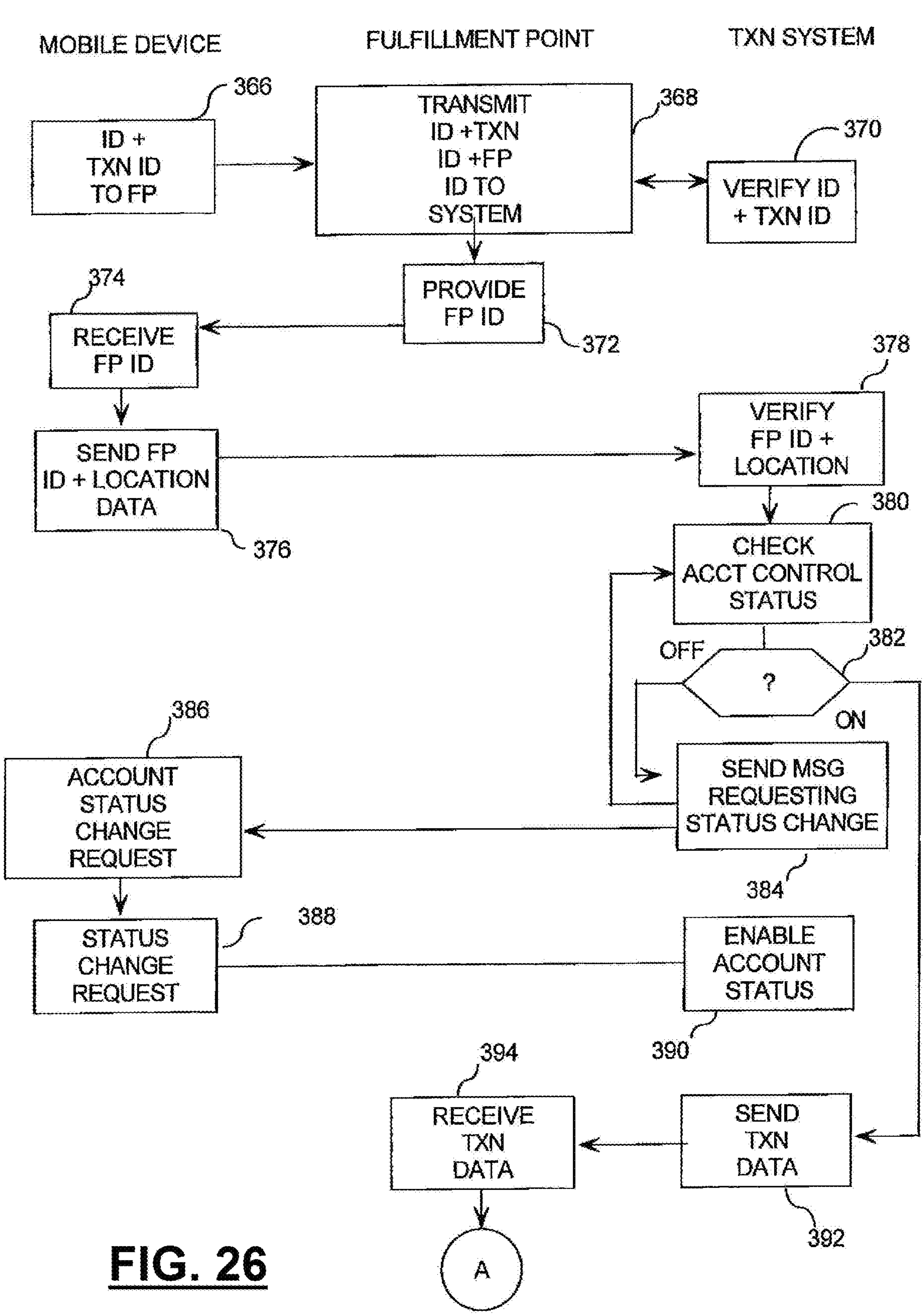
Figure 27:
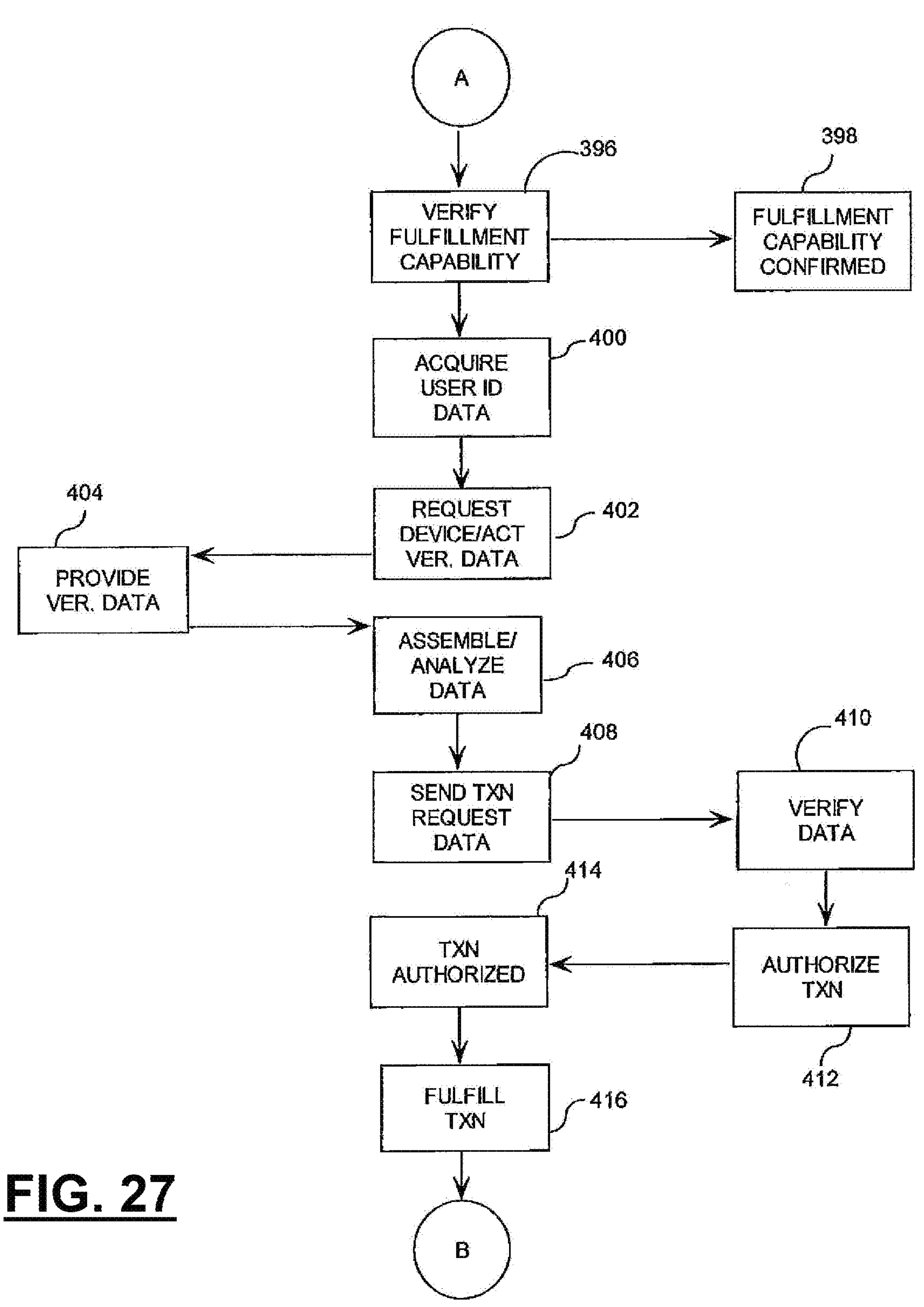
Figure 28:
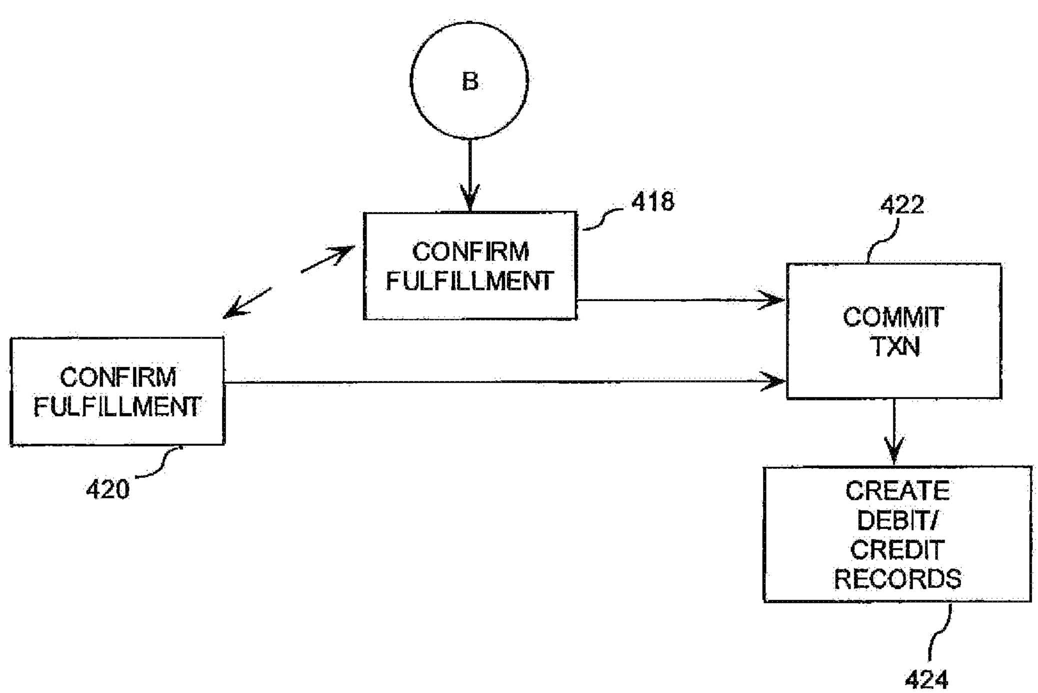

As represented in FIG. 26, when the user reaches the fulfillment point, the mobile device operates in accordance with its programming to transmit the user identifier, transaction ID and other information as may be required by the system to a device such as a terminal at the fulfillment point. This is represented by a step 366. In the exemplary arrangement the data is transmitted via radio frequency communications a short distance to a device at the fulfillment point. This may include, for example, Bluetooth or NFC communication via a wireless interface on an automated banking machine. Alternatively, other types of contact or wireless communication may be used.

In response to receiving the user identification and transaction ID information at the automated banking machine at the fulfillment point, the automated banking machine operates in accordance with its programming to send data corresponding to the user identifying information, transaction ID and an identifier associated with the fulfillment point to the transaction system. This is represented by a step 368. The one or more servers of the transaction system then operate to verify the user identification, transaction ID and other data to determine that the requested transaction is one which can be authorized. This is represented by a step 370. The transaction system communicates one or more messages to the fulfillment point to indicate that the data which has been sent is verified.

In response to this communication, the automated banking machine at the fulfillment point then operates in accordance with its programming to provide to the mobile device a fulfillment point identifier which is then communicated wirelessly to the mobile device. This is represented by step 372.

The mobile device receives the fulfillment point identifier at a step 374. Of course it should be understood that in exemplary arrangements, additional data including data associated with maintaining security or authentication may also be communicated from the automated banking machine of the fulfillment point to the mobile device. The mobile device then operates in accordance with its programming to cause the fulfillment point identifier and the current location data of the mobile device to be sent wirelessly to the transaction system. This is represented by a step 376. In response to receiving the data sent in step 376, the transaction system operates in accordance with its programming to verify that the fulfillment point and the location of the mobile device correspond. The transaction system also operates to verify that the fulfillment point ID corresponds to the prior communication from the fulfillment point. Of course additional steps may be performed in connection with authentication or security of the communications by the transaction system. This is represented by a step 378.

The transaction system then operates in accordance with its programming to determine if the account associated with the requested user transaction currently is available for purposes of conducting transactions. This is done in a step 380. In the exemplary arrangement the account holder is enabled to operate their mobile device for purposes of enabling and disabling the status of their account. This capability may be used to assure that the account status is generally disabled at times when a user does not wish to conduct transactions. The user may selectively enable the account at times when the user wishes to conduct transactions, this can generally avoid unauthorized transaction activity. In this exemplary arrangement the transaction system at a step 382 determines if the account control status currently has the account disabled or "off" or enabled and "on." If in step 382 the transaction system determines that the account is currently disabled, the transaction system operates to cause one or more messages to be sent to the mobile device to indicate that if the transaction is to be conducted, the account status will need to be changed. The sending of this message is represented in a step 384.

The mobile device receives an account status change request from the transaction system in a step 386. If the user acknowledges that the transaction is to move forward, and is authorizing the transaction to proceed, the user will provide one or more inputs through input devices on the mobile device. The mobile device then operates in accordance with its programming as represented in step 388 to cause at least one account status change request message to be sent wirelessly to the transaction system. The transaction system operates in accordance with its programming to change the account status so as to enable transactions as represented in step 390.

Enabling the account status then causes the transaction system to proceed at step 382 to operate in accordance with its programming to send transaction data to the automated banking machine at the fulfillment point.

This is represented in step 392. The automated banking machine receives the transaction data sent by the transaction system as represented in step 394. The automated banking machine then operates in accordance with its programming to determine that it can fulfill the requested transaction. The automated banking machine, upon verifying that it can provide the requested transaction, such as dispensing the requested amount of cash, sends one or more messages to the transaction system confirming its fulfillment capability. This is represented by a step 396. The transaction system then receives the one or more messages which indicate that the machine has the fulfillment capability and will proceed with the transaction. This is represented in a step 398.

The automated banking machine at the fulfillment point then operates in accordance with its programming to prompt the user to provide user identifying data. This is represented in a step 400. In some exemplary arrangements the user identifying data may include a PIN number or other secret code for purposes of authorizing a transaction. In still other arrangements, the user identification data may include data read from a data bearing record, such as a card or biometric data such as data corresponding to a user's fingerprint, iris scan or facial image. In still other exemplary arrangements the identifying data may include audible sounds or a voiceprint. The automated banking machine in response to receiving this data in the exemplary arrangement then operates to communicate with the mobile device to request device and/or account verification data. This is represented in a step 402. The mobile wireless device in response to receiving the request operates in accordance with its programming to provide the requested verification data as represented in a step 404. Verification data is then wirelessly communicated to the automated banking machine. In some exemplary arrangements the verification data may include data such as account identifying data of the type previously discussed as being sent to the transaction system. Such verification data may also include the transaction ID data or other data that is received from the transaction system. In still other arrangements the verification data may include data resolved by the mobile device from data sent from the transaction system and data stored in one or more data stores in the mobile device. The type and nature of the verification data used may vary depending on the particular type of system and mobile device. Generally the verification data will be sufficient to verify the account, the particular transaction and device with which the transaction has been associated.

The automated banking machine which is the fulfillment point operates in accordance with its programming to receive the data from the mobile device. The machine then operates in accordance with its programming to assemble the user identifying data, data corresponding to account, transaction ID and other information so as to present the information to the transaction system. This is represented in a step 406. In step 408 the automated banking machine operates to send one or more messages to the transaction system so as to request authorization to complete the transaction. This is represented in step 408.

The transaction request messages are sent to the transaction system through one or more networks such as those described in connection with the previous arrangements. Such network communications may be wired or wireless communications and may include transmission over the Internet or other public or private networks. Encryption and other security features are included with or applied to the messages to avoid interception. One or more computers associated with the transaction system receive the messages and operate in accordance with their programming to verify the data associated with the transaction request. In verifying the data, the transaction system determines that the transaction is authorized to be conducted. This is represented in a step 410. In response to verifying the data and the propriety of the transaction, one or more servers of the transaction system operate to send one or more messages to the automated banking machine to authorize the transaction. This is represented in a step 412.

The automated banking machine operates in accordance with its programming in response to the received transaction authorization messages to verify that the messages correspond to instructions to fulfill the transaction. This is represented in a step 414. The automated banking machine then operates to fulfill the transaction as represented in a step 416. This may include in some exemplary arrangements operating to cause cash to be dispensed from the automated banking machine to a user. Of course it should be understood that this form of fulfillment is exemplary and in other arrangements other approaches and forms of delivering value may be used.

The automated banking machine operates in accordance with its programming to confirm that the cash was dispensed properly and sends one or more messages to the transaction system, confirming fulfillment of the transaction. This is represented by a step 418. In some exemplary arrangements the automated banking machine may communicate with the mobile device to prompt the user to confirm through one or more inputs through their mobile device that the cash or other value has been received. Alternatively the transaction system may communicate with the mobile device to have the user provide one or more inputs to confirm receipt of the cash or other value. The user of the mobile device then provides one or more inputs to the mobile device to confirm fulfillment. The mobile device then operates in accordance with its programming to cause one or more confirmation messages to be sent to the transaction system. This is represented in a step 420.

If the transaction system receives confirmation of fulfillment in messages from both the automated banking machine and the mobile device, one or more servers of the transaction system operate in accordance with their programming to commit the particular transaction. This is represented by a step 422. The one or more servers then operate to cause financial transfers such as debiting the account of the user for cash received and crediting the account of the entity who operates the machine or other system that has provided value that fulfilled the transaction request. This is represented by a step 424.

Of course it should be understood that in the event the user does not confirm fulfillment of the transaction or the automated banking machine is unable to fulfill the transaction, steps can be taken to again attempt to complete fulfillment in accordance with the programming of the transaction system, the fulfillment device and the mobile device. Alternatively or in addition, failure to receive appropriate confirmation messages may result in additional steps being taken such as the automated banking machine capturing images of the user receiving cash or other value from the machine so as to document that the transaction was properly completed. Alternatively or in addition, the devices included in the system may be programmed to operate so that the account of the user is not charged in the event that the transaction cannot be fulfilled.

It should be understood that although in the exemplary arrangement the fulfillment device is described as an automated banking machine of the type that automatically dispenses cash or other value to a user, in other arrangements the fulfillment device may include other types of automated banking machines. For example in some arrangements the automated banking machine which provides fulfillment may include a transaction terminal at a merchant location. The transaction terminal may include, for example, a cash register from which a merchant may remove cash and provide it directly to the user. Alternatively or in addition, other fulfillment devices may include wearable computers worn by merchant representatives who can control the wearable computers so as to provide messages that document the delivery of cash or other value to a user from merchant representatives.

Figure 29:
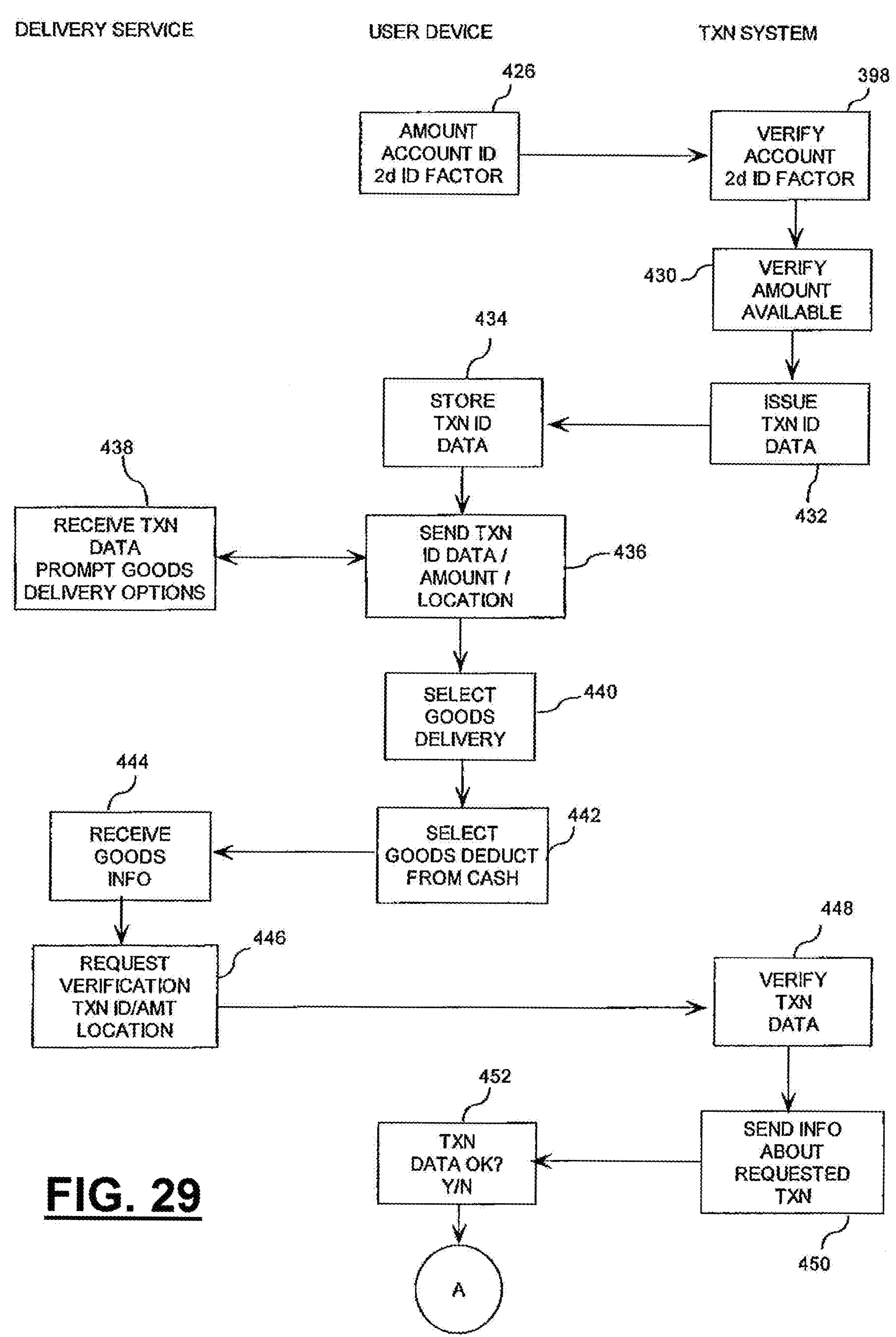
FIGS. 29-31 are a schematic representation of program logic carried out in one or more computers in connection with delivering cash or other items to a user or other user designated person.
Figure 30:
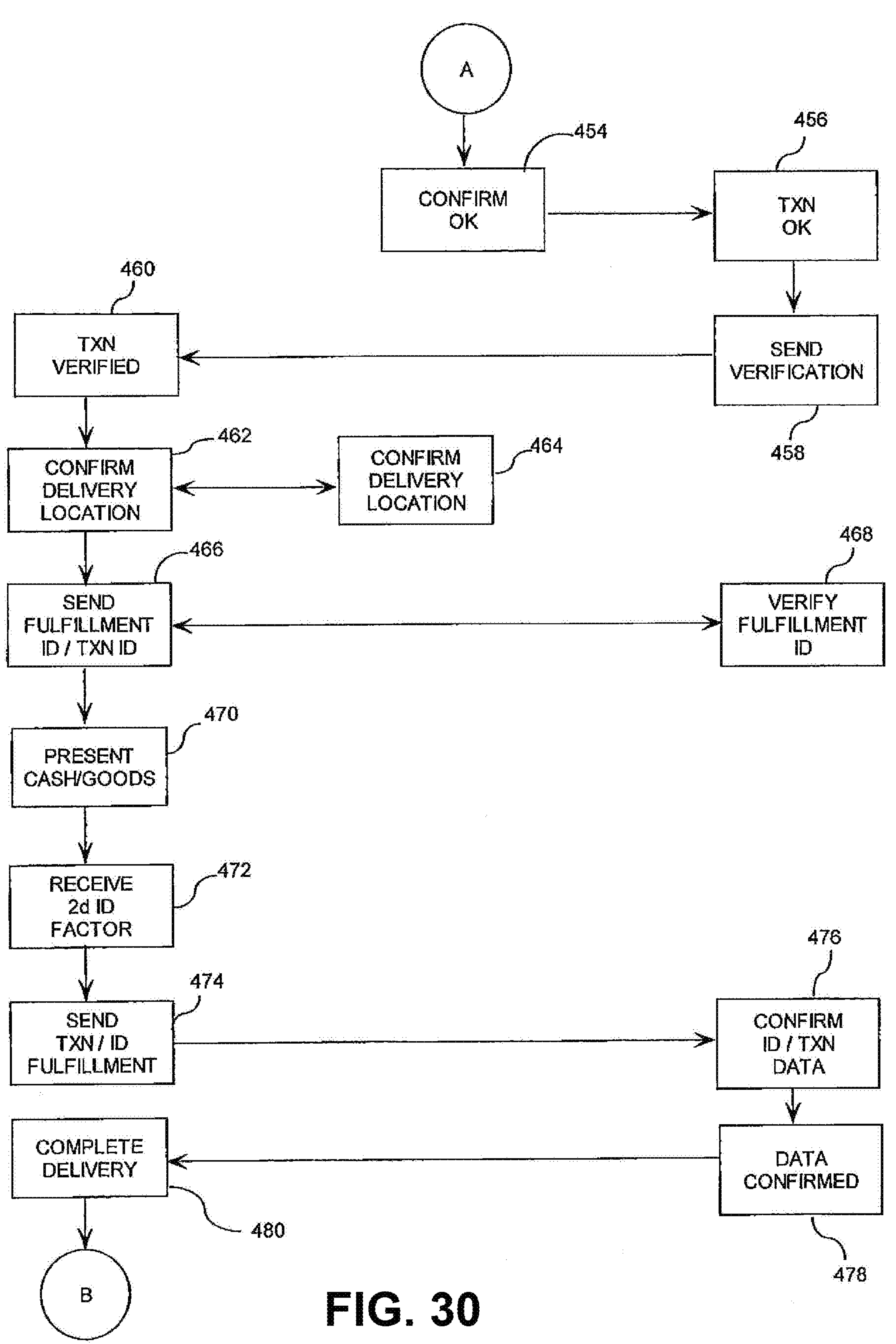
Figure 31:
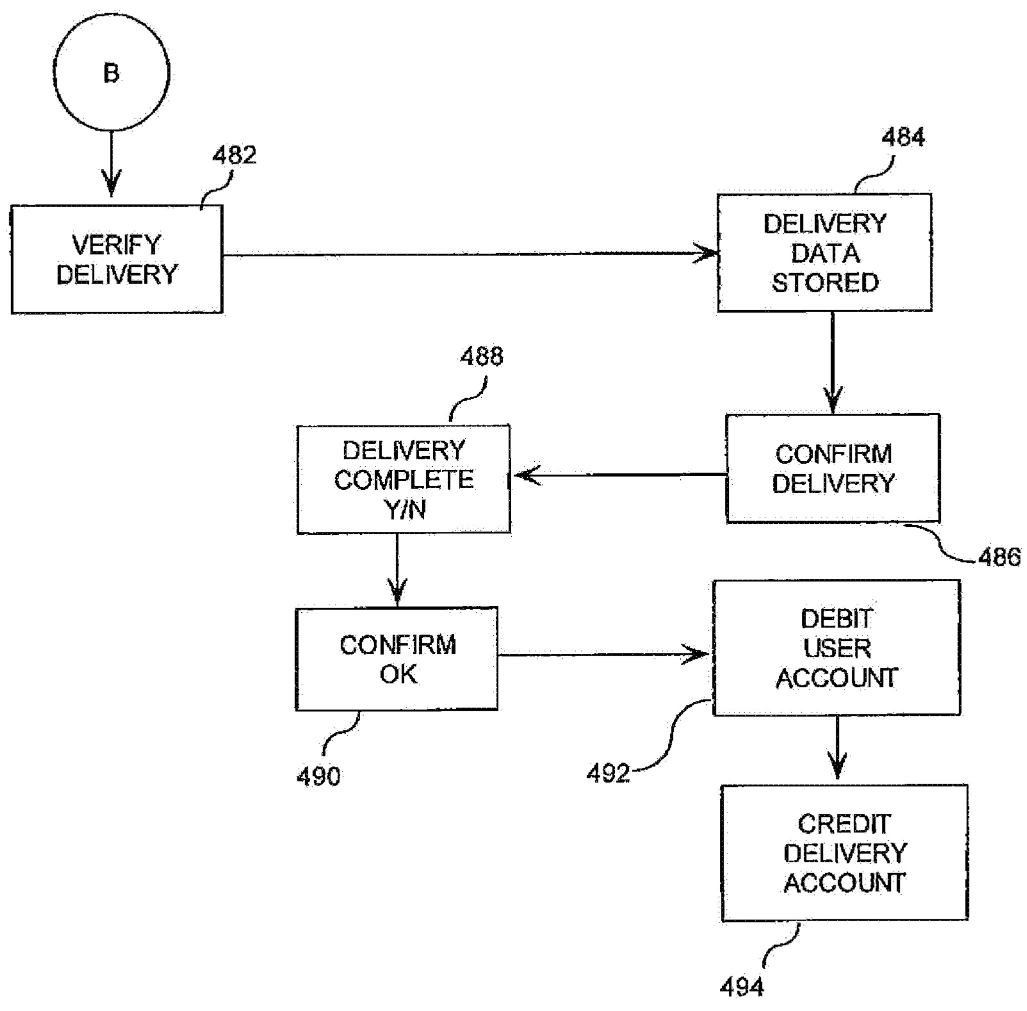

FIGS. 29-31 show schematically the program logic executed by one or more computers in an alternative system in which the user may receive cash or other value. The system described in connection with this exemplary arrangement unlike the previously described arrangement, may enable a user to have cash or other things of value delivered to them rather than the user having to travel to a fulfillment location to receive the requested value. In this exemplary arrangement a user may operate a user device such as a mobile device including a smart phone or wearable computer terminal of the types previously described. Alternatively in some exemplary arrangements the user device may include a tablet computer or personal computer or other type of transaction terminal that is accessible by a user in connection with making transaction requests. In this exemplary arrangement the one or more devices that are operated by an entity that fulfills the user's transaction request are referred to as a delivery service.

The transaction system utilized in connection with this exemplary arrangement may include one or more servers of the type previously described that operate in accordance with their programming and that may operate to cause financial transfers between the accounts of the various entities involved. Exemplary arrangements may include features like those disclosed in U.S. Pat. Nos. 11,080,669; 11,727,373; or 11,727,374 the disclosure of each of which is incorporated herein by reference in its entirety.

In this exemplary arrangement the user requesting a transaction operates a user device as represented in a step 426. In this exemplary arrangement the user device may include a portable wireless device through which a user provides inputs corresponding to a request for the amount of cash or other value that a user wishes to receive. The device also operates in accordance with its programming to recover from one or more data stores, data corresponding to an account. This may include an account number or alternatively token data or other data from which the transaction system can derive data corresponding to an account. In addition in this exemplary arrangement the user device operates to receive a second user identifying factor. Such an identifying factor may include, for example, a personal identification number from the user, a scan of a user's fingerprint, a facial image, a user's voiceprint or spoken secret words, a signature image, an iris scan or other suitable identifying factor which identifies the user as an authorized user. Of course it should be understood that additional data or other data may also be provided in connection with a particular transaction system.

The user device operates to send the transaction data to one or more servers associated with the transaction system. The servers operate in accordance with their programming to verify the account and other information which identifies the user as an authorized user and/or as the user of a valid account. This is represented by a step 428. The transaction system further operates in a step 430 to verify that the amount requested by the user is available. The transaction system then operates to generate a transaction identifier or other data that can be used to identify the user's requested transaction. This data is sent to the user device as represented in a step 432. Of course in other arrangements additional data such as data for authenticating the transaction, encrypting the communications, or that is otherwise usable in connection with the transaction may also be sent by the transaction system to the user device.

In the exemplary arrangement the user device is operative to store the transaction identifying data received from the transaction system as represented in a step 434. The user then may operate the user device at a time proximate to receiving the transaction identifying data or at a later time, to send the transaction identifying data and other data such as the amount of the cash or value requested, to a terminal device of the delivery service. Further in the exemplary arrangement the user device operates in accordance with its programming to send to the delivery service device, data corresponding to the current location of the user device and/or location data corresponding to a place of delivery. This is represented in a step 436.

In the exemplary arrangement the data communicated in step 436 from the user device is transmitted via wireless or wired communication to a terminal device including at least one processor and data store operated by the delivery service. The delivery service device receives the transaction data and communicates with the user device to communicate options for the delivery of goods and/or the cash or other value that is requested by the user. This is represented in a step 438. For purposes of this exemplary arrangement, the delivery service will be described in connection with a service that provides food items for delivery. In some exemplary arrangements the services which are offered by entities who deliver food for consumption may be utilized to also provide cash or other items of value so as to make better use of the resources that are commonly used for such delivery. Of course this approach is exemplary and in other arrangements the delivery service may be solely dedicated to the delivery of cash or may deliver other types of items or value.

In the exemplary arrangement the data communicated from the device of the delivery service is received by the user device and causes the user device to operate in accordance with its programming to prompt the user to select whether the user wishes to have certain types of goods delivered along with the requested cash. This is represented in a step 440. The user provides inputs through one or more input devices of the user device to select any goods that the user also wishes to have delivered with their cash. Further as represented in a step 442 the user is prompted to provide inputs through the user device to indicate whether the value of the goods that they wish to have delivered is to be deducted from the amount of cash that they have requested. Generally in exemplary arrangements because the transaction has been previously verified for a given amount, the user will be required to agree that the cost of the goods will be deducted from the cash or other form of value that the user will additionally receive. In alternative arrangements, if the user wishes to receive goods and cash or other value which have a greater value than that originally authorized, the user device and the transaction system may operate in accordance with their respective programming to authorize the requested higher transaction amount.

In an exemplary transaction, the user agrees to have the value of the goods deducted from the initially authorized amount and communicates the goods information and such confirmation to the device operated by the delivery service as represented in a step 444. The terminal device of the delivery service then operates in accordance with its programming to cause one or more messages to be sent by the delivery service device to the transaction system. The messages in the exemplary arrangement are operative to request verification of the transaction ID, the total value of the transaction, and the location for delivery that has been provided to the delivery service device from the user device. This is represented in a step 446.

The data communicated from the delivery service device is then verified as correct through operation of the transaction system. This is represented in a step 448. Of course if the transaction data cannot be verified through operation of the transaction system, the exemplary arrangement sends appropriate messages to the delivery service that the transaction is not verified and should not proceed. In addition other steps may be taken as well in accordance with the programming of the servers which comprise the transaction system and/or the terminal device of the delivery service.

If the transaction data is verified in step 448, the transaction system of the exemplary arrangement operates in accordance with its programming to cause one or more messages to be sent to the user device indicating the information concerning the requested transaction. This is represented in a step 450. The data sent to the user device may include details of the transaction, the delivery service, the amount involved, the goods involved or other information as is necessary for the user operating the user device to evaluate whether the transaction should proceed. The data sent to the user device causes the user device to present an interface to the user which requests that the user provide inputs to either authorize or disallow the transaction. This is represented in a step 452. If the user does not confirm the transaction, then the transaction does not proceed and an appropriate message is sent to the transaction system.

Assuming that the user confirms the transaction as acceptable, one or more messages confirming such fact is sent to the transaction system as represented in step 454. The transaction system evaluates the messages and confirms that the transaction is acceptable as represented in step 456. The transaction system then operates in accordance with its programming as represented in step 458 to send one or more messages to the device of the delivery service to indicate that the transaction has been verified as authorized. The device of the delivery service receives these messages and verifies the receipt of transaction verification as represented in a step 460. In response to verifying that the transaction should proceed, the device of the delivery service operates in accordance with its programming to communicate with the user device to confirm the delivery location. This is represented by a step 462. The user device then provides communication to confirm the delivery location as represented by a step 464.

In response to confirming the delivery location, the delivery service device operates in accordance with its programming to send messages to the transaction system. The data sent by the delivery service device includes data corresponding to a fulfillment identifier (ID) associated with the delivery service as well as the transaction identifier associated with the particular transaction. The sending of this information is represented in a step 466. In response to receiving the data from the delivery service device, the transaction system verifies that it recognizes the fulfillment ID associated with the delivery service and confirms that it can complete the transaction associated with the financial transfers involved. This is represented by a step 468. In the exemplary arrangement if the transaction system determines that it cannot complete the financial transfers associated with the transaction, appropriate messages are sent to the device associated with the delivery service so as to prevent the transaction from proceeding. In response to verifying the fulfillment ID and transaction ID by the transaction system, the delivery service device receives confirmation messages from the transaction system to proceed with delivery of the cash and the requested goods. The delivery service then transports the requested cash and goods to the location where the user is located. The transport of the goods and cash may be tracked through operation of a device associated with the delivery service such as a portable terminal, wearable computer or other device which may be the same as or may be a separate terminal device capable of being in communication with the delivery service terminal receiving the other messages. The presentment of the cash and goods is represented by a step 470. In the exemplary arrangement when the goods and cash or other value is presented to the user at the location, a portable terminal associated with the delivery service is operative to receive identifying data to identify that the user receiving the goods and cash is the appropriate recipient. This may include, for example, in some arrangements the portable terminal of the delivery service receiving data such as by reading card data from a data bearing record provided by the user. Alternatively the portable terminal may receive a biometric identifier such as a fingerprint of the user. Alternatively or in addition, the terminal associated with the delivery service may receive identifying data from the mobile device of the user. Various types of input information or combinations of information may be so received which can be verified as associated with the authorized user. The receipt of the identifying factor or factors by the delivery service terminal is represented by step 472.

As represented in a step 474, in the exemplary arrangement the portable terminal associated with the delivery service is operative to send data indicative of the delivery of the cash and/or goods to the transaction system. In the exemplary arrangement the portable terminal of the delivery service is further operative to send the transaction data and data corresponding to at least a portion of the received user identifying data to the transaction system. Of course it should be understood that in step 474 additional data and/or other information that is usable to verify that the delivery is completed or the transaction is being fulfilled may also be sent to the transaction system.

As represented in a step 476, the transaction system of the exemplary arrangement operates to confirm the user identifying data and the transaction data associated with delivery of the goods and cash. The transaction system then operates in accordance with its programming in a step 478 to send one or more messages to the portable terminal of the delivery service to indicate that the identifying data has been confirmed. In response to receiving the confirmation data from the transaction system, the portable terminal of the delivery service prompts the individual making the delivery to complete the delivery as represented in a step 480. The delivery service terminal then prompts the user from the delivery service to verify the delivery through providing at least one input to the terminal and sends at least one message to the transaction system verifying that delivery has been completed in accordance with a step 482. In the exemplary arrangement the transaction system receives the data corresponding to the verification of delivery in a step 484. In response to receiving this data, the transaction system stores the data indicating delivery has been made. The transaction system further operates in accordance with its programming to send to the user's portable device, one or more messages asking the user to confirm delivery of the goods and cash. This is represented in a step 486.

In response to receiving the one or more messages from the transaction system, the user device operates in accordance with its programming to present an interface to the user which prompts the user to provide an input that the delivery of the requested goods and cash has been completed. This is represented in a step 488. If the transaction is proceeding properly, the user then provides one or more inputs to the user device which causes one or more messages to be sent to the transaction system confirming that the delivery has been made in a satisfactory manner. This is represented in a step 490. Responsive to receiving the one or more messages sent by the user device in step 490, the transaction system operates to cause a charge or debit to be made against the account of the user as represented in a step 492 and to cause a credit for the amount of cash and goods or other value delivered by the delivery service as represented in a step 494.

Of course in the exemplary arrangement if the user does not confirm appropriate delivery of the goods, additional steps are taken so as to resolve the discrepancy. This may include, for example, additional communications between the delivery service terminal, the user terminal and the transaction system so as to prevent or revoke the delivery of the goods, cash or other value to unauthorized persons. In addition, the user terminal and delivery service terminal may include image capture devices or other devices for obtaining information so as to document the circumstances of delivery if the delivery is going to be completed so that the recipient cannot deny delivery at a later date. The particular steps taken will depend on the capabilities of the particular system and the devices involved. Further it should be understood that additional or different steps may also be taken through operation of the various devices in connection with the exemplary steps described. Further numerous different variations may be utilized in connection with various arrangements. Further although cash and goods delivery has been described as the form of value delivered in connection with this exemplary arrangement, it should be understood that other types of delivery may also be made. This may include, for example, other types of value such as prepaid cards, stored value cards, gift cards, scrip or other things that can be redeemed for goods or services. Of course it should be understood that numerous different combinations of goods, services, cash or other items of value may also be delivered through systems of this type.

Figure 32:
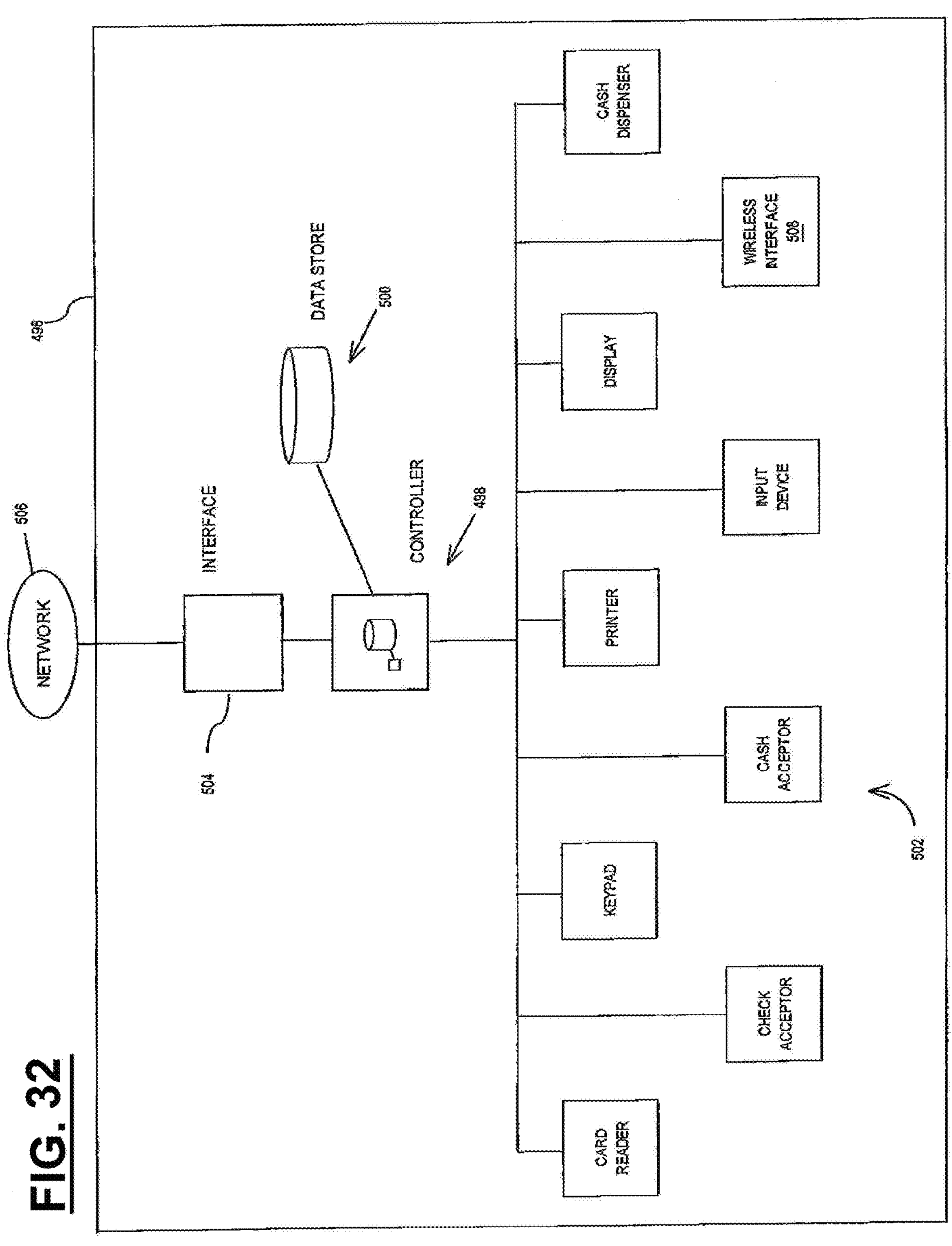
FIG. 32 is a schematic view of an automated banking machine which communicates with mobile user devices.

FIG. 32 shows schematically a further alternative arrangement of an automated banking machine 496.

Automated banking machine 496 may include features like the automated banking machines previously described and may be used for carrying out transactions including transfers of value. The exemplary automated banking machine includes at least one controller 498 including a circuitry including at least one processor having structures like those previously described. The controller further includes one or more data stores schematically indicated 500 which store computer executable instructions, data and other information associated with operation of the automated banking machine. The automated banking machine further includes a number of transaction function devices collectively referred to as 502 that are in operative connection with the controller. The transaction function devices may include, for example, in some arrangements card readers, key pads, printers, displays, cash dispensers, check acceptors, cash acceptors, input devices, output devices, mid-air haptics output devices and various other types of devices that are used in connection with the particular types of transactions that are carried out by the automated banking machine. Card readers may include for example, magnetic stripe readers, chip card readers or wireless readers. The exemplary machine further includes at least one suitable interface 504. Interface 504 is usable to provide communications with one or more networks 506. Networks 506 are in operative connection with one or more transaction systems including remote computers such as servers and other systems which enable carrying out transactions of the type for which the automated banking machine is specifically adapted. The interface 504 may also communicate in local networks or other networks with terminals such as servers, desktop computers, laptop computers, or mobile devices.

The exemplary automated banking machine 496 further includes a wireless interface 508. The wireless interface 508 of the exemplary arrangement is suitable for radio frequency communication with relatively nearby mobile devices. Such mobile devices may include smart phones, tablet computers, wearable computers or other portable computing devices commonly carried by users which may come into proximity with the machine. Such mobile devices may include features and capabilities like those of mobile devices 78 and/or 100 previously described. In the exemplary arrangement the at least one terminal controller 498 or other circuitry in association with the machine may be operative to provide communications with one or more types of mobile devices and applications operating therein. Further in some exemplary arrangements the communication provided is operative to inform a user of the mobile device that the automated banking machine may provide a particular type of item such as a product or service, or transaction function, that a user associated with the mobile device may be seeking to obtain. For example in some exemplary arrangements the wireless interface 508 may include a Bluetooth™ interface that utilizes the iBeacon™ protocol of Apple® computer or another beacon protocol to communicate with nearby mobile devices which may be within about 450 meters from the interface. In other exemplary arrangements GPS position determinations of devices within a mile or other distance nearby the wireless interface may be utilized in connection with making determinations for communication with a mobile device. The machine may communicate with the nearby devices by WiFi or other RF messages. Of course these approaches are exemplary of approaches that may be used.

For example in an exemplary arrangement a mobile device of the user may include circuitry operating a particular application or other suitable programming that enables a user to input transaction types and/or parameters for transactions or products that they wish to conduct or acquire. For example, such an application may enable the user to input data to the mobile device corresponding to a request to obtain cash in a particular amount and to not incur a transaction fee for receipt of the cash above a particular threshold. For example the user may program their mobile device to provide messages indicating that the user seeks to obtain cash in the amount of $300 without incurring a transaction fee in excess of $2.00. Of course it should be understood that this sought transaction function (cash dispense) and sought transaction parameters of amount and transaction fee that are output in wireless messages from the mobile device are merely exemplary.

The exemplary automated banking machine 496 may include data in its one or more data stores 500 that corresponds to transaction functions available at the machine, as well as available transaction parameters that are associated with the available transaction functions. For example the stored available transaction function data and associated available transaction parameter data may indicate that the owner or operator of the machine is willing to offer the dispense of cash in certain amounts for certain transaction fees. The data store 500 associated with controller 498 of the machine may further include programming that is operative to cause the machine to receive wireless communications from nearby mobile devices that indicate a sought transaction function of the user of the mobile device. The exemplary controller 498 operates to compare data corresponding to the sought transaction function and the data in data store 500 corresponding to the available transaction functions that correspond to available functions at the machine. Responsive to an availability determination that the sought transaction function corresponds to an available transaction function, the controller is operative to cause at least one message to be sent through the wireless interface 508 to the mobile device, including data indicative that the sought transaction function is available at the machine.

In some exemplary arrangements the received wireless messages from the mobile device may include data corresponding to the mobile device user's sought transaction parameters, such as an amount of a cash dispense and/or that the assessed transaction fee will be at or below a sought threshold amount. In such situations the controller 498 operates to compare the data corresponding to the sought transaction function and associated one or more sought transaction parameters from the mobile device messages with the stored data corresponding to the available transaction functions and the available transaction parameters associated with the respective available transaction functions. In cases where the sought transaction function corresponds to stored data for an available transaction function at the machine (for example a cash dispense) and the sought transaction parameter corresponds to stored data for an available transaction parameter that is associated with the available transaction function (for example a transaction fee for a cash dispense function at or below the fee sought by the user of the mobile device) the controller 498 causes a transaction availability determination to be made. The controller then operates responsive at least in part to the determination to cause the wireless interface to send to the mobile device one or more messages indicating that the transaction corresponding to the messages the mobile device of the user is sending, is available at the machine. The data store 500 associated with the controller 498 includes executable instructions that cause messages that communicate this information to the requesting mobile device through the wireless interface. Further in some exemplary arrangements the programming of the machine may be such that normal transactions attract transaction fees that are higher than those that the owner of the machine is willing to offer to those which are seeking lower transaction fees through communications with transient mobile devices through the wireless interface.

In the exemplary arrangement the mobile device of the user is carried by the user and transmits wireless messages corresponding to the sought transaction functions and associated parameters that the user is seeking from nearby automated banking machine terminals which can receive such messages. The machine 496 is operative to receive through its wireless interface 508 the messages from the user's mobile device including messages which indicate that the user is seeking (for example) to receive cash in a particular amount for a transaction fee that is no more than an indicated sought transaction fee. In response to receiving these messages, the controller 498 of the machine is operative to cause a transaction availability determination that the machine is programmed to offer a transaction that satisfies the parameters that the mobile device user is seeking. The controller then operates in accordance with its programming to communicate with the user's mobile device through the wireless interface 508. The controller operates to indicate to the user mobile device that the requested transaction is available at the machine. The user may also be prompted to provide one or more inputs to their mobile device to receive directions to travel to the machine if the user is interested in completing the transaction. Location information for the machine and/or directions for travel by the mobile device user from a current mobile device location may be resolved through operation of the controller 498 and communicated wirelessly to the mobile device. Further in exemplary arrangements the user may also be informed through wireless messages from the wireless interface that in order to obtain the cash for the requested fee, the user can use a certain code, electronic token or other data which is provided by the machine to the user mobile device. In the exemplary arrangement the user operating the mobile device may operate the device to receive the code, data or token wirelessly from the machine at the time of the initial communication. The code, data or token may be stored in a data store of the mobile device. Alternatively in other arrangements the user may be advised that they can obtain the discounted transaction fees by taking other steps when they are present at the machine.

If the user elects to travel to the machine, the user may commence a transaction in the usual manner such as by presenting to the machine a card and PIN number or other user or account identifying data through one or more reading and/or input devices of the machine. In the exemplary arrangement the programming of the controller is configured to prompt the user to provide an input to an input device of the machine to indicate that they are conducting a transaction in response to a promotional offer or other communication received through their mobile device. In response to providing an input corresponding to this particular transaction selection, the user is enabled to provide the data, code or token previously delivered to their mobile device. This can be provided through communication by the user's device with the wireless interface or an image capture device of the machine capturing an image output on a display of the mobile device or the user providing manual inputs to input devices to the machine. Alternatively the user can commence another communication session through their mobile device while at the machine so as to indicate to the machine that they are responding to the promotional offer to receive the cash for the reduced transaction fee. The mobile device may communicate to the machine the data, code or token in this session. In response to receiving the information from the user, the machine operates in accordance with its programming to conduct a transaction that fulfills the transaction function requested by the user. This would include in the example the delivery of cash with the assessment of only the $2.00 transaction fee as sought by the user. In some exemplary arrangements the machine is programmed to cause any additional charges that may be associated with the transaction to be absorbed by the machine owner or the owner of the establishment in which the machine is located. Alternatively in some exemplary arrangements the machine may carry out a portion of the sought transaction function and provide the user with an item or data that will enable the user to complete the transaction function separate from the machine. For example the user may be assessed the usual transaction fee for the transaction, but may be issued a receipt, token, code or instructions that allow the user to receive cash or other value from a service provider or another device in the establishment where the machine is located, that corresponds to the excess fee charged over the amount the user requested. The owner of the machine or the establishment may do this to obtain the benefit associated with having the user present in their establishment with cash that can be used to acquire goods or services from the establishment. Alternatively and/or in addition the user may be required to watch certain advertising or other information output by the machine or other terminal about goods or services of the establishment or the machine owner, while receiving the cash for the discounted fee. In this manner an exemplary arrangement provides for the mobile device user to receive the discounted transaction fee they requested and the owner of the machine and/or the establishment in which the machine is located, to receive the additional benefit associated with more customers present within the establishment and/or reviewing advertising messages associated with the establishment.

Although the mobile device request previously described provides wireless data corresponding to a sought transaction function and sought parameters for a transaction which may be fulfilled through operation of exemplary automated banking machine, other mobile device messages may also request other types of sought transaction functions and/or sought products. These may include, for example, sought transaction functions associated with other types of goods or services that can be obtained through operation of the automated banking machine. Such goods and services may include available transaction functions such as the provision of tickets for events or facilities, gaming materials or other items that can be offered through operation of the automated banking machine.

For example, a mobile device may send wireless messages that include data corresponding to sought transaction functions with or without data corresponding to sought transaction parameters, such as check accepting transactions, cash accepting transactions, remote video or in person teller assisted transactions, check cashing transactions, merchant deposit transactions, or other types of transactions.

One or more of such sought transaction functions may correspond to available transaction function data (and corresponding transaction parameter data) for the machine that is stored in at least one data store 500 associated with the at least one controller 498. The controller operates to resolve the sought transaction function (and if applicable, associated sought transaction parameters) corresponding to data in the messages received from a mobile device, and to compare the sought transaction (and parameters) to the stored data corresponding to data for available transaction functions and if applicable associated available transaction parameters. Responsive to the sought transaction function corresponding to one of the available transaction functions, and if applicable, the sought transaction parameters being within or corresponding to the data for available transaction parameters, the controller is operative to make an availability determination. Responsive at least in part to the availability determination, the controller operates in accordance with stored circuit executable instructions to cause at least one message to be sent through the wireless interface to the mobile device that sent the messages seeking the transaction, indicating that the sought transaction function is available through a transaction carried out at the machine. Further the additional communications can provide data and information of the types previously discussed to the mobile device such as providing location information for the machine or the establishment in which the machine is located, providing directions to the machine or establishment, and providing to the mobile device the code, token or other data that will enable the user to conduct the sought transaction function (or a portion thereof) at the machine. Of course these communication types are exemplary.

In some exemplary arrangements in circumstances where the sought transaction function and/or sought transaction parameters do not correspond to stored data for an available transaction function or available transaction parameter, the controller is unable to make a transaction availability determination. In such circumstances the controller 498 may operate in accordance with its stored executable instructions to send no responsive messages to the mobile device. In alternative arrangements the controller may operate in accordance with the executable instructions to cause communications to the mobile device indicating an available alternative. For example if an available transaction function corresponds to a sought transaction function, but the sought transaction parameter does not correspond to the associated available transaction parameter, the controller may operate to communicate to the mobile device that the sought transaction function is available at the machine, and communicate the available transaction parameter that is closest to the sought transaction parameter. For example, if a mobile device user is seeking an amount of cash for a zero transaction fee, and the stored data associated with the machine indicates that a cash dispense is available, but the lowest available transaction fee for the transaction is one dollar, the controller may communicate this information in wireless messages to the mobile device. The user may then communicate wireless messages from the mobile device if the user is interested in the offer. In the case of the wireless interface receiving a message including data providing an affirmative response within a programmed time of when the offer is sent, the controller operates to send the mobile device the directions/location information, code/token data or other information that enables the user to come to the machine and conduct a transaction that includes the sought transaction function.

Alternatively or in addition the instructions and data in one or more data stores 500 associated with the controller 498 may be operative responsive to the controller not being able to make an availability determination, to resolve an alternative available transaction function that the executable instructions indicate might be a substitute for the transaction the mobile device user is seeking. For example, if the sought transaction of the user is a check cashing transaction, and a check cashing transaction is not available, the controller may send messages to the mobile device describing an available transaction that offers issuing the user a stored value card in exchange for receipt of the check. Alternatively the messages may describe other available transactions that may be carried out wholly or partially through operation of the machine or in the establishment where the machine is located. For example the controller 498 may be operative to send messages to the mobile device to offer services such as loans, pawn services or other services that may be of interest to the mobile device user based on the sought transaction and parameters. Likewise if a user is looking for in person transaction assistance for a transaction, the controller may send messages that offer a transaction that is assisted by a video link to a live service provider. Of course these examples are merely exemplary and numerous types of alternative transactions may be offered to mobile device users.

Alternatively and/or in addition, exemplary arrangements may be operative to fulfill requests for sought products by user of mobile devices in addition to sought transaction functions. For example exemplary arrangements may be utilized to respond to a mobile device user's request seeking a product such as goods, a service or a feature which are provided by or associated with the particular establishment in which the automated banking machine is located. For example in an exemplary arrangement, the mobile device may be operated to transmit messages including data corresponding to sought products of the mobile device user and associated sought product parameters. Such sought product parameters may include things like particular prices, sources within particular distances of the mobile device current location, the ability to make payment for the sought products with certain payment methods such as by a check, a particular payment vehicle type, public benefit card, discount card, the ability to qualify for a senior or affinity discount, the ability to utilize a discount offer or coupon, the ability to obtain or use affinity benefits or loyalty points in connection acquiring with the product, or other parameters. In exemplary arrangements, the stored data associated with the at least one controller 498 of the machine may include data corresponding to available products (e.g. goods or services) and associated available product parameters corresponding to the available products. Such stored available product data and stored associated available product parameters may correspond to goods or services that are available or that may be acquired in the establishment where the machine is located separate from operation of the machine. Alternatively in some exemplary arrangements such available products may be offered through transactions carried out in part through the machine, and partially through terminals or service providers located in the establishment. For example in some exemplary arrangements, the machine may operate based on stored data in at least one data store 500 regarding available transaction functions and associated transaction parameters, as well as data corresponding to available products and available product parameters. Various approaches may be taken depending on the particular establishment where the machine is located and the particular transactions and products that are offered through the machine and at such establishment.

As can be appreciated, the executable instructions associated with the controller 498 enables the automated banking machine 496 to receive wireless messages through the wireless interface 508, that includes data corresponding to sought products, and if applicable, sought product parameters associated with the sought products that the mobile device user is seeking. The controller operates in accordance with the executable instructions and data to compare the sought product and parameter data to stored data corresponding to available products and the associated available product parameters. The exemplary controller is operative based on comparison of the stored available product and corresponding product parameter data and the received sought product and sought parameter data, to make the product availability determination based on the sought products of the mobile device user (and applicable sought parameters) corresponding to the data stored in the at least one data store related to available products and associated parameters.

Responsive at least in part to the at least one controller making an available product determination, the controller is operative to communicate through the wireless interface with the mobile device indicating that the sough product provided in accordance with the applicable associated parameters is available in the establishment where the machine is located. The controller may further operate in accordance with its programming to communicate with the mobile device to indicate location and/or directions to the establishment. The at least one controller may operate in accordance with the executable instructions to wirelessly provide to the mobile device a code, token or other data such as an electronic voucher or a coupon that is usable to obtain the sought product as well as other information or items that are necessary for the user to obtain the sought product at the establishment. If the user chooses to go to the establishment to receive the product, the user may utilize the information such as a code, token, voucher or coupon provided to the mobile device to acquire the sought product. This may include, for example, the user's mobile device carrying out communications with the automated banking machine or other terminal so as to identify the sought product and parameters of the user, or other information necessary to accomplish the transaction. Alternatively or in addition, the user's mobile device may provide an output through the display thereof such as visible indicia or QR code which is indicative of the sought product, the transaction, the code, token or voucher, payment methods utilized by the user and/or other information usable to complete the transaction. Particular approaches utilized in completing the transaction at the establishment where the machine is located will depend on the nature of the product that is sought and the conditions and parameters under which the transactions are carried out.

Alternatively and/or in addition, similar to the arrangement discussed in connection with offering alternative transaction functions, the executable instructions associated with the controller may be operative when a product availability determination cannot be made, to offer an alternative product and/or product parameters to the mobile device user. The programming associated with the controller may be operative to resolve that the sought product and/or product parameters of the user do not correspond to available product and/or available product parameters, but that the stored data indicates that the establishment offers alternatives that may a suitable substitute of interest to the user. The executable instructions associated with the controller may operate to resolve such available alternative products and/or parameters and communicate to the mobile device that the one or more alternative products or parameters are available at the establishment. The user may then provide one or more inputs that cause communications from the mobile device with the wireless interface indicating interest in the alternative. The controller may then operate responsive to the receipt of the at least one wireless communication to cause the machine to send the mobile device wireless communications with data including location, directions, information, a code, token, coupon or other information or other data, to enable the user to travel to the establishment and to carry out the desired product transaction. Of course it should be understood that these approaches and techniques are exemplary and in other arrangements other approaches may be utilized.

Further in some exemplary arrangements, the at least one controller may operate responsive to being unable to make a transaction availability determination and/or a product availability determination to obtain authorization from the owner or operator of the automated banking machine or the establishment, that the user's sought transaction or product may be provided even though it does not fall within the stored data corresponding to transaction function availability and transaction parameters and/or product availability and associated product parameters. For example, communication from a mobile device may indicate that there is a user in proximity to the machine who is seeking a transaction that may correspond to a transaction available from the machine, but the user's sought transaction parameters do not correspond to the stored data for available transaction parameters currently offered for that transaction at the machine. In some exemplary arrangements responsive to the at least one controller not being able to make a transaction availability determination, the controller may operate in accordance with stored executable instructions to send one or more query messages through wireless interface 508 or the interface 504, to a terminal device associated with the owner or operator responsible for operation of the machine. In exemplary arrangements, the controller is operative to send at least one query message to the remote terminal indicating the sought transaction and the sought transaction parameter of the mobile device user. The remote terminal which may include a desktop computer, a laptop computer, a mobile device or other suitable terminal associated with the entity responsible for the machine or establishment, receives the at least one query message presenting the requested transaction parameter of the mobile device user. This information may be output in a suitable display or other output device of the remote terminal.

Responsive to reviewing the sought transaction parameter or other information provided by the data included in the at least one query message, a user of the remote terminal may provide one or more inputs to input devices of the remote terminal indicating that the transaction parameter requested by the user will be accepted, or alternatively may be accepted but with certain conditions. Responsive at least in part to the at least one input, the remote terminal is operative to send at least one query response message to the at least one controller including data which is used to determine at least one response message that the machine sends to the mobile device. In circumstances where the at least one query response message indicates that the user's requested transaction parameters will be accepted, the at least one controller causes at least one message to be sent to the mobile device indicating that the sought transaction (and if applicable associated parameters) is available at the machine. Alternatively or in addition, in some arrangements the user of the remote terminal may receive information that may enable the remote terminal to communicate wirelessly either directly or through the wireless interface of the machine, with the mobile device of the user to provide communication therewith. Such communication may include communications that enable the operator of the machine or the establishment where the machine is located, to obtain additional information from the mobile device user about the transaction or transaction parameters being sought. Data communicated through such messages may include information which will help the operator of the remote terminal to obtain and evaluate information about the mobile user's account, situation, the nature of the transaction, or other information that enables the remote terminal user to decide if the requested sought transaction of the mobile device user should be fulfilled at the automated banking machine or separately by the establishment. Of course in response to a determination that the sought transaction will be fulfilled, the at least one controller of the machine may operate in accordance with its programming to provide the mobile device user with the data, information and items like those previously described so as to enable the user to travel to the machine and/or the establishment and accomplish the sought transaction function.

In other exemplary arrangements, the controller 498 may operate to enable communication with remote terminals operated by the individuals responsible for the establishment in which the machine is located, in response to an inability of the controller to make a product availability determination. For example, in some exemplary arrangements where the sought product information included in wireless messages does not correspond to available product data in the at least one data store, the controller may operate to send at least one query message to a remote terminal associated with the operator of the establishment to determine if a substitute for the sought product of the mobile device user is available in the establishment. Alternatively or in addition, if the sought product is available in the establishment as indicated by stored product availability data associated with the controller, but the available product data does not correspond to the mobile device user's sought product parameters, the controller operates to send one or more query messages including this information to a remote terminal associated with the entity responsible for operation of the establishment.

The operator of the remote terminal may review this information included in the at least one query message from the at least one controller and may provide from the terminal responsive thereto, at least one query response message. The query response message may cause the controller to operate to indicate to the mobile device that the sought product will be made available in the establishment. Alternatively, the query response messages may include alternatives that cause the controller to send wireless messages to the device that describe alternative products or product parameters that the establishment is prepared to offer. Alternatively or in addition, communication may be established between the remote terminal and the user's mobile device either through the wireless interface of the machine or directly based on information included in the at least one query message. Such communication may enable the user of the remote terminal to obtain additional information or other data which enables the operator of the establishment to make a determination as to whether the sought product can be provided under the sought product parameters of the mobile device user and/or whether the mobile device user may be willing to accept a substitute available product or substitute parameters from the operator of the establishment.

As can be appreciated, exemplary arrangements may enable the user of a mobile device to use the device to look for transactions or products at particular fees and prices, and/or under particular conditions, and obtain those things through an automated banking machine or establishments where such machines are located as the user travels in proximity to such machines and locations. Of course it should be understood that these approaches are exemplary and in other arrangements other or different approaches may be used.

Figure 33:
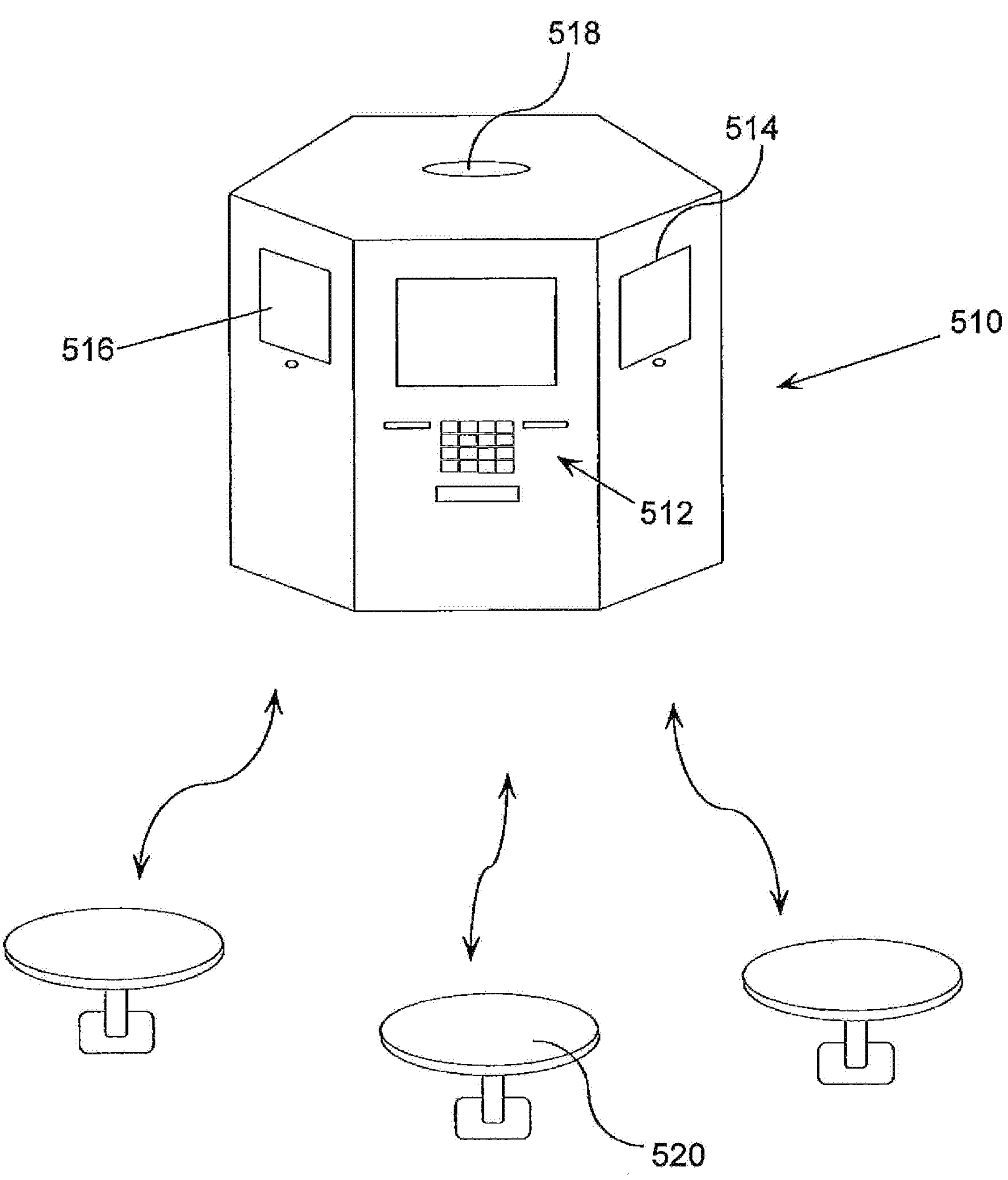
FIG. 33 is a schematic view of an automated banking machine and system that provides displays for mobile computers and carries out multiple transaction types.

A further exemplary arrangement of an automated banking machine 510 is schematically represented in FIG. 33. The automated banking machine 510 may include features and devices similar to those previously described except as otherwise mentioned herein. The exemplary automated banking machine 510 may be used for carrying out transactions of the types previously discussed at a transaction user interface area 512. Interface area 512 of the exemplary arrangement may include items for communicating with a user during transactions such as a display, key pad, mid-air haptics device, card reader, acceptor slot, printer delivery slot, cash accepting slot, cash delivery slot, check accepting slot or other appropriate interface elements for carrying out transactions with users.

Exemplary automated banking machine 510 further includes additional visual displays 514 and 516. In the exemplary arrangement, these visual displays are provided for purposes of facilitating activities by individuals who carry mobile devices and wearable computers that do not have visual displays and/or which may not have visual displays of a suitable size or configuration to carry out certain types of desired functions. The exemplary automated banking machine includes one or more wireless interfaces that are suitable for communicating with such mobile devices and which can facilitate the use of such devices or multiple devices that are carried by multiple users.

For example in some exemplary arrangements mobile devices may include a device such as a watch-like wearable computer, pendant or other mobile computing device that includes no visual display or only a small visual display. Bringing such a mobile device in proximity with a display such as display 514 causes the automated banking machine to operate in accordance with its programming to prompt the user to provide an input if they wish to utilize the display on the machine in connection with their device. In the exemplary arrangement the displays may comprise touch screen displays which enable a user to select whether they wish to utilize the display or not. By selecting an option presented through the display to connect to the mobile device, the mobile device can then present a user interface to the user through the display which provides multiple options and selections to the user. The user can then interface with their mobile device through the touch screen display on the automated banking machine. Further in exemplary arrangements the interface may also provide outputs from remote sources such as outputs produced by various Internet or other network connections that the user is able to make through their mobile device.

Thus the user is able to utilize their mobile device while using the display in connection with the automated banking machine as the input and output user interface for the mobile device.

Further in exemplary arrangements the automated banking machine may provide or have in connection therewith a printer which enables the user of the mobile device to print an item selected via the particular interface that is output through the display. The printer of the automated banking machine may deliver to the user the printed information that they have caused to be selected through or presented on the display. The automated banking machine may include one or more printer outlets 518 for this purpose. Further in exemplary arrangements the automated banking machine may operate in accordance with its programming to charge the user for use of the printing function or for other functions that a user may choose to execute when using the display interface provided on the machine. For example if a user uses the display interface in order to request that funds be added to a mobile wallet associated with the mobile device, the automated banking machine terminal controller may operate in response to the user's selected inputs to cause data representative of value to be included in the mobile wallet and to cause communications with appropriate networks so as to cause the user's account to be charged. Alternatively or in addition the automated banking machine may operate to cause money to be transferred to or from stored value accounts associated with the user's mobile device. Of course these approaches are exemplary and in other arrangements other approaches may be used.

In addition when the automated banking machine is located at a merchant establishment, provision may be made to have user interfaces which provide visual outputs from user mobile devices and which can receive user inputs to such devices located in other devices within the establishment. For example in some arrangements the automated banking machine may be located in a coffee shop or restaurant environment in which there are tables with input/output devices such as surface computers or table top supported terminals 520. The terminals 520 may comprise input and output devices which communicate with a user's mobile device and enable the user to employ the terminal of the table or similar structure as the display and input device for the mobile device.

In still other exemplary arrangements the displays in operative connection with the automated banking machine may be usable for purposes of facilitating transfers of value between mobile devices of multiple users. When mobile devices of users do not have suitable displays such as certain wearable computers, visual outputs may be presented to the user's mobile devices on the displays in communication with the automated banking machine. In situations where a user wishes to transfer value from a stored value account or other account, to another user who has a mobile device, both users may bring their devices in proximity to a touch screen display associated with the automated banking machine. In such circumstances, devices may communicate with the machine to provide outputs through the display and the users may provide inputs so as to use the interface presented by the machine for communication with one or both devices. In such circumstances the display may be used to provide inputs and receive outputs to cause value to be transferred from one device to another and/or to the accounts of the respective users. Thus for example if a user of a mobile device wishes to transfer funds to a user of another mobile device, they may do so using the interface provided on or through communication with the automated banking machine. Further in exemplary arrangements the automated banking machine may include encryption features or other security features that help to assure that the communication of the messages which communicate the value or cause the value to be transferred are secured in a manner that is more effective than occurs when mobile devices communicate directly. Such encryption functions may be controlled or initiated through inputs provided to the displays that are connected to the automated banking machine. For example the automated banking machine may have its controller operate in accordance with its programming to provide to mobile devices, one-time session keys and/or encryption keys that are usable to provide communication on a secure basis between the mobile devices while they are operated in connection with the automated banking machine. Thus the automated banking machine may provide additional value that facilitates the carrying out of transactions between wearable computers, particularly such computers that do not include suitably large user displays or input devices.

Further in exemplary arrangements the automated banking machine 510 may be utilized for purposes of providing electronic tokens to wearable computers that can be used as a substitute for account numbers or account verification data in connection with carrying out financial transactions. For example it may be desirable in some transaction arrangements to use token data which can be used by a remote computer system to resolve a user's account number, rather than the actual account number for purposes of carrying out transactions. In addition tokens may also be provided for other data such as data corresponding to biometric data, PIN numbers or other values which a user may not want to have available in transmissions which could be intercepted or utilized by unauthorized persons if they are stored in a mobile device that is lost or stolen.

The exemplary automated banking machine operates in accordance with its programming to provide one or more tokens to users which can be stored in a user's mobile device. For example the automated banking machine may operate to receive a user's credit or debit card data as well as a PIN number, biometric data, cryptogram or other data that authenticates the identity of the user and/or the card. In response to the user providing inputs through the automated banking machine indicating that the user wishes to receive an electronic token for a mobile device, the automated banking machine operates in accordance with its programming to communicate with a remote transaction system. The remote transaction system verifies the authenticity of the card data and PIN or other data to determine that the user data and/or card data corresponds to an authorized user. In response to messages corresponding to token data from the remote system, the automated banking machine may then deliver through the wireless interface, a token that is stored in the memory of the user's mobile device. This may be accomplished responsive to a software application that operates on the mobile device that enables the receipt and storage of the token and/or other data. As can be appreciated, the token corresponds to data which a remote transaction system may receive, validate and associate with the user's account data. However, the token data has no relationship to the user's account data and thus if the token data is compromised, the user's account number is not obtained. Thus in exemplary arrangements once the user has received token data and stored it on their mobile device, the user can conduct transactions on their account using the token data in communications directly with the transaction system without transmitting their account number directly.

In other exemplary arrangements the automated banking machine may also operate to dispense token data corresponding to parameters other than a user's account number. This may include for example, token data corresponding to a user's biometric data, which token data may be stored in a user's mobile device. Such data may be sent from the mobile device to a separate device or system in lieu of actual biometric data when it is required for purposes of verifying transactions or identifying the device user. Alternatively or in addition the token data may be used and correlated by a remote system to compare fingerprint data that is scanned either on the user's mobile device or at a separate transaction terminal, with the remote system stored data so as to verify the user. Using a token stored on the mobile device instead of the biometric data itself reduces the risk of compromise of the data. Alternatively or in addition, an automated banking machine may operate to deliver computer executable instructions that enable the mobile device to perform other functions. This may include, for example, instructions and/or data used for the calculation of cryptograms or other values that can be used for authentication or other purposes when performing transactions.

Once the token and/or instruction data is loaded to the mobile device, the device may be operated to conduct transactions using the token data and/or other data. For example in some arrangements, the mobile device may be operated to conduct transactions by wireless communication with a remote computer system that operates to correlate the token data with account data. The user may communicate instructions from the mobile device to cause financial transfers which communication causes the remote computer system to carry out the transaction in accordance with the user's instructions.

In some arrangements, the user may utilize their mobile device to communicate token data (and other required data) to an automated banking machine. Such machines may include, for example, a cash dispenser, a point of sale terminal or other terminal type. In such arrangements, the mobile device may provide the token data to the terminal. The terminal will operate to present the transaction messages to systems that can authorize the requested transaction using the token data rather than the actual account number data. The terminal operates to communicate transaction messages using the token data as the account identifier. The terminal may communicate with one or more remote computers or systems that correlate the token data with the corresponding account data. The remote computer or system is then operative to authorize or deny the requested transaction based on stored account information and to provide appropriate return messages to the terminal. Further in exemplary arrangements, the mobile device may operate in accordance with its programming to provide other data as required by the terminal application to authenticate the desired transaction. This may include values such as account type identifiers, application identifiers, cryptograms, keys, prior transaction data, transaction velocity data, biometric data or other data required to be delivered in order to request authorization to carry out the particular transactions. This may include in some arrangements, different types of values and data for different types of transactions. In some arrangements, the values and data may vary with the transaction type being requested such as debit, credit, stored value or other types of transactions. The mobile device may operate to provide the additional values and data as required for the requested transaction in addition to the token data. Further some exemplary arrangements may have common token data linked to multiple different accounts in one or more remote computer systems so that the data provided by the mobile device also indicates an account or an account type which is linked for purposes of carrying out a currently requested transaction. This enables the token data to be securely utilized to conduct transactions on any one of numerous user selectable accounts or account types. The linking data for such accounts may in some arrangements be provided through user inputs received through operation of the automated banking machine during the user transaction session during which the token data is delivered. In other arrangements, the linking to additional accounts may be carried out in subsequent wireless communications between the mobile device and the computer system that links token data to account data. Such linking may be accomplished by a user input to the mobile device and a user interface provided by the remote system. Of course such communications should be appropriately secured to reduce the risk of unauthorized interception. Further in some exemplary arrangements, such communications based on user inputs to the mobile device may enable the remote system to discontinue linking of token data to particular user selected accounts.

Some exemplary remote computer systems may automatically and/or in response to user action, modify the token data. This may be done either periodically, after a set number of transactions, or after each transaction to reduce the risk of unauthorized transactions using the token data. Further in some exemplary arrangements, the system which operates to link the token data to account data and/or operates to change token data, may be operated in conjunction with a system that allows the user to selectively enable and/or disable their account or accounts via inputs through their mobile device such as described in the incorporated patent disclosures. For example, the remote system may send messages and/or data to the mobile device that operates in accordance with the application instructions executed therein to change the token data that is stored in the mobile device (and by the remote computer which corresponds to the account data). This may be done, for example, each time the account is enabled subsequent to being disabled by a user through inputs to their mobile device. In some arrangements, the messages from the remote system may cause the new token data to be resolved through operation of the mobile device based at least in part on existing stored token data. In this way, the interception of the messages to the mobile device that are operative to cause the existing token data to be modified will not result in disclosure of the new token data. Alternatively in some arrangements, the new token data entirely replaces existing token data and may be securely transmitted to the mobile device. Of course these approaches are exemplary and alternative approaches may be used.

Further in other exemplary arrangements the automated banking machine may be utilized to help users to avoid fraudulent transactions that may be conducted via other methods. For example a user may prefer to order goods or services by phone or using a personal computer which uses only the user account data and card data which can be verbally read from a card or input through a computer keyboard or other input device. Such transactions where the actual card is not presented to the merchant or a merchant's transaction terminal (a "card not present" transaction), can present risks because the data that is stored on a chip associated with a genuine card is not available to verify that the card is genuine. This is because in a transaction that is carried out either on the phone or at a PC or other terminal that cannot read the data from the chip on the card or communicate with the chip, only the visible data on the card can be used in connection with presenting the transaction.

Exemplary arrangements of automated banking machines may operate to provide the user with additional information or capabilities that can be used in transactions that are conducted with merchants when the card is not present. This may include, for example, the automated banking machine operating to verify the authenticity of the user's card including chip data included on the card. The user may also be authenticated by other factors such as the user's PIN, biometric identifiers or other data. With the user and their card authenticated, the terminal may operate to provide the user with an additional authenticating factor or a device that can provide such a factor that can be used when transactions are conducted with a merchant where the card is not physically presented to the merchant. In some arrangements this may include an additional secret code that is provided to the user from the automated banking machine. The code data may be provided by the machine in the form of a visual output, a printed document or other form of output. In some alternative arrangements, the automated banking machine may operate to send a secret code or similar data to a mobile device through a wireless portal of the machine. Alternatively or in addition, the machine may operate to electronically send the secret code to the user such as via a text message sent to a phone number that is input by the user or to another network address selected by the user such as an email address. The secret code may be stored in a remote system accessible by merchants for use in connection with transactions that are conducted by a merchant when the card is not present. Thus for example if the user places an order for goods on the phone or through a PC, the user can additionally provide the secret code in addition to the data on the card so as to further authenticate the transaction as authorized. Alternatively in some e arrangements the machine may provide the user with an article in a manner like that previously discussed, which article can output data which can be used as an additional authenticating factor.

For example in some arrangements, the machine may include a transaction selection option that provides the user with a unique value that can be later presented during a phone transaction that is carried out by the user with a merchant involving the same card based account. The value may correspond for example to a token value that has no relationship to the account data such as a random generated value that is correlated in one or more data stores of remote systems with the account data. The token data may be accessed by a merchant system at the time the later phone transaction is requested by the user. The token value can be received by the merchant via phone communication with the user so that the merchant may verify that the transaction is authorized. In some arrangements the token data may be used for one transaction and once utilized on one occasion by a merchant may be deleted from the remote system automatically. In other arrangements, the token value may be utilized for a number of phone or other transactions carried out where the physical card is not present. Alternatively or in addition, such value may be utilized for transactions conducted during a defined time period or up to a cumulative total value of transactions.

Alternatively and/or in addition, in some systems token values may be issued that can be resolved as authorized without access to stored data from the system that issued the token. For example, in some arrangements, token values may correspond to account data, user name data, card validation data, expiration date data, card issuer data or combinations thereof that are encrypted using a public key of a public/private key pair through operation of the system which issues the token. A merchant who is to conduct "card not present" transactions may hold the corresponding private key and utilize it to resolve the encrypted token data or confirm that certain other data that is provided by the customer corresponds to the data provided. In this way, the merchant who receives the token data can compare the resolved data or other values to data provided by the user in connection with the transaction. The fact that the data corresponds with the transaction where the card is not present is an indication that the transaction is conducted by an authorized card user. Of course these approaches are exemplary.

Alternatively and/or in addition, if a user normally conducts transactions such as purchase transactions by phone, when using the automated banking machine to receive transaction authenticating credentials for use in future "card not present" transactions, the user may be requested to provide an input to the automated banking machine of a spoken code word that the user will use in connection with transactions that are conducted in the future by phone. The automated banking machine may operate in accordance with its programming to communicate data corresponding to the code word and/or a voice print to the remote transaction system. The data is then securely stored in memory. When the user later wishes to place an order for goods via telephone, the communications by phone may include the user presenting the code word verbally to the order system in addition to data that is read from the card. This code word and/or voice data from the user is then compared to the stored data for correspondence. This provides an additional authenticating factor that the merchant receiving the order can use to have higher assurance that the transaction being presented by the user is authorized. Of course these are but examples of things that an automated banking machine may provide as additional authenticating factors to help assure that transactions requested of a merchant in circumstances where the card is not present at the merchant location, are not fraudulent.

Thus the exemplary arrangements achieve improved operation, eliminate difficulties encountered in the use of prior devices and systems, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the invention is not limited only to the features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

It should be understood that features and/or relationships associated with one arrangement can be combined with features and/or relationships from another arrangement. That is, various features and/or relationships from various arrangements can be combined in further arrangements. The inventive scope of the disclosure is not limited to only the arrangements shown or described herein.

It should be understood that language which refers to a list of items such as "at least one of A, B, or C" (example 1) means "at least one of A, B and/or C." Likewise, it should be understood that language which refers to a list of items such as "at least one of A, B, and C" (example 2) means "at least one of A, B and/or C." The list of items in example 2 is not required to include one of each item. The lists of items in both examples 1 and 2 can mean "only one item from the list or any combination of items in the list." That is, the lists of items (in both examples 1 and 2) can mean only A, or only B, or only C, or any combination of A, B, and C (e.g., AB, AC, BC, or ABC).

The term "non-transitory" with regard to instructions included on a computer readable medium is intended to exclude only the subject matter of a transitory signal per se, where the medium itself is transitory. The term "non-transitory" is not intended to exclude any other form of computer readable media, including, but not limited to, media comprising data that is only temporarily stored or stored in a transitory fashion. Should the law change to allow the claimed instructions on a computer readable medium to be transitory, then this exclusion is no longer valid or binding.

Having described the features, discoveries and principles of the exemplary arrangements, the manner in which they are constructed and operated and the advantages and useful results attained, the new and useful structures, devices, elements, arrangements, parts, combinations, systems, equipment, operations, methods, processes and relationships are set forth in the appended claims.

We claim:

1. Apparatus comprising:
at least one device that is operable by a user to cause a financial transfer, wherein the at least one device is wearable by the user, wherein the at least one device includes
at least one lens, wherein the at least one lens enables a user wearing the at least one device to visually perceive when looking through the at least one lens, physical surroundings in a direct field of view of the user,
at least one display, wherein the at least one display is operable to provide visual outputs that are visually perceivable by the user when looking through the at least one lens, wherein the user is enabled to perceive simultaneously when looking through the at least one lens the physical surroundings in the direct field of view and the visual outputs,
at least one user operable input device,
a wireless transceiver,
at least one circuit including a processor, wherein the at least one circuit is in operative connection with the at least one display,
the at least one input device,
the wireless transceiver,
wherein the at least one circuit is operative responsive at least in part to at least one input through the at least one input device to cause the wireless transceiver to communicate at least one device wireless message,
wherein the at least one device wireless message includes data usable to identify a financial account,
wherein the at least one device wireless message is operative to cause at least one remote circuit to cause a financial transfer at least one of to or from the financial account.

2. The apparatus according to claim 1
wherein the at least one device includes at least one inward facing camera,
wherein the at least one inward facing camera is operative to capture data corresponding to at least one user identifying biometric feature of the user,
wherein the at least one inward facing camera is in operative connection with the at least one circuit,
wherein the at least one circuit is operative responsive at least in part to the captured data to determine that the user is authorized to cause the financial transfer,
wherein the at least one device wireless message is sent responsive at least in part to the determination.

3. The apparatus according to claim 1
wherein the at least one input device includes at least one of
a microphone,
a short range radio frequency (RF) transceiver,
an outward facing camera,
an inward facing camera, or
at least one tactile sensor.

4. The apparatus according to claim 1
wherein the at least one input device includes at least one inward facing camera,
wherein the at least one inward facing camera is in operative connection with the at least one circuit,
wherein the at least one circuit is operative to determine responsive at least in part to the at least one inward facing camera, at least one of
a user eye movement,
a user line of sight, or
a user eye blink.

5. The apparatus according to claim 1
wherein the at least one device further includes at least one outward facing camera,
wherein the at least one outward facing camera is in operative connection with the at least one circuit,
wherein the at least one outward facing camera is operable to capture check image data corresponding to an image of a financial check,
wherein the at least one wireless message includes data corresponding to the check image data.

6. The apparatus according to claim 1
wherein the at least one device further includes at least one outward facing camera,
wherein the at least one outward facing camera is in operative connection with the at least one circuit,
wherein the at least one outward facing camera is operable to capture image data corresponding to an image,
wherein the at least one wireless message includes data corresponding to the image data.

7. The apparatus according to claim 1
wherein the at least one device wireless message includes pseudo data corresponding to the financial account,
wherein the pseudo data is usable by the at least one remote circuit to identify the financial account.

8. The apparatus according to claim 1
wherein the at least one input device includes at least one inward facing camera,
wherein the at least one inward facing camera is in operative connection with the at least one circuit,
wherein the at least one circuit is operative responsive at least in part to the at least one inward facing camera to detect at least one of
a user eye movement,
a user line of sight, or
a user eye blink,
wherein the at least one circuit is operative to cause at least one transaction selection option to be displayed to the user by the at least one display, and to determine at least one user selected transaction option responsive at least in part to the detected at least one user eye movement, user line of sight or and user eye blink.

9. The apparatus according to claim 1
wherein the at least one device further includes at least one outward facing camera,
wherein the at least one outward facing camera is in operative connection with the at least one circuit,
wherein the at least one outward facing camera is operative to capture image data corresponding to an image of indicia on at least one of a credit card, a debit card, a label, a currency bill, a device display, or a printed item in the direct field of view of the user, wherein the at least one device message includes data corresponding to the captured image data.

10. The apparatus according to claim 1 wherein the at least one device further includes a wireless reader, wherein the wireless reader is in operative connection with the at least one circuit, wherein the wireless reader is operative to wirelessly receive data associated with the financial account from at least one article, wherein the at least one device message includes data having a corresponding relationship to the received data.

11. The apparatus according to claim 1 wherein the at least one circuit is operative responsive at least in part to at least one input through the at least one input device to cause a determination of an amount associated with at least one purchasable item, wherein the at least one circuit is operative to cause indicia corresponding to the amount to be output through the at least one display.

12. The apparatus according to claim 1 wherein the at least one input device is operative to receive at least one item identifying input corresponding to at least one purchasable item, and at least one account identifying input usable to identify the financial account, wherein the financial account is associated with a purchaser of the at least one purchasable item who is different than the user of the at least one device, wherein the at least one circuit is operative to cause responsive at least in part to the at least one item identifying input, a determination of a price associated with the at least one purchasable item, and responsive at least in part to the at least one account identifying input, to cause an amount corresponding to the price to be assessed to the financial account.

13. The apparatus according to claim 1 wherein the at least one input device is operative to receive at least one currency input, wherein the at least one currency input corresponds to at least one feature of a currency bill, wherein the at least one circuit is operative responsive at least in part to the at least one currency input to cause an evaluation of whether the currency bill is genuine, and to cause indicia to be output through the at least one display indicative of a result of the evaluation.

14. The apparatus according to claim 1 wherein the at least one input device is operative to receive at least one currency input, wherein the at least one currency input corresponds to at least one feature of at least one item of currency, wherein the at least one circuit is operative responsive at least in part to the at least one currency input to cause a determination of a value of the at least one item of currency, and to cause indicia to be output through the at least one display indicative of the determined value.

15. The apparatus according to claim 1 wherein the at least one input device is operative to receive at least one currency input, wherein the at least one currency input corresponds to image features of a plurality of items of currency, wherein the at least one circuit is operative responsive at least in part to the at least one currency input to cause a determination of a total value of the plurality of items of currency, and to cause indicia to be output through the at least one display indicative of the determined total value.

16. The apparatus according to claim 1 wherein the at least one input device is operative to receive at least one currency input, wherein the at least one currency input corresponds to image features of a plurality of items of currency, wherein the at least one circuit is operative responsive at least in part to the at least one currency input to cause a determination of a total value of the plurality of items of currency, to provide at least one output through the at least one display indicative of the determined total value, and to provide at least one further output through the at least one display indicative of an amount of currency to be provided as change in a transaction in which the plurality of items of currency are received.

17. The apparatus according to claim 1 wherein the at least one circuit is operative to cause generation of a receipt for the financial transfer.

18. The apparatus according to claim 1 wherein the at least one input device comprises at least one outward facing camera, wherein the at least one outward facing camera is operable to capture image data corresponding to at least one of a payment card,
a label,
a barcode,
a QR CODE®,
a purchasable item,
a ticket,
a financial check,
an item of currency,
a printed item, or
a device display, wherein the at least one circuit is operative to cause the at least one display to output visual indicia that comprises at least one instruction to the user concerning capture of the image data.

19. The apparatus according to claim 1 wherein the financial transfer corresponds to an amount that is assessed to the financial account, wherein the at least one circuit is operative to cause the wireless transceiver to transmit at least one wireless signal that includes data corresponding to the amount, wherein the at least one wireless signal is receivable by a mobile wireless device different than the at least one device.

20. The apparatus according to claim 1 wherein the at least one circuit is operative to cause the at least one input device to be enabled to receive price data corresponding to a price of an item available for purchase in a business establishment where the at least one device is located, and account data corresponding to the financial account, wherein the financial account is associated with an individual other than the user, who is purchasing the item at the business establishment, and to cause data usable to determine the price to be included in the at least one device wireless message, wherein the at least one device wireless message is operative to cause an amount corresponding to the price to be assessed to the financial account.

21. Apparatus comprising:

at least one device, wherein the at least one device is operable by a user to cause a financial transfer, wherein the at least one device includes user wearable glasses, wherein the glasses include at least one transparent display, wherein the at least one display is operable to provide visual outputs that are visually perceivable by the user, wherein the user is enabled to view through the at least one display physical items and the visual outputs, at least one user operable input device, a wireless transceiver, at least one circuit including a processor, wherein the at least one circuit is in operative connection with the at least one display, the at least one input device, the wireless transceiver, wherein the at least one circuit is operative responsive at least in part to at least one input through the at least one input device to cause the wireless transceiver to communicate at least one device wireless message, wherein the at least one device wireless message includes data usable to identify a financial account, wherein the at least one device wireless message is operative at least in part, to cause a financial transfer at least one of to or from the financial account.

22. The apparatus according to claim 21 wherein the at least one input device is operable to receive account data usable to identify the financial account, and to receive amount data usable to determine an amount to be debited or credited to the financial account, wherein the at least one device wireless message includes data usable to determine the amount, wherein the at least one device wireless message is operative at least in part, to cause the financial account to be debited or credited monetary value corresponding to the amount.

23. The apparatus according to claim 21 wherein the at least one control circuit is operative to cause the at least one input device to be enabled to receive price data corresponding to a price of an item available for purchase in a business establishment, and account data corresponding to the financial account, wherein the financial account is associated with an individual other than the user, who conducts a purchase of the item at the business establishment, and an amount corresponding to the price to be assessed to the financial account.

24. Apparatus comprising:

at least one device that is operable by a user to cause a financial transfer wherein the at least one device includes at least one transparent structure, wherein the at least one transparent structure enables the user to visually perceive through the at least one transparent structure physical surroundings in a direct field of view of the user, at least one display, wherein the at least one display is operable to provide outputs that are visually perceivable by the user when looking through the at least one transparent structure, wherein the visual outputs and the physical surroundings are perceivable by the user looking through the at least one transparent structure, at least one input device, wherein the at least one input device is operable by the user, a wireless transceiver, at least one circuit, wherein the at least one circuit is in operative connection with the at least one display, the at least one input device, the wireless transceiver, wherein the at least one circuit is operative to cause the wireless transceiver to communicate at least one device wireless message, wherein responsive at least in part to the at least one device wireless message, at least one remote circuit is operative to cause a financial transfer at least one of to or from a financial account.

25. The apparatus according to claim 24 wherein the at least one device further includes a wireless reader, wherein the wireless reader is in operative connection with the at least one circuit, wherein the wireless reader is operative to wirelessly receive data associated with the financial account from at least one article, wherein the at least one device wireless message includes data having a corresponding relationship to the received data.

26. The apparatus according to claim 24 wherein the at least one input device is operative to receive at least one item identifying input corresponding to at least one purchasable item, and at least one account identifying input usable to identify the financial account, wherein the financial account is associated with a purchaser of the at least one purchasable item who is different than the user of the at least one device, wherein the at least one circuit is operative to cause responsive at least in part to the at least one item identifying input, a determination of a price associated with the at least one purchasable item, and responsive at least in part to the at least one account identifying input to cause an amount corresponding to the price to be assessed to the financial account.

27. The apparatus according to claim 24 wherein the at least one input device comprises at least one image capture device, wherein the at least one image capture device is operable to capture image data corresponding to one or more of a payment card, a label, a barcode, a QR CODE® a purchasable item, a ticket, a financial check, an item of currency, a printed item, or a device display, wherein the at least one circuit is operative to cause the at least one display to output visual indicia that comprises at least one instruction to the user concerning capture of the image data.

28. The apparatus according to claim 24 wherein the at least one input device is operative to receive at least one currency input, wherein the at least one currency input corresponds to image data associated with at least one currency bill, wherein the at least one circuit is operative responsive at least in part to the at least one currency input to cause a determination of a total value associated with the at least one currency bill, and to cause indicia to be output through the at least one display indicative of the total value.

* * * * *